US012453767B2

United States Patent
Rieder et al.

(10) Patent No.: US 12,453,767 B2
(45) Date of Patent: Oct. 28, 2025

(54) DEVELOPMENT OF MOSAIC VACCINES AGAINST FOOT AND MOUTH DISEASE VIRUS SEROTYPE O

(71) Applicants: The United States of America, as represented by the Secretary of Agriculture, Washington, DC (US); Triad National Security, LLC, Los Alamos, NM (US); KANSAS STATE UNIVERSITY RESEARCH FOUNDATION, Manhattan, KS (US)

(72) Inventors: Aida E. Rieder, Westbrook, CT (US); Katherine M. Pflaum, Middletown, CT (US); Fayna C. Diaz San Segundo, Blue Point, NY (US); William M. Fischer, Los Alamos, NM (US); Tatjana Sitt, Essex, CT (US)

(73) Assignees: The United States of America, as represented by the Secretary of Agriculture, Washington, DC (US); Kansas State University Research Foundation, Manhattan, KS (US); Triad National Security, LLC, Los Alamos, NM (US)

( * ) Notice: Subject to any disclaimer, the term of this patent is extended or adjusted under 35 U.S.C. 154(b) by 652 days.

(21) Appl. No.: 17/889,737

(22) Filed: Aug. 17, 2022

(65) Prior Publication Data
US 2023/0149528 A1    May 18, 2023

Related U.S. Application Data

(60) Provisional application No. 63/234,458, filed on Aug. 18, 2021.

(51) Int. Cl.
*A61K 39/135* (2006.01)
*A61P 31/14* (2006.01)
*A61K 39/00* (2006.01)

(52) U.S. Cl.
CPC ............ *A61K 39/135* (2013.01); *A61P 31/14* (2018.01); *A61K 2039/552* (2013.01)

(58) Field of Classification Search
None
See application file for complete search history.

(56) References Cited

U.S. PATENT DOCUMENTS 7,323,546 B2   1/2008   Liang et al.
8,409,588 B2   4/2013   Czub et al.
(Continued)

FOREIGN PATENT DOCUMENTS

WO    WO-2014077825 A1 *  5/2014   ............ A61K 38/00

OTHER PUBLICATIONS

SEQ ID No. 2 alignment with UniProt_202406 access No. Q8JW41_FMDVO Oct. 2002.*
(Continued)

*Primary Examiner* — Shanon A. Foley
(74) *Attorney, Agent, or Firm* — John Fado; Mark McNemar

(57) ABSTRACT

Synthetic foot-and-mouth disease virus (FMDV) mosaic polypeptides, and nucleic acid molecules encoding the mosaic polypeptides, are described. When included as part of an FMDV genome, the mosaic polypeptides permit virus replication and assembly into FMDV particles. The mosaic polypeptide and nucleic acid compositions can be used to elicit immune responses that provide protection against a broad range of serotype O FMDV strains.

12 Claims, 20 Drawing Sheets

Specification includes a Sequence Listing.

(56) References Cited

U.S. PATENT DOCUMENTS

| | | |
|---|---|---|
| 10,010,605 B2 | 7/2018 | Audonnet et al. |
| 10,308,927 B2 | 6/2019 | Puckette et al. |
| 2017/0216422 A1 | 8/2017 | Widener et al. |
| 2023/0149528 A1* | 5/2023 | Rieder .................... A61P 31/14 |
| | | 424/216.1 |

OTHER PUBLICATIONS

SEQ ID No. 4 alignment with UniProt_202406 access No. POLG_FMDVP Jul. 2004.*
SEQ ID No. 6 alignment with PIR_80 db access No. GNNYF submitted 1981.*
SEQ ID No. 6 alignment with UniProt_202406 access No. L0AQ77_FMDVO Mar. 2013.*
SEQ ID No. 8 alignment with UniProt_202406 access No. A0A0H3VYK9_FMDVO Oct. 2015.*
SEQ 10 alignment with UniProt_202406 access No. A0A119J6C3_FMDVO Feb. 2017.*
SEQ 2 alignment with Geneseq db access BBG42659 in WO2014077825 May 2014.*
SEQ 10 alignment with Geneseq db access BGQ54277 in CN110156896 Oct. 2019.*
International Search Report dated Dec. 15, 2022.

* cited by examiner

SEQUENCE LISTING

```
Sequence total quantity: 10
SEQ ID NO: 1              moltype = DNA  length = 2202
FEATURE                   Location/Qualifiers
misc_feature              1..2202
                          note = Chemically Synthesized
source                    1..2202
                          mol_type = other DNA
                          organism = synthetic construct
SEQUENCE: 1
ggggccggcc aatccagtcc ggcgaccggc tcgcagaacc aatctggcaa cactggcagc  60
ataattaaca actactacat gcagcaatac cagaactcca tggacacaca gttgggagac  120
aatgccatca gtggaggctc caacgagggc tccacggaca caacttcaac acacacaacc  180
aacactcaaa acaatgactg gttctcgaag ctcgccagtt cagcttttac cggtctgttc  240
ggtgcactgc tcgccgacaa gaaaaccgag gagaccactc tcctcgagga ccgcatcctc  300
accacccgca acggacacgc gacctcgaca acccagtcga gcgttggagt cacgtacggg  360
tacgcaacag ctgaggactt tgtgagcggg ccaaacacct ctggtcttga gaccagggtt  420
gtgcaggcag agcggttctt caaaacccac ttgttcgact gggtcaccag tgacccgttc  480
ggacggtgcc acctgctgga actcccaact gaccacaaag gtgtctacgg cagcctgacc  540
gactcgtatg cttacatgag aaacggttgg gatgtcgagg tcaccgcagt gggaaaccag  600
ttcaacggag gatgcctgtt ggtggccatg gtgccagaac tttgttccat ccaaaagaga  660
gagctgtacc agctcacgct cttcccccac cagttcatca accccggac gaacatgacg  720
gcacacatca ctgtgccctt tgttggcgtc aaccgctacg accagtacaa ggtacacaaa  780
ccttggacc ttgtggtcat ggttgtggcc ccgctgactg tcaacactga aggtgcccca  840
cagatcaagg tgtatgccaa catcgccccc accaacgtgc acgtcgcggg tgagttccct  900
tccaaagagg ggatcttccc cgtggcatgt agcgacggtt acggcggttt ggtgaccact  960
gacccgaaga cggctgaccc cgcctacggg aaagtgttca ccccctcg caacatgttg  1020
ccggggcggt tcaccaactt ccttgatgtg gctgaggcgt gccccacgtt tctgcacttt  1080
gagggtgacg taccgtacgt gaccacgaag acggactcgg acagggtgct cgctcagttt  1140
gacttgtctt tggcagcaaa gcacatgtca aacaccttcc ttgcaggtct cgcccagtac  1200
tacacacagt acagcggcac catcaacctg cacttcatgt tcacaggacc cactgacgcg  1260
aaagcgcgtt acatgattgc atacgccccc cctggcatgg agccgcccaa aacacctgag  1320
gcggctgctc actgcattca tgctgagtgg gacacagggt tgaactcaaa attcacattt  1380
tcaatccctc acctctcggc ggctgactac gcgtacaccg cgtctgacac tgctgagacc  1440
acaaatgtac agggatgggt ctgcttgttt caaataacac acgggaaggc tgacggcgac  1500
gcactggtcg tgctggcaag cgccggtaag gactttgagc tgcgtctgcc agtggacgcc  1560
cgcacgcaga ccacctccac aggtgagtca gctgaccccg tgactgccac tgttgagaac  1620
tacggtggcg agacacaggt ccagaggcgc caacacacg acgtctcgtt catattggac  1680
```

```
agatttgtga aagtgacacc aaaagaccaa attaatgtgt tggacctgat gcaaacccct  1740
gcccacactt tggtaggcgc gctcctccgc actgccactt actacttcgc agatctagag  1800
gtggcagtga aacacgaggg gaaccctcac tgggtcccga acggggcgcc cgagacagcg  1860
ttggacaaca ccaccaaccc aacggcttac acaaggcac cgctcacccg gcttgcactg  1920
ccttacacgg caccacaccg tgtcttggct accgtttaca cgggaactg caagtacggc  1980
gagagccccg tgaccaacgt gagaggtgac ctgcaagtgt tggcccagaa ggcggcgaga  2040
acgctgccta cctccttcaa ctacggtgcc atcaaagcca ctcgggtgac tgaactgctt  2100
taccgcatga gagggccga aacatactgc ccccggcctc ttttggccat tcacccgagt  2160
gaagccagac acaaacaaaa gattgtggca cctgtgaaac ag                    2202

SEQ ID NO: 2            moltype = AA   length = 734
FEATURE                 Location/Qualifiers
REGION                  1..734
                        note = Chemically Synthesized
source                  1..734
                        mol_type = protein
                        organism = synthetic construct
SEQUENCE: 2
GAGQSSPATG SQNQSGNTGS IINNYYMQQY QNSMDTQLGD NAISGGSNEG STDTTSTHTT   60
NTQNNDWFSK LASSAFTGLF GALLADKKTE ETTLLEDRIL TTRNGHTTST TQSSVGVTYG  120
YATAEDFVSG PNTSGLETRV VQAERFFKTH LFDWVTSDPF GRCHLLELPT DHKGVYGSLT  180
DSYAYMRNGW DVEVTAVGNQ FNGGCLLVAM VPELCSIQKR ELYQLTLFPH QFINPRTNMT  240
AHITVPFVGV NRYDQYKVHK PWTLVVMVVA PLTVNTEGAP QIKVYANIAP TNVHVAGEFP  300
SKEGIFPVAC SDGYGGLVTT DPKTADPAYG KVFNPPRNML PGRFTNFLDV AEACPTFLHF  360
EGDVPYVTTK TDSDRVLAQF DLSLAAKHMS NTFLAGLAQY YTQYSGTINL HFMFTGPTDA  420
KARYMIAYAP PGMEPPKTPE AAAHCIHAEW DTGLNSKFTF SIPYLSAADY AYTASDTAET  480
TNVQGWVCLF QITHGKADGD ALVVLASAGK DFELRLPVDA RTQTTSTGES ADPVTATVEN  540
YGGETQVQRR QHTDVSFILD RFVKVTPKDQ INVLDLMQTP AHTLVGALLR TATYYFADLE  600
VAVKHEGNLT WVPNGAPETA LDNTTNPTAY HKAPLTRLAL PYTAPHRVLA TVYNGNCKYG  660
ESPVTNVRGD LQVLAQKAAR TLPTSFNYGA IKATRVTELL YRMKRAETYC PRPLLAIHPS  720
EARHKQKIVA PVKQ                                                   734

SEQ ID NO: 3            moltype = DNA   length = 2202
FEATURE                 Location/Qualifiers
misc_feature            1..2202
                        note = Chemically Synthesized
source                  1..2202
                        mol_type = other DNA
                        organism = synthetic construct
SEQUENCE: 3
ggggccggcc aatccagtcc ggcgaccggc tcgcagaacc aatctggcaa cactggcagc    60
ataattaaca actactacat gcagcaatac cagaactcca tggacacaca gttgggagac   120
aatcaatcca gtggaggctc caacgagggc tccacgacaa caccttcaac acacacacct   180
aacactcaaa acaatgactg gttctcgaag ctcgccagtt cagcttttac cggtctgttc   240
ggtgcactgc tcgccgacaa gaaaaccgag gagaccactc tcctcgagga ccgcatcctc   300
accacccgca acggacacac gacctcgaca acccagtcga gtgttggagt cacgtacggg   360
tacgcaacag ctgaggactt tgtgagcggg ccaaacaccc ctggtcttga gaccagggtt   420
gtgcaggcag agcggttctt caaaacccac ctgttcgact gggtcaccag tgacccgttc   480
ggacggtgcc acctgctgga actcccaact gaccacaaag tgtctacgg cagcctgacc   540
gactcgtatg cttacatgag aaacggttgg gacgtcgaag tcaccgcagt gggaaaccag   600
ttcaacggag gatgccgtt ggtggccatg gtgccagagc tttgttccat caccaagaga   660
gagctgtacc agctcacgct cttcccccac cagttcatca ccccccggac gaacatgacg   720
gcacacatca ctgtgcccta tctcggcgtc aaccgctacg accagtacaa ggtacacaaa   780
ccttggaccc ttgtggtcat ggttgtggcc cccctgactg tcaacaacga aggtgcccca   840
cagatcaagg tgtatgccaa catcgccccc accaacgtgc actcgcggg tgagctccct   900
tccaaagagg ggatcttccc cgtgtgcatg agcgacggtt acggcgggttt ggtgaccact   960
gacccgaaga cggctgaccc cgtttacggg aaagtgttca acccccccg caacctgttg  1020
ccggggcggt tcaccaacct ccttgatgtg gctgaggcgt gccccacgtt tctgcacttc  1080
gatggtgacg taccatacgt gaccacgaag acggactcgg acagggtgct cgctcagttt  1140
gacttgtctt tggcagcaaa gcacatgtca aacaccttcc ttgcaggtct gcccaagtac  1200
tacacacagt acagcggcac catcaacctg cacttcatgt tcacaggtcc cactgacgcg  1260
aaaagcgcgt acatggttgc atatgcccct cctggcatgg agccgccaa acacctgag  1320
gcggctgctc actgcattca tgctgagtgg gacacagggt tgaactcaaa attcacattt  1380
tcaatcccct acctctcggc ggctgactac gcgtacaacg cgtctgacgt tgctgagacc  1440
acaaatgtac agggatgggt ctgcttgttc caaataacac acgggaaagc tgacggtgac  1500
gctctggtcg tgctggctag cgccggcaag gactttgacc tgcgcctgcc ggtgacgcc  1560
cgcacgcaga ccacctccgc gggtgagtcg gctgaccccg tgactgccac cgttgagaac  1620
tacggtggcg agacacaggt ccagaggcgc caacacacgg acattgcgtt catattggac  1680
agatttgtga aagtgaagcc aaaagaacaa gttaatgtgt tggacctgat gcagatccat  1740
gcccacactt tggtaggcgc gctcctccgc actgccactt actacttctc tgatttagaa  1800
ctggcagtga aacacgaggg ggaccctcac tgggtcccga acggggcgcc tgagacagcg  1860
ttggacaaca ccaccaaccc aacggcttac acaaggaac cgctcacccg gcttgcactg  1920
ccttacacgg caccacaccg tgtgttggct accgtttaca cgggagcag taagtacggc  1980
gacacctcaa caaacaacgt gagaggtgac ctgcaaagtg ttggcaagga ggcggaaaga  2040
acgctgccta cctccttcaa ctacggtgcc atcaaagcca ctcgggtgac tgaactgctt  2100
taccgcatga gagggccga gacatactgc ccccggcctc ttttggccat tcacccgagt  2160
gacgccagac acaaacagaa gattgtggca cctgcaaac ag                     2202

SEQ ID NO: 4            moltype = AA   length = 734
```

| FEATURE | Location/Qualifiers |
|---|---|
| REGION | 1..734 |
| | note = Chemically Synthesized |
| source | 1..734 |
| | mol_type = protein |
| | organism = synthetic construct |

SEQUENCE: 4

```
GAGQSSPATG SQNQSGNTGS IINNYYMQQY QNSMDTQLGD NAISGGSNEG STDTTSTHTT    60
NTQNNDWFSK LASSAFTGLF GALLADKKTE ETTLLEDRIL TTRNGHTTST TQSSVGVTYG   120
YATAEDFVSG PNTSGLETRV VQAERFFKTH LFDWVTSDPF GRCHLLELPT DHKGVYGSLT   180
DSYAYMRNGW DVEVTAVGNQ FNGGCLLVAM VPELCSITKR ELYQLTLFPH QFINPRTNMT   240
AHITVPYLGV NRYDQYKVHK PWTLVVMVVA PLTVNNEGAP QIKVYANIAP TNVHVAGELP   300
SKEGIFPVAC SDGYGGLVTT DPKTADPVYG KVFNPPRNLL PGRFTNLLDV AEACPTFLHF   360
DGDVPYVTTK TDSDRVLAQF DLSLAAKHMS NTFLAGLAQY YTQYSGTINL HFMFTGPTDA   420
KARYMVAYAP PGMEPPKTPE AAAHCIHAEW DTGLNSKFTF SIPYLSAADY AYTASDVAET   480
TNVQGWVCLF QITHGKADGD ALVVLASAGK DFDLRLPVDA RTQTTSAGES ADPVTATVEN   540
YGGETQVQRR QHTDIAFILD RFVKVKPKEQ VNVLDLMQIP AHTLVGALLR TATYYFSDLE   600
LAVKHEGDLT WVPNGAPETA LDNTTNPTAY HKEPLTRLAL PYTAPHRVLA TVYNGSSKYG   660
DTSTNNVRGD LQVLAQKAER TLPTSFNYGA IKATRVTELL YRMKRAETYC PRPLLAIQPS   720
DARHKQKIVA PAKQ                                                    734
```

| SEQ ID NO: 5 | moltype = DNA length = 2202 |
|---|---|
| FEATURE | Location/Qualifiers |
| misc_feature | 1..2202 |
| | note = Chemically Synthesized |
| source | 1..2202 |
| | mol_type = other DNA |
| | organism = synthetic construct |

SEQUENCE: 5

```
ggggccggcc aatccagtcc ggcgaccggc tcgcagaacc aatctggcaa cactggcagc     60
ataattaaca actactacat gcagcaatac cagaactcca tggacacaca gttgggagac    120
aatgccatca gtggaggctc caacgagggc tccacggaca caacttcaac acacacaacc    180
aacactcaaa acaatgactg gttctcgaag ctcgccagtt cagcttttac cggtctgttc    240
ggtgcactgc tcgccgacaa gaaaaccgag gagaccactc tcctcgagga ccgcatcctc    300
accaccgcaa acggacacac gacctcgaca acccagtcga gtgttggagt cacgtacggg    360
tacgcaacag ctgaggactt tgtgagcggg ccaaacacct ctggtcttga gaccagggtt    420
gtgcaggcag agcggttctt caaaacccac ctgttcgact gggtcaccag tgactcattc    480
ggacggtgcc acctgctgga actcccaact gaccacaaag gtgtctacgg cagcctgacc    540
gactcgtatg cttacatgag aaacggttgg gacgtcgaag tcaccgcagt gggaaaccag    600
ttcaacggag gatgcctgtt ggtggccatg gtgccagagc tttgttccat ccaaaagaga    660
gagctgtacc agctcacgct cttccccccac cagttcatca ccccccggac gaacatgacg    720
gcacacatca ctgtgccctt tgttggcgtc aaccgctacg accagtacaa ggtacacaaa    780
ccttgaccc ttgtgtcat ggttgtggcc ccctgactg tcaacaccga aggtgcccca    840
cagatcaagg tgtatgccaa catcgccccc accaacgtgc acgtcgcggg tgagttccct    900
tccaaagagg ggatcttccc cgtggcatgt agcgacggtt acggcggttt ggtgaccact    960
gacccgaaga cggctgaccc cgtttacggg aaagtgttca accccccg caaccagttg   1020
ccggggcggt tcaccaacct ccttgatgtg gctgaggcgt gcccccactt tctgcacttc   1080
gagggtgacg taccatacgt gaccacgaag acggactcgg acagggtgct cgctcagttt   1140
gacatgtctt ggcagcaaa gcacatgtca aacaccttcc ttgcaggtct cgcccagtac   1200
tacacacagt acagcggcac catcaacctg cacttcatgt tcacaggtcc cactgacgcg   1260
aaagcgcgtt acatgattgc atatgcccct cctggcatgg agccgcccaa aacacctgag   1320
gcggctgctc actgcattca tgctgagtgg gacacagggt tgaactcaaa attcacattt   1380
tcaatcccct acctctcggc ggctgactac gcgtacaccg tgtctgacgt tgctgagacc   1440
acaaatgtac agggatgggt ctgcttgttc caaataacac acgggaaagc tgacggtgac   1500
gctctggtcg tgctggctag cgccggcaag gactttgagc tgcgcctgcc ggtggacgcc   1560
cgcgcggaaa ccacctccgc gggtgagtcg gctgaccccg tgactaccgc cgttgagaac   1620
tacggtggcg agacacaggt ccagaggcgc caacacacgg acgtctcgtt cataatggac   1680
agatttgtga agtgacacc acaaaaccaa attaatattt tggacctgat gcagatccct   1740
tcccacactt tggtaggcgc gctcctccgc gcgtccactt actacttctc tgatttagaa   1800
atagcagtga aacacgaggg ggacctcacc tgggtcccga acggggcgcc tgagaaggca   1860
ttggacaaca ccaccaaccc aacggcttac acaaaggcac cgctcacccg gcttgcactg   1920
ccttacacgg caccacaccg tgtgttggct accgtttaca cggggagtg caggtacagt   1980
agaaatgctg tgcccaacgt gagaggtgac ctccaagtgt ggcccagaa ggcggcgaga   2040
acgctgccta cctccttcaa ctacgctgcc atcaaagcca ctcgggtgac tgaactgctt   2100
taccgcatga gagggccga gacatactgc cccggcctc ttttggccat tcacccgact   2160
gaagccagac acaaacagaa gattgtggca cctgtgaaac ag                     2202
```

| SEQ ID NO: 6 | moltype = AA length = 734 |
|---|---|
| FEATURE | Location/Qualifiers |
| REGION | 1..734 |
| | note = Chemically Synthesized |
| source | 1..734 |
| | mol_type = protein |
| | organism = synthetic construct |

SEQUENCE: 6

```
GAGQSSPATG SQNQSGNTGS IINNYYMQQY QNSMDTQLGD NAISGGSNEG STDTTSTHTT    60
NTQNNDWFSK LASSAFTGLF GALLADKKTE ETTLLEDRIL TTRNGHTTST TQSSVGVTYG   120
YATAEDFVSG PNTSGLETRV VQAERFFKTH LFDWVTSDSF GRCHLLELPT DHKGVYGSLT   180
DSYAYMRNGW DVEVTAVGNQ FNGGCLLVAM VPELCSIQKR ELYQLTLFPH QFINPRTNMT   240
```

```
AHITVPFVGV NRYDQYKVHK PWTLVVMVVA PLTVNTEGAP QIKVYANIAP TNVHVAGEFP    300
SKEGIFPVAC SDGYGGLVTT DPKTADPVYG KVFNPPRNQL PGRFTNLLDV AEACPTFLHF    360
EGDVPYVTTK TDSDRVLAQF DMSLAAKHMS NTFLAGLAQY YTQYSGTINL HFMFTGPTDA    420
KARYMIAYAP PGMEPPKTPE AAAHCIHAEW DTGLNSKFTF SIPYLSAADY AYTASDVAET    480
TNVQGWVCLF QITHGKADGD ALVVLASAGK DFELRLPVDA RAETTSAGES ADPVTTTVEN    540
YGGETQVQRR QHTDVSFIMD RFVKVTPQNQ INILDLMQIP SHTLVGALLR ASTYYFSDLE    600
IAVKHEGDLT WVPNGAPEKA LDNTTNPTAY HKAPLTRLAL PYTAPHRVLA TVYNGECRYS    660
RNAVPNVRGD LQVLAQKAAR TLPTSFNYGA IKATRVTELL YRMKRAETYC PRPLLAIHPT    720
EARHKQKIVA PVKQ                                                      734

SEQ ID NO: 7             moltype = DNA  length = 2202
FEATURE                  Location/Qualifiers
misc_feature             1..2202
                         note = Chemically Synthesized
source                   1..2202
                         mol_type = other DNA
                         organism = synthetic construct
SEQUENCE: 7
ggggccggcc aatccagtcc ggcgaccggc tcgcagaacc aatctggcaa cactggcagc     60
ataattaaca actactacat gcagcaatac cagaactcca tggacacaca gttgggagac    120
aatgccatca gtgtgaggct caacgagggc tccacggaca caacttcaac acacacaacc    180
aacactcaaa acaatgactg gttctcgaag ctcgccagtt cagctttttac cggtctgttc    240
ggtgcactgc tcgccgacaa gaaaccgag gagaccactc tcctcgagga ccgcatcctc    300
accaccccgca acggacacac gacctcgaca acccagtcga gtgttggaat aacgtacggg    360
tacgcaacag ctgaggactt tgtgagcggg ccaaacacct ctggtcttga gaccagggtt    420
gtgcaggcag agcggttctt caaaacccac ctgttcgact gggtcaccag tgacccgttc    480
ggacggtgcc acctgctgga actcccaact gaccacaaag gtgtctacgg cagcctgacc    540
gactcgtatg cttacatgag aaacggttgg gacgtcgaag tcaccgcagt gggaaaccag    600
ttcaacggag gatgcctgtt ggtggccatg gtgccagagc tttgttccat ccaaaagaga    660
gagctgatcc agctcacgct cttcccccac cagttcatca accccggac gaacatgacg    720
gcacacatca aggtgccctt tgttggcgtc aaccgctacg accagtacaa ggtacacaaa    780
ccttggaccc ttgtggtcat ggttgtggcc ccctgactg tcaacaccga aggtgcccca    840
cagatcaagg tgtatgccaa catcgcccc accaacgtgc acgtcgcggg tgagttccct    900
tccaaagagg ggatcttccc cgtggcatgt agcgacggt acggcggttc ggtgaccact    960
gacccgaaga cggctgaccc cgcctacgg aaagtgttca accccccg caacatgttg   1020
ccggggcggt tcaccaacct ccttgatgtg gctgaggcgt gccccacgtt tctgcacttc   1080
gagggtgacg taccatacgt gaccacgaag acggactcgg acagggtgct cgctcagttt   1140
gacttgtctt tggcagcaaa gcacatgtca aacacctcc ttgcaggtct cgcccagtac   1200
tacacacagt acagcggcac catcaacctg cacttcatgt tcacaggtcc cactgacgcg   1260
aaaagcgcgt tacatgattg catatgcccct cctggcatgg agccgcccaa aacacctgag   1320
gcggctgctc actgcattca tgctgagtgg gacacagggt tgaactcaaa attcacattt   1380
tcaatcccct acctctcggc ggctgactac gcgtacaccg tctcgacac tgctgagacc   1440
acaaatgtac aggatgggt ctgcttgttc caaataacac agggaaagc tgacggtgac   1500
gctctggtcg tgctggctag cgccggcaag gactttgagc tgcgcctgcc ggtgacgcc   1560
cgcagacaga ccacctccac aggtgagtcg gctgaccccg tgactgccac cgttgagaac   1620
tacggtggcg agacacaggt ccagaggcgc accacacgg acgtctcgtt catattggac   1680
agatttgtga aagtgacacc aaaagaccaa attaatgtgt tggacctgat gcagaccct   1740
tcccacactt tggtaggcgc gctcctccgc actgccactt actacttcgc tgatttagaa   1800
gtggcagtga aacacgaggg ggacctcacc tgggtcccga acggggcgcc tgaggcagcg   1860
ttggacaaca ccaccaaccc aacggcttac acaaggcac cgctcaccg gcttgcactg   1920
ccttacacgg caccacaccg tgtgttggct accgtttaca acgggaactg caagtacgcc   1980
gagggctcac tgaccaacgt gagaggtgac ctcaagtgt tggcccagaa ggcggcgaga   2040
ccgctgccta cctccttcaa ctacggtgcc atcaaagcca ctcgggtgac tgaactgctt   2100
taccgcatga gagggccga gacatactgc cccggcctc ttttggcgt caccccggat   2160
caggccgagc acaaacagaa gattgtggca cctgtgaaac ag                       2202

SEQ ID NO: 8             moltype = AA  length = 734
FEATURE                  Location/Qualifiers
REGION                   1..734
                         note = Chemically Synthesized
source                   1..734
                         mol_type = protein
                         organism = synthetic construct
SEQUENCE: 8
GAGQSSPATG SQNQSGNTGS IINNYYMQQY QNSMDTQLGD NAISGGSNEG STDTTSTHTT     60
NTQNNDWFSK LASSAFTGLF GALLADKKTE ETTLLEDRIL TTRNGHTTST TQSSVGITYG    120
YATAEDFVSG PNTSGLETRV VQAERFFKTH LFDWVTSDPF GRCHLLELPT DHKGVYGSLT    180
DSYAYMRNGW DVEVTAVGNQ FNGGCLLVAM VPELCSIQKR ELYQLTLFPH QPINPRTNMT    240
AHIKVPFVGV NRYDQYKVHK PWTLVVMVVA PLTVNTEGAP QIKVYANIAP TNVHVAGEFP    300
SKEGIFPVAC SDGYGGLVTT DPKTADPAYG KVFNPPRNML PGRFTNLLDV AEACPTFLHF    360
EGDVPYVTTK TDSDRVLAQF DLSLAAKHMS NTFLAGLAQY YTQYSGTINL HFMFTGPTDA    420
KARYMIAYAP PGMEPPKTPE AAAHCIHAEW DTGLNSKFTF SIPYLSAADY AYTASDTAET    480
TNVQGWVCLF QITHGKADGD ALVVLASAGK DFELRLPVDA RRQTTSTGES ADPVTATVEN    540
YGGETQVQRR HHTDVSFILD RFVKVTPKDQ INVLDLMQTP SHTLVGALLR TATYYFADLE    600
VAVKHEGDLT WVPNGAPEAA LDNTTNPTAY HKAPLTRLAL PYTAPHRVLA TVYNGNCKYA    660
EGSLTNVRGD LQVLAQKAAR PLPTSFNYGA IKATRVTELL YRMKRAETYC PRPLLAVHPD    720
QARHKQKIVA PVKQ                                                      734

SEQ ID NO: 9             moltype = DNA  length = 2202
```

```
FEATURE              Location/Qualifiers
misc_feature         1..2202
                     note = Chemically Synthesized
source               1..2202
                     mol_type = other DNA
                     organism = synthetic construct
SEQUENCE: 9
ggggccggcc aatccagtcc ggcgaccggc tcgcagaacc aatctggcaa cactggcagc    60
ataattaaca actactacat gcagcaatac cagaactcca tggacacaca gttgggagac   120
aatgccatca gtggaggctc caacgagggc tccacggaca caacttcaac acacacaacc   180
aacactcaaa acaatgactg gttctcgaag ctcgccagtt cagcttttac cggtctgttc   240
ggtgcactgc tcgccgacaa gaaaaccgag gagaccactc tcctcgagga ccgcatcctc   300
accacccgca acggacacac gacctcgaca acccagtcga gtgttggaat aacgcacggg   360
tacgcaacag ctgaggactt tgtgagcggg ccaaacacct ctggtcttga gaccaggggt   420
gtgcaggcag agcggttctt caaaaccac ctgttcgact gggtcaccag tgacccgttc    480
ggacggtgcc acctgctgga actcccaact gaccacaaag gtgtctacgg cagcctgacc   540
gactcgtatg cttacatgag aaacggttgg gacgtcgaag tcaccgcagt gggaaaccag   600
ttcaacggag gatgcctgtt ggtggccatg gtgccagagc tttgttccat cgagcggaga   660
gagctgttcc agctcacgct cttccccac cagttcatca accccggac gaacatgacg     720
gcacacatca aggtgccctt tgttggcgtc aacgctacg accagtacaa ggtacacaaa    780
ccttggaccc ttgtggtcat ggttgtggcc ccctgactg tcaacaccga aggtgcccca    840
cagatcaagg tgtatgccaa catcgccccc accaacgtgc agctccgcgg tgagttccct   900
tccaaagagg ggatcttccc cgtggcatgt agcgacggtt acgcggttt ggtgaccact    960
gacccgaaga cggctgaccc cgtttacggg aaagtgttca accccccg caacatgttg    1020
ccgggggcggt tcaccaacct ccttgatgtg gctgaggcgt gccccacgtt tctgcacttc  1080
gatggtgacg taccatacgt gaccacgaag acggactcgg acagggtgct cgctcagttt  1140
gacttgtctt tggcagcaaa gcacatgtca aacaccttcc ttgcaggtct cgcccagtac  1200
tacacacagt acagcggcac catcaacctg cacttcatgt tcacaggtcc cactgacgcg  1260
aaagcgcgtt acatgattgc atatgcccct cctggcatgg agccgcccaa aacacctgag  1320
gcggctgctc actgcattca tgctgagtgg gacacagggt tgaactcaaa attcacattt   1380
tcaatcccct acctctcggc ggctgactac gcgtacaccg cgtctgacgc tgctgagacc  1440
acaaatgtac agggatgggt ctgcttgttc caaataacac acgggaaagc tgagggtgac  1500
gctctggtcg tgctggctag cgccggcaag gactttgagc tgcgcctgcc ggtggacgcc  1560
cgccaacaga ccacctccac aggtgagtcg gctgacccg tgactgccac cgttgagaac   1620
tacggtggcg agacacaggt ccagaggcgc caccacacgg acgtctcgtt catattggac  1680
agatttgtga aagtgacacc aaaagactca attaatgtgt tggacctgat gcagacccct  1740
ccccacactt tggtaggcgc gctcctccgc actgccactt actacttcgc tgatttagaa  1800
gtggcagtga aacacgaggg ggacctcacc tgggtcccga acggggcgcc tgaggcagcg  1860
ttggacaaca ccaccaaccc aacggcttac cacaaggcac ctctcaccg gcttgcactg   1920
ccttacacgg caccacaccg tgtgttggct accgtttaca acgggaactg caagtacgcc  1980
gggggctcac tgcccaacgt gagaggtgac ctccaagtgt tggcccagaa ggcggcgaga  2040
ccgctgccta cctccttcaa ctacggtgcc atcaaagcca ctcgggtgac tgaactgctt  2100
taccgcatga gagggccga gacatactgc ccccggcctc ttttggccgt ccacccgagt    2160
gcggccagac acaaacagaa gattgtgca cctgtgaaac ag                      2202

SEQ ID NO: 10         moltype = AA length = 734
FEATURE               Location/Qualifiers
REGION                1..734
                      note = Chemically Synthesized
source                1..734
                      mol_type = protein
                      organism = synthetic construct
SEQUENCE: 10
GAGQSSPATG SQNQSGNTGS IINNYYMQQY QNSMDTQLGD NAISGGSNEG STDTTSTHTT    60
NTQNNDWFSK LASSAFTGLF GALLADKKTE ETTLLEDRIL TTRNGHTTST TQSSVGITHG   120
YATAEDFVSG PNTSGLETRV VQAERFFKTH LFDWVTSDPF GRCHLLELPT DHKGVYGSLT   180
DSYAYMRNGW DVEVTAVGNQ FNGGCLLVAM VPELCSIERR ELFQLTLFPH QPINPRTNMT   240
AHIKVPFVGV NRYDQYKVHK PWTLVVMVVA PLTVNTEGAP QIKVYANIAP TNVHVAGEFP   300
SKEGIFPVAC SDGYGGLVTT DPKTADPVYG KVFNPPRNML PGRFTNLLDV AEACPTFLHF   360
DGDVPYVTTK TDSDRVLAQF DLSLAAKHMS NTFLAGLAQY YTQYSGTINL HFMFTGPTDA   420
KARYMIAYAP PGMEPPKTPE AAAHCIHAEW DTGLNSKFTF SIPYLSAADY AYTASDAAET   480
TNVQGWVCLF QITHGKAEGD ALVVLASAGK DFELRLPVDA RQQTTSTGES ADPVTATVEN   540
YGGETQVQRR HHTDVSFILD RFVKVTPKDS INVLDLMQTP PHTLVGALLR TATYYFADLE   600
VAVKHEGDLT WVPNGAPEAA LDNTTNPTAY HKAPLTRLAL PYTAPHRVLA TVYNGNCKYA   660
GGSLPNVRGD LQVLAQKAAR PLPTSFNYGA IKATRVTELL YRMKRAETYC PRPLLAVHPS   720
AARHKQKIVA PVKQ                                                     734
```

DEVELOPMENT OF MOSAIC VACCINES AGAINST FOOT AND MOUTH DISEASE VIRUS SEROTYPE O

CROSS-REFERENCE

This present application claims priority under 35 U.S.C. § 119 (e) to U.S. Provisional Ser. No. 63/234,458, which was filed on Aug. 18, 2021, and is hereby incorporated by reference.

ACKNOWLEDGMENT OF GOVERNMENT SUPPORT

This invention was made with government support under IAA Contract No. 70RSAT18KPM000140, awarded by the U.S. Department of Homeland Security. The government has certain rights in the invention.

FIELD OF INVENTION

This disclosure concerns synthetic foot-and-mouth disease virus (FMDV) polypeptides and nucleic acids and their use for inducing a broad immune response against serotype O FMDV.

BACKGROUND OF THE INVENTION

Background

Foot-and-Mouth disease (FMD) is a highly contagious viral disease of cloven-hoofed animals with world-wide distribution, causing fever, lameness, and vesicles on the mouth, tongue, snout, teats, and feet. FMDV is a highly variable, single-stranded, positive-sense RNA virus belonging to the *Aphthovirus* genus of the Picornaviridae family. The virus is antigenically variable with 7 distinct serotypes, including A, O, C, Asia, and the 3 South African Territories serotypes (SAT1, SAT2, and SAT3), each comprised of multiple subtypes (Knowles & Samuel, Virus Res., (2003), 91 (1): 65-80). There is no observed cross-protection between the different serotypes following vaccination or natural infection (Cartwright et al, Res. Vet. Sci., (1982), 32 (3): 338-342; Grubman & Baxt, Clin. Microbiol. Rev., (2004), 17 (2): 465-493).

FMD outbreaks, which have occurred on almost every continent, result in devastating economic consequences, with severe impacts on dairy and meat industries of affected regions (Alexandersen et al, J. Comp. Pathol., (2003) 129 (1): 1-36). FMD control depends largely on the FMD-status of the regions. In FMD endemic countries, prophylactic vaccination using antigens that match the circulating virus serotypes is a commonly practiced control measure. However, the introduction of new strains renders these vaccines ineffective (Uddowla et al, J. Virol., (2012), 86 (21): 11675-85). Control measures in FMD-free regions involve the slaughter of animals in affected and neighboring regions (stamping out), regardless of the health status of the animals, resulting in annual losses of billions of dollars (James & Rushton, Rev. Sci. Tech. (2002), 21 (3): 637-644; Knight-Jones & Rushton Prev. Vet. Med., (2013), 112 (3-4): 161-73.

Current commercially available FMD vaccines consist of chemically inactivated antigens formulated with adjuvants. This method has been relatively successfully at reducing FMD outbreaks and virus transmission. However, there are many risks and limitations with this type of vaccination program (Grubman and Baxt, supra; Rodriguez & Grubman, Vaccine, (2009), 27 (Suppl 4): D90-94. Production of chemically inactivated vaccines requires the large-scale growth and production of live, highly virulent virus. This poses a significant risk for escape of the virus from production facilities, as has been recorded previously (reviewed in Grubman & Baxt, supra). Additionally, these chemically inactivated antigen vaccines tend to lack cross protection between serotypes and subtypes and therefore unique vaccines are required for each geographic area. Finally, these vaccines require additional downstream processing steps to remove non-structural viral proteins (NSP) to allow for NSP-based serological differentiation between the vaccinated and infected animals (DIVA capability; Uddowla et al, supra).

The worldwide diversity of FMDV serotypes is a significant challenge to overcome in that antigens derived from one naturally circulating serotype do not provide cross-protection or immunity against other circulating serotypes. Herein, we address this challenge by developing polyvalent vaccine antigens from FMDV consisting of a series of mosaic proteins, assembled from fragments of natural sequences of FMDV serotype O capsid isolates.

SUMMARY OF THE INVENTION

The present disclosure provides, in one embodiment a synthetic polypeptide having an amino acid sequence at least 98% identical to SEQ ID NO: 2, SEQ ID NO: 4, SEQ ID NO: 6, SEQ ID NO: 8, or SEQ ID NO: 10. In specific embodiments, the synthetic polypeptide has the amino acid sequence of SEQ ID NO: 2, SEQ ID NO: 4, SEQ ID NO: 6, SEQ ID NO: 8, or SEQ ID NO: 10. Some embodiments of this composition also contain a pharmaceutically acceptable carrier. In other embodiments, a first and second synthetic polypeptide are present where the first synthetic polypeptide comprises an amino acid sequence at least 98% identical to SEQ ID NO: 2, and the second synthetic polypeptide comprising an amino acid sequence at least 98% identical to SEQ ID NO: 10; such two polypeptide compositions can optionally contain a pharmaceutically acceptable carrier and/or and adjuvant.

An additional embodiment disclosed herein is a recombinant foot-and-mouth disease virus (FMDV) comprising a synthetic polypeptide having an amino acid sequence at least 98% identical to SEQ ID NO: 2, SEQ ID NO: 4, SEQ ID NO: 6, SEQ ID NO: 8, or SEQ ID NO: 10. The recombinant FMDV of claim 8, comprising a synthetic polypeptide comprising the amino acid sequence of SEQ ID NO: 2, SEQ ID NO: 4, SEQ ID NO: 6, SEQ ID NO: 8, or SEQ ID NO: 10. In other embodiments, at least two recombinant FMDV are present in a mixture, where the first recombinant FMDV comprises a synthetic polypeptide at least 98% identical to the amino acid sequence of SEQ ID NO: 2, and the second recombinant FMDV comprises a synthetic polypeptide at least 98% identical to the amino acid sequence of SEQ ID NO: 10; such two-virus mixes can optionally also contain a pharmaceutically acceptable carrier and/or an adjuvant.

Further provided herein is an isolated nucleic acid molecule encoding a synthetic polypeptide at least 98% identical to SEQ ID NO: 2, SEQ ID NO: 4, SEQ ID NO: 6, SEQ ID NO: 8, or SEQ ID NO: 10. In specific embodiments, such isolated nucleic acids comprise the nucleotide sequence of SEQ ID NO: 1, SEQ ID NO: 3, SEQ ID NO: 5, SEQ ID NO: 7, or SEQ ID NO: 9. Also disclosed herein are vectors comprising any of these nucleic acids.

An additional embodiment provided herein, is a method of eliciting an immune response against serotype O footand-mouth disease virus (FMDV) in a subject, comprising administering to the subject a composition comprising the synthetic polypeptide at least 98% identical to SEQ ID NO: 2, SEQ ID NO: 4, SEQ ID NO: 6, SEQ ID NO: 8, or SEQ ID NO: 10, thereby eliciting an immune response to serotype O FMDV. In some embodiments of this method, the synthetic polypeptide comprises SEQ ID NO: 2, SEQ ID NO: 4, SEQ ID NO: 6, SEQ ID NO: 8, or SEQ ID NO: 10. In some embodiments, the administered composition further comprises a pharmaceutically acceptable carrier, an adjuvant, or both a pharmaceutically acceptable carrier and an adjuvant. In specific embodiments, two compositions are administered to a subject, wherein the first composition comprises a synthetic polypeptide at least 98% identical to the amino acid sequence of SEQ ID NO: 2 and the second composition comprises a second synthetic polypeptide at least 98% identical to the amino acid sequence of SEQ ID NO: 10. In some embodiments, the subject is a bovine (e.g., cow) or swine (e.g., pig).

INCORPORATION BY REFERENCE

All publications, patents and patent applications mentioned in this specification are herein incorporated by reference to the same extent as if each individual publication, patent or patent application was specifically and individually indicated to be incorporated by reference.

SEQUENCE LISTING

The instant application contains a Sequence Listing XML required by 37 C.F.R. § 1.831 (a) which has been submitted in XML file format via the USPTO patent electronic filing system and is hereby incorporated by reference in its entirety. The XML file was created on Aug. 12, 2022, is named Sequence_Listing-001621.xml, and has 28 bytes.

BRIEF DESCRIPTION OF THE DRAWINGS

The novel features of the invention are set forth with particularity in the claims. Features and advantages of the present invention are referred to in the following detailed description, and the accompanying drawings of which:

FIG. 1 is a schematic of the mosaic immunogen design method. The figure shows a conceptual illustration of the method whereby a selection of natural protein sequences is selected (by inspection) and processed by the mosaic algorithm described in Fischer et al, (Nat. Med., (2007), 13:100-106), or the related "Epigraph" method in Theiler & Korber, (Stat. Med., (2018), 37 (2): 181-194) to generate synthetic high-coverage sequences.

FIG. 2B and FIG. 2D show tissue-culture propagation and plaque morphology of infectious-nucleic-acid of type O mosaic FLC and FMDLL3B3D constructs, respectively. Viral plaques (centers of viral replication) are seen as light spots on the darker background of uninfected cells in the plate. The plaque phenotypes of the FMDV LL3B3D O mosaic viral constructs are shown on BHK-21 and BHK-21αVβ6 monolayers stained at 72 and 48 hours respectively.

FIG. 3A and FIG. 3B provide one-step growth curves conducted in BHK or BHKαVβ6 for FLC and FMDLL3B3D of type O mosaic FMDV vaccine candidates, respectively. FIG. 3A: Growth characteristics of FMDV Full-length O mosaic virus constructs. In vitro one-step growth curves of FMDV O mosaic virus constructs compared to parental O1 Manisa (MOI 5) in BHK-21 cells. Samples obtained at indicated timepoints hours post infection (1, 4, 7, 24, hpi) were titrated in BHK-21 cells under a tragacanth overlay and stained with crystal violet at 48 hpi. FIG. 3B: Growth characteristics of FMDV LL3B3D O mosaic virus constructs. In vitro one-step growth curves of FMDV LL3B3D O mosaic virus constructs compared to parental O1 Manisa (MOI 5) in BHKαVβ6 cells. Samples obtained at indicated timepoints hours post infection (1, 3, 5, 8, 24, 48 hpi) were titrated in BHKαVβ6 cells under a tragacanth overlay and stained with crystal violet at 48 hpi.

FIG. 4A: Biophysical stability profile of parental O1 Campos, O1 Manisa and mosaic viruses O 2.1, O 2.2.2, O 2.2.6, and O 2.2.7. Purified virus was treated at 25° C. (RT) for 30 min at different pHs in triplicate. Post-incubation, viruses were neutralized and titrated to determine virus survival. The average titers and standard deviation of the replicates at each pH were plotted. FIG. 4B: Virus thermostability of purified parental and mosaic viruses treated for 30 min at different temperatures (4° C., 25° C., 37° C., 42° C.*, 47° C., 52° C., 55° C.) at a neutral pH, in triplicate. O1 Manisa 25° C. was conducted in duplicate (results for triplicate were not quantifiable). Post-incubation, viruses were chilled on ice and titrated to determine virus survival post-treatment. Bars indicate standard deviation of replicates. 42° C.* indicates that temperature fluctuated between a 42-45° C. range due to a mechanical fluctuation of the device.

Figures 6A, 6B, 6C:
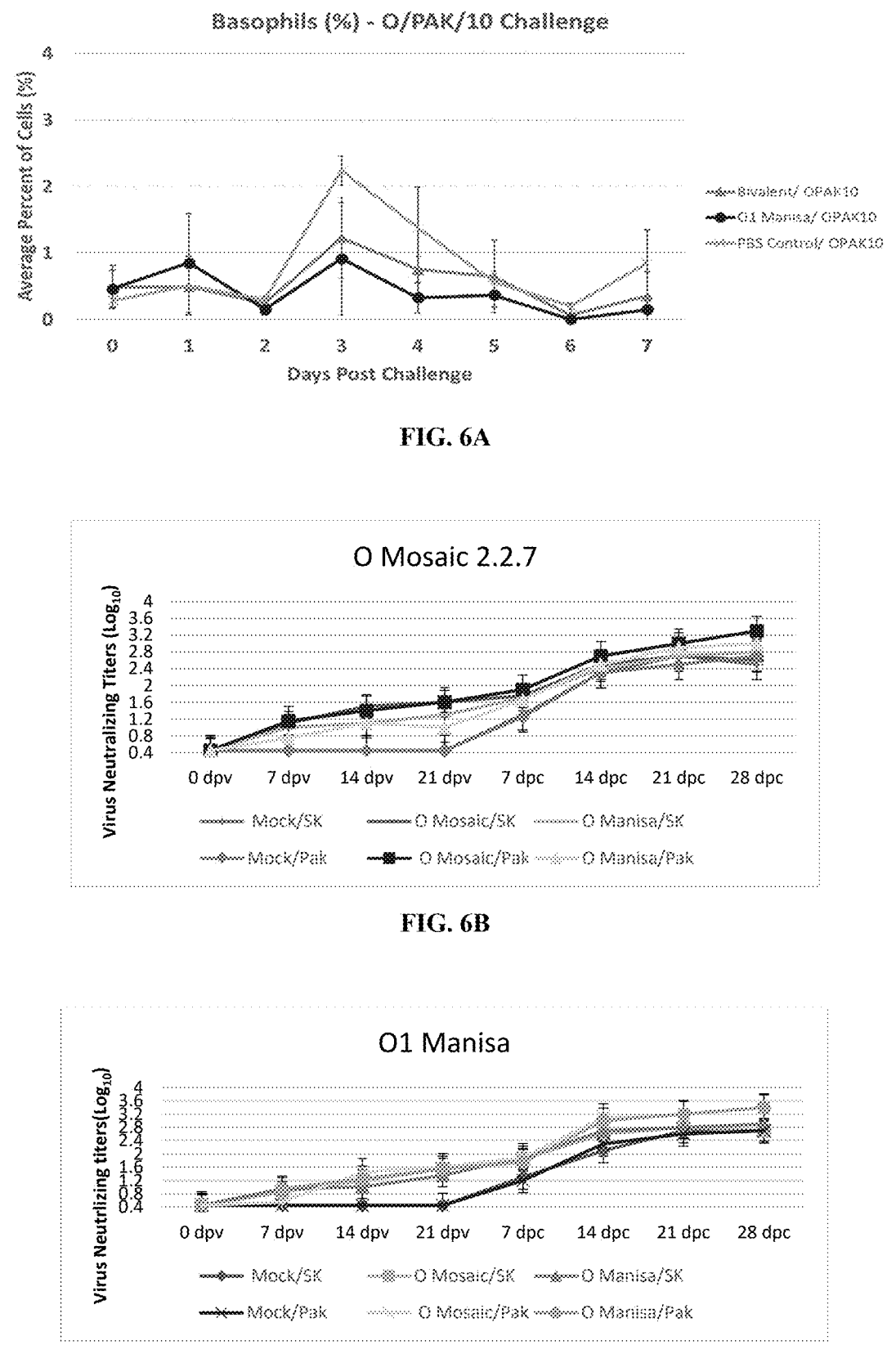

FIG. 6A, FIG. 6B, FIG. 6C, FIG. 6D, and FIG. 6E provide depictions of neutralizing antibody titers against FMDV vaccine strains (FIG. 6A, FIG. 6B, FIG. 6C) and FMDV challenge strains (FIG. 6D, FIG. 6E) in serum samples collected weekly from the day of vaccination until 28 days post-challenge. End-point titers are expressed as the reciprocal of the highest dilution of serum that protects 50% of the wells from FMDV-induced CPE. Each data point represents the mean (=S.D.) of each treatment group.

FIG. 7A and FIG. 7B depict an assessment of DIVA Diagnostic compatibility of animals vaccinated with parental O1 Manisa or O mosaic bivalent (FMD-LL3B3D) vaccines before and after heterologous challenge (O/SKR/10 or O/PAK/10) using (A) PrioCheck Assay or (B) VMRD FMDV NS Antibody ELISA Diagnostic Assay (Thermo Fisher Scientific). FIG. 7A shows results for PrioCheck serum collected previous to vaccination and at 0, 7 and 28 pays post-challenge. Samples with a percent inhibition (PI)

of 50 or less were considered negative while samples with a PI greater than 50 were considered positive as per manufacturer instructions. All treatment groups had 3 animals. FIG. 7B shows results for VMRD ELISA Test on serum collected previous to vaccination and at 0, 7 and 28 pays post-challenge. Samples with a percent inhibition (PI) of 40 or less were considered negative while samples with a PI greater than 40 were considered positive as per manufacturer instructions.

FIG. 9A: FMDV O/SKR/10 challenge. FIG. 9B: FMDV O/PAK/10 challenge.

FIG. 10A and FIG. 10B provide graphical representation of viremia in vaccinated and control pigs challenged with FMDV O1 Manisa. Viable FMDV detection in nasal swabs (FIG. 10A) and serum (FIG. 10B) was performed using plaque assays where indicated samples were titrated on BHK-21αVβ6 monolayers under a tragacanth overlay and stained with crystal violet at 48 hpi. Data presented are averaged values from four animals and error bars indicate standard deviations.

FIG. 11A (O Mosaic 2.1 vaccinated); FIG. 11B (PBS control); FIG. 11C (O1 Campos vaccinated); and FIG. 11D (O Mosaic 2.1 and 2.2.7 vaccinated). 5×10⁵ PBMCs were plated with live virus at an MOI of 5 overnight at 37 C (~18 hours) in wells of a Porcine T Cell IFNγ ELISpot plate (Mabtech). Post-incubation, ELISpot plates were developed as per the manufacturer's protocol. IFNγ spots were enumerated using an ImmunoSpot Analyzer (CTL). Spots from interferon gamma-secreting cells (ISCs) were calculated per 1×10⁶ cells using the mean number of spots formed in the duplicate wells per animal per treatment. ISCs from the unstimulated, media only, controls within each animal were subtracted from all corresponding wells to adjust for any background IFNγ production. These data underwent statistical analysis an ordinary two-way Analysis of Variance tests (ANOVA), incorporating Tukey's multiple comparison test. Statistical analyses were conducted using GraphPad Prism 9.4.1 (681) (GraphPad Software, LLC). 14 dpv is not available for the PBS/Control vaccinated animals, as they were humanely euthanized before that point in the experiment.

Figures 12C, 12D:
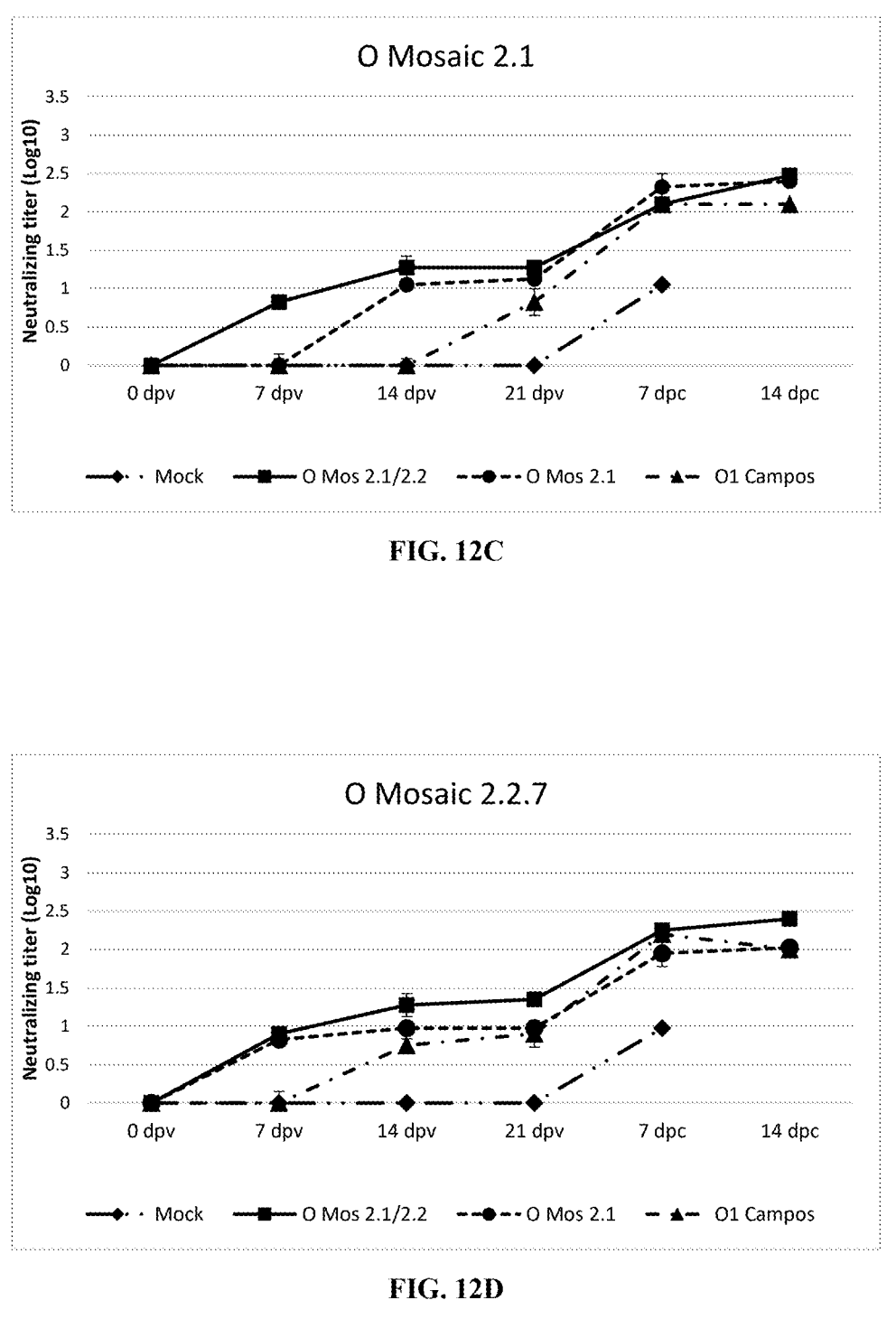

FIG. 12A, FIG. 12B, FIG. 12C, and FIG. 12D provide graphical representation of Neutralizing Antibody Titers against Vaccine and challenge strains of serotype O FMDV. FIG. 12A (O1 Manisa), FIG. 12B (O1 Campos), FIG. 12C (O Mosaic 2.1), and FIG. 12D (O Mosaic 2.2.7).

DETAILED DESCRIPTION OF THE INVENTION

Figure 2A:
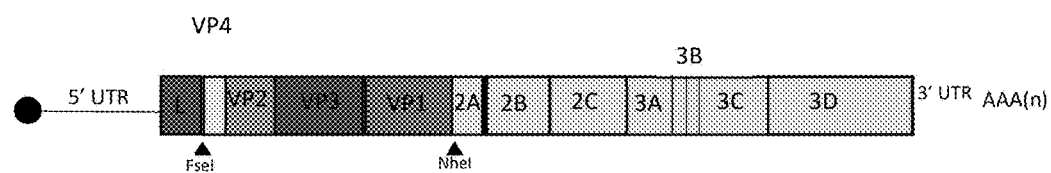
FIG. 2A, FIG. 2B, FIG. 2C and FIG. 2D show the derivation of type O mosaic FMDV vaccines. The FMDV genome organization of full-length clones (FLC, in FIG. 2A) and marker leaderless (FMDLL3B3D in FIG. 2C) type O mosaic FMDV mutants. The two unique restriction endonuclease sites (FseI and NheI) used to clone the mosaic capsids into the backbone (VP4-VP1) are shown (▲). The basic FMDV genome organization is shown depicting the locations of proteins encoded by the viral open reading frame (ORF) and elements encoded in the 5' and 3' untranslated region (UTR).

The present disclosure provides an FMD-LL3B3D vaccine platform incorporating mosaic capsid proteins. The FMD-LL3B3D vaccine platform lacks a functional $L^{pro}$ with a cassette feature allowing rapid swapping of antigens to address the multiple serotypes and subtypes of FMDV and contains DIVA (differentiating infected from vaccinated animals) negative markers in 3B and 3D (Uddowla et al, supra; Hardham et al, Front. Vet. Sci., (2020) 7:554305). Herein we further expand FMDV vaccine capabilities as we designed, constructed, and evaluated the FMD-LL3B3D vaccine platform with a Mosaic capsid to target a diverse range of serotype O FMDV strains. These vaccine constructs were created by cloning the O Mosaic capsids, designed to cover multiple FMDV serotype O subtypes in a polyvalent sequence, into an FMD-LL3B3D backbone which contains the negative markers in 3B and 3D, and the deletion of the leader coding region ($L^{pro}$) and one of three 3Bs.

Disclosed herein are synthetic FMDV mosaic proteins that have greater coverage of potential T-cell epitopes than do naturally occurring FMDV proteins. The synthetic FMDV mosaic polypeptides incorporate natural virus variability and include common FMDV subsequences but exclude rare FMDV subsequences. When included as part of an FMDV genome, the mosaic polypeptides permit viral replication and virus assembly into virus particles that are highly similar or identical in structure to native FMDV particles; however, the replacement of rare potential epitopes by common ones leads to in vivo immune responses to a wider range of FMDV strains than vaccines based on natural sequences alone. The mosaic polypeptide and nucleic acid compositions disclosed herein can be used to elicit immune responses that provide protection against a broad range of serotype A FMDV strains. Specific mosaic peptides against serotype O FMDV are provided as SEQ ID NO: 2, SEQ ID NO: 4, SEQ ID NO: 6, SEQ ID NO: 8, and SEQ ID NO: 10.

Preferred embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby.

Technical and scientific terms used herein have the meanings commonly understood by one of ordinary skill in the art to which the instant invention pertains, unless otherwise defined. Reference is made herein to various materials and methodologies known to those of skill in the art. Standard reference works setting forth the general principles of recombinant DNA technology include Sambrook et al., "Molecular Cloning: A Laboratory Manual", 2d ed., Cold Spring Harbor Laboratory Press, Plainview, N. Y., 1989; Kaufman et al., eds., "Handbook of Molecular and Cellular Methods in Biology and Medicine", CRC Press, Boca Raton, 1995; and McPherson, ed., "Directed Mutagenesis: A Practical Approach", IRL Press, Oxford, 1991. Standard reference literature teaching general methodologies and principles of fungal genetics useful for selected aspects of the invention include Sherman et al. "Laboratory Course Manual Methods in Yeast Genetics", Cold Spring Harbor Laboratory, Cold Spring Harbor, N.Y., 1986 and Guthrie et al., "Guide to Yeast Genetics and Molecular Biology", Academic, New York, 1991.

Any suitable materials and/or methods known to those of skill can be utilized in carrying out the instant invention. Materials and/or methods for practicing the instant invention are described. Materials, reagents and the like to which reference is made in the following description and examples are obtainable from commercial sources, unless otherwise noted.

As used in the specification and claims, use of the singular "a", "an", and "the" include plural references unless the context clearly dictates otherwise.

The terms isolated, purified, or biologically pure as used herein, refer to material that is substantially or essentially free from components that normally accompany the referenced material in its native state.

The term "about" is defined as plus or minus ten percent of a recited value. For example, about 1.0 g means 0.9 g to 1.1 g and all values within that range, whether specifically stated or not.

The term "a nucleic acid consisting essentially of", and grammatical variations thereof, means nucleic acids that differ from a reference nucleic acid sequence by 20 or fewer nucleic acid residues and also perform the function of the reference nucleic acid sequence. Such variants include sequences which are shorter or longer than the reference nucleic acid sequence, have different residues at particular positions, or a combination thereof.

The term "adjuvant", as used herein refers to a substance or vehicle that non-specifically enhances the immune response to an antigen. Adjuvants can include a suspension of minerals (alum, aluminum hydroxide, or phosphate) on which antigen is adsorbed; or water-in-oil emulsion in which antigen solution is emulsified in mineral oil (for example, Freund's incomplete adjuvant), sometimes with the inclusion of killed mycobacteria (Freund's complete adjuvant) to further enhance antigenicity. Immunostimulatory oligonucleotides (such as those including a CpG motif) can also be used as adjuvants (for example, see U.S. Pat. Nos. 6,194,388; 6,207,646; 6,214,806; 6,218,371; 6,239,116; 6,339,068; 6,406,705; and 6,429,199). Adjuvants also include biological molecules, such as costimulatory molecules. Exemplary biological adjuvants include IL-2, RANTES, GM-CSF, TNF-α, IFN-γ, G-CSF, LFA-3, CD72, B7-1, B7-2, OX-40L and 41 BBL.

The term "administer" or "administration" is to provide or give a subject an agent, such as a therapeutic agent (e.g. a recombinant virus), by any effective route. Exemplary routes of administration include, but are not limited to, injection (such as subcutaneous, intramuscular, intradermal, intraperitoneal, and intravenous), oral, intraductal, sublingual, rectal, transdermal, intranasal, vaginal and inhalation routes.

As used herein, the term "immune response" and grammatical variations thereof refers to a response of a cell of the immune system, such as a B-cell, T-cell, macrophage or polymorphonucleocyte, to a stimulus such as an antigen or vaccine. An immune response can include any cell of the body involved in a host defense response, including for example, an epithelial cell that secretes an interferon or a cytokine. An immune response includes, but is not limited to, an innate immune response or inflammation. As used herein, a protective immune response refers to an immune response that protects a subject from infection (prevents infection or prevents the development of disease associated with infection). Methods of measuring immune responses are well known in the art and include, for example, measuring proliferation and/or activity of lymphocytes (such as B or T cells), secretion of cytokines or chemokines, inflammation, antibody production and the like.

The term "immunogen" refers to a compound, composition, or substance which is capable, under appropriate conditions, of stimulating an immune response, such as the production of antibodies or a T-cell response in an animal, including compositions that are injected or absorbed into an animal.

The pharmaceutically acceptable carriers (vehicles) useful in this disclosure are conventional. *Remington's Pharmaceutical Sciences*, by E. W. Martin, Mack Publishing Co., Easton, PA, 15th Edition (1975), describes compositions and formulations suitable for pharmaceutical delivery of one or more therapeutic compounds, molecules or agents (e.g. a mosaic polypeptide or recombinant virus disclosed herein). A suitable carrier can be determined by one skilled in the art. In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

"Polypeptide", "peptide" and "protein" refers to a polymer in which the monomers are amino acid residues which are joined together through amide bonds. When the amino acids are alpha-amino acids, either the L-optical isomer or the D-optical isomer can be used. The terms "polypeptide," "peptide" and "protein" are used interchangeably herein. These terms apply to amino acid polymers in which one or more amino acid residue is an artificial chemical mimetic of a corresponding naturally occurring amino acid, as well as to naturally occurring amino acid polymers and non-naturally occurring amino acid polymers. The term "residue" or "amino acid residue" includes reference to an amino acid that is incorporated into a protein, polypeptide, or peptide.

A conservative substitution in a polypeptide is a substitution of one amino acid residue in a protein sequence for a different amino acid residue having similar biochemical properties. Typically, conservative substitutions have little to no impact on the activity of a resulting polypeptide. For example, a protein or peptide including one or more conservative substitutions (for example no more than 1, 2, 3, 4 or 5 substitutions) retains the structure and function of the wild-type protein or peptide. A polypeptide can be produced to contain one or more conservative substitutions by manipulating the nucleotide sequence that encodes that polypeptide using, for example, standard procedures such as site-directed mutagenesis or PCR. In one example, such variants can be readily selected by testing antibody cross-reactivity or its ability to induce an immune response. Conservative substitutions are well known in the art.

Conservative substitutions generally maintain (a) the structure of the polypeptide backbone in the area of the substitution, for example, as a sheet or helical conformation, (b) the charge or hydrophobicity of the molecule at the target site, or (c) the bulk of the side chain.

The substitutions which in general are expected to produce the greatest changes in protein properties will be non-conservative, for instance changes in which (a) a hydrophilic residue, for example, seryl or threonyl, is substituted for (or by) a hydrophobic residue, for example, leucyl, isoleucyl, phenylalanyl, valyl or alanyl; (b) a cysteine or proline is substituted for (or by) any other residue; (c) a residue having an electropositive side chain, for example, lysyl, arginyl, or histadyl, is substituted for (or by) an electronegative residue, for example, glutamyl or aspartyl; or (d) a residue having a bulky side chain, for example, phenylalanine, is substituted for (or by) one not having a side chain, for example, glycine.

"Preventing" a disease refers to inhibiting the full development of a disease. "Treating" refers to a therapeutic intervention that ameliorates a sign or symptom of a disease or pathological condition after it has begun to develop. "Ameliorating" refers to the reduction in the number or severity of signs or symptoms of a disease.

A "recombinant" nucleic acid molecule, protein or virus is one that has a sequence that is not naturally occurring or has a sequence that is made by an artificial combination of two otherwise separated segments of sequence. This artificial combination can be accomplished by chemical synthesis or by the artificial manipulation of isolated segments of nucleic acid molecules, such as by genetic engineering techniques. The term "recombinant" also includes nucleic acids, proteins and viruses that have been altered solely by addition, substitution, or deletion of a portion of the natural nucleic acid molecule, protein or virus.

For the purpose of this invention, the "sequence identity" of two related nucleotide or amino acid sequences, expressed as a percentage, refers to the number of positions in the two optimally aligned sequences which have identical residues (×100) divided by the number of positions compared. A gap, i.e., a position in an alignment where a residue is present in one sequence but not in the other is regarded as a position with non-identical residues. The alignment of the two sequences is performed by the Needleman and Wunsch algorithm (Needleman and Wunsch, J Mol Biol, (1970) 48:3, 443-53). A computer-assisted sequence alignment can be conveniently performed using a standard software program such as GAP which is part of the Wisconsin Package Version 10.1 (Genetics Computer Group, Madison, Wisconsin, USA) using the default scoring matrix with a gap creation penalty of 50 and a gap extension penalty of 3.

The phrase "high percent identical" or "high percent identity", and grammatical variations thereof in the context of two polynucleotides or polypeptides, refers to two or more sequences or sub-sequences that have at least about 80%, identity, at least about 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, or 100% nucleotide or amino acid identity, when compared and aligned for maximum correspondence, as measured using a sequence comparison algorithm or by visual inspection. In one exemplary embodiment, the sequences are high percent identical over the entire length of the polynucleotide or polypeptide sequences.

The term "subject" refers to a living multi-cellular vertebrate organism, a category that includes human and non-human mammals. In some embodiments herein, the subject is a cloven-footed animal, such as, but not limited to, a cow, pig, sheep, goat, deer, antelope, water buffalo or bison.

The term "vaccine" refers to a preparation of immunogenic material capable of stimulating an immune response, administered for the prevention, amelioration, or treatment of disease, such as an infectious disease. The immunogenic material may include, for example, attenuated or killed microorganisms (such as attenuated viruses), or antigenic proteins, peptides or DNA derived from an infectious microorganism. Vaccines may elicit both prophylactic (preventative) and therapeutic responses. Methods of administration vary according to the vaccine, but may include inoculation, ingestion, inhalation or other forms of administration.

Inoculations can be delivered by any of a number of routes, including parenteral, such as intravenous, subcutaneous or intramuscular. Vaccines may be administered with an adjuvant to boost the immune response.

Mosaic Peptides

The mosaic proteins described herein resemble natural proteins and maximize the coverage of potential T-cell epitopes for a viral population (Fischer et al, Nat. Med., (2007), 13 (1): 100-106; Barouch et al, Nat. Med., (2010), 16 (3): 319-323). Humoral responses against FMDV (development of virus neutralizing antibodies) have historically been relied upon as a correlation with protection, however it has been shown that this is not always the case (Mccullough et al, J. Virol., (1992), 66 (4): 1835; Sobrino et al, Vet. Res., (2001), 32 (1): 1-30). Optimization for potential T-cell epitopes in this case means simply optimization for conserved linear amino-acid sequence, which is likely to preserve many antibody epitopes as well;

vaccination with mosaic immunogens has been demonstrated to induce neutralizing antibodies directed towards rabies glycoprotein (Stading et al, PLOS Negl. Trop. Dis., (2017), 11 (10): e0005958) and protective antibodies to HIV-1 Env (Barouch, D. H., New Engl. J. Med., (2013), 369 (22): 2073-2076). Because a balanced immune response plays a role in protection from FMDV infection (Becker, Y., Virus Genes, (1994), 8 (3): 199-214; Sobrino et al, supra), FMDV-directed T-cell responses have been assessed in terms of IFNγ production. In vitro IFNγ responses have been measured in different capacities in FMD research from ELISA to T cell specific population assessment, MHC analysis, in vitro stimulation with inactivated FMD virus, or peptide pools using flow cytometry, ELISA and occasionally ELISpot assays (Zhang et al, Arch. Virol., (2002), 147 (11): 2157-2167; Parida et al, Vaccine, (2006), 24 (7): 964-969; Guzman et al, J. Virol., (2010), 84 (23): 12375; Toka et al, J. Immunol., (2011), 186 (8): 4853; Oh et al, PLOS One, (2012), 7 (9): e44365; Carr et al, J. Gen. Virol., (2013), 94 (Pt 1): 97-107; Bucafusco et al, Virol., (2015), 476:11-18; Sharma et al, Microb. Pathogen., (2018), 125:20-25). IFNγ has been shown to respond specifically against FMDV (Oh et al, supra; Bucafusco et al, supra; Sharma et al, supra).

The integrity and biophysical stability of FMD virus particles has been correlated with the capacity of these viruses to induce a protective immune response in susceptible species (Doel & Baccarini, Arch. Virol., (1981), 70 (1): 21-32; López-Argüello et al, J. Virol., (2019), 93 (10): e02293-02218). Though a certain amount of stability is needed to survive environments not naturally conducive to viral survival, at the same time, viruses (Doel & Chong, Arch. Virol., (1982), 73 (2): 185-191; Mateo et al, J. Virol., (2008), 82 (24): 12232-40; Rincón et al, Structure, (2014), 22 (11): 1560-1570) may need some instability to infect and propagate in their host environment (López-Argüello et al, supra).

Wildtype FMDV stability varies between serotypes, with serotype A generally being considered stable in contrast to serotype O viruses, which are less stable (Doel & Baccarini, supra). Previous attempts to create attenuated FMD vaccines have been largely unsuccessful because they have produced unstable phenotypes, demonstrate pathogenic profiles in animals, and most often fail to induce an adequate protective immune response against FMDV infection (Mowat et al, Nature, (1962), 196:655-656; Martin & Edwards, Res. Vet. Sci., (1965), 6:196-201; Mowat et al, Arch. Gesamte Virusforsch, (1969), 26 (4): 341-354; Zhidkov & Sergeev, Veterinariia, (1969), 10:29-31). In addition to a vaccine with broad antigenic coverage targeted to induce specific immune responses, a stably attenuated FMDV construct will provide a safe platform to rapidly produce inactivated antigen vaccines.

Disclosed herein are synthetic FMDV mosaic polypeptides that have greater T-cell epitope coverage than naturally occurring FMDV polypeptides. When included as part of an FMDV genome, the mosaic polypeptides permit viral replication and virus assembly into structures that are highly similar or identical to native FMDV particles. The mosaic polypeptide and nucleic acid compositions disclosed herein can be used to elicit immune responses that provide protection against a broad range of serotype A FMDV strains.

In specific embodiments provided herein, FMDV polypeptides have an amino acid sequence at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% identical to mosaic polypeptide O2.1 (SEQ ID NO: 2), mosaic polypeptide O2.2.1 (SEQ ID NO: 4), mosaic polypeptide O2.2.2 (SEQ ID NO: 6), mosaic polypeptide O2.2.6 (SEQ ID NO: 8), or mosaic polypeptide O2.2.7 (SEQ ID NO: 10). In some embodiments, the synthetic FMDV polypeptide includes the amino acid sequence of SEQ ID NO: 2, SEQ ID NO: 4, SEQ ID NO: 6, SEQ ID NO: 8, or SEQ ID NO: 10. In specific examples, the synthetic FMDV polypeptide consists of the amino acid sequence of SEQ ID NO: 2, SEQ ID NO: 4, SEQ ID NO: 6, SEQ ID NO: 8, or SEQ ID NO: 10.

Recombinant FMDV that include mosaic polypeptides are also provided herein. In some embodiments, the recombinant FMDV includes a synthetic FMDV polypeptide having an amino acid sequence at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% identical to mosaic polypeptide O2.1 (SEQ ID NO: 2), mosaic polypeptide O2.2.1 (SEQ ID NO: 4), mosaic polypeptide O2.2.2 (SEQ ID NO: 6), mosaic polypeptide O2.2.6 (SEQ ID NO: 8), or mosaic polypeptide O2.2.7 (SEQ ID NO: 10). In some embodiments, the recombinant FMDV includes a synthetic FMDV polypeptide comprising the amino acid sequence of SEQ ID NO: 2, SEQ ID NO: 4, SEQ ID NO: 6, SEQ ID NO: 8, or SEQ ID NO: 10. In specific examples, the recombinant FMDV includes a synthetic FMDV polypeptide consisting of the amino acid sequence of SEQ ID NO: 2, SEQ ID NO: 4, SEQ ID NO: 6, SEQ ID NO: 8, or SEQ ID NO: 10.

Further provided herein are nucleic acid molecules encoding mosaic FMDV polypeptides. In some embodiments, the nucleic acid encodes a synthetic FMDV polypeptide having an amino acid sequence at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% identical to mosaic polypeptide O2.1 (SEQ ID NO: 2), mosaic polypeptide O2.2.1 (SEQ ID NO: 4), mosaic polypeptide O2.2.2 (SEQ ID NO: 6), mosaic polypeptide O2.2.6 (SEQ ID NO: 8), or mosaic polypeptide O2.2.7 (SEQ ID NO: 10). In some embodiments, the nucleic acid molecule encodes a synthetic FMDV polypeptide comprising the amino acid sequence of SEQ ID NO: 2, SEQ ID NO: 4, SEQ ID NO: 6, SEQ ID NO: 8, or SEQ ID NO: 10. In specific examples, the nucleic acid molecule encodes a synthetic FMDV polypeptide consisting of the amino acid sequence of SEQ ID NO: 2, SEQ ID NO: 4, SEQ ID NO: 6, SEQ ID NO: 8, or SEQ ID NO: 10. In some embodiments, the nucleic acid molecule has a nucleotide sequence at least 80%, at least 85%, at least 90%, at least 95%, at least 96%, at least 97%, at least 98% or at least 99% identical to SEQ ID NO: 1, SEQ ID NO: 3, SEQ ID NO: 5, SEQ ID NO: 7, or SEQ ID NO: 9. In some examples, the nucleic acid molecule has a nucleotide sequence comprising SEQ ID NO: 1, SEQ ID NO: 3, SEQ ID NO: 5, SEQ ID NO: 7, or SEQ ID NO: 9. In particular non-limiting examples, the nucleic acid molecule has a nucleotide sequence consisting of SEQ ID NO: 1, SEQ ID NO: 3, SEQ ID NO: 5, SEQ ID NO: 7, or SEQ ID NO: 9.

Vectors comprising the mosaic FMDV polypeptide-encoding nucleic acid molecules are also provided by the present disclosure. In some embodiments, the vector further includes coding sequences for other native or recombinant proteins, whereupon transfection of the vector into a permissive host cell, infectious FMDV is produced.

Also provided herein are compositions that include at least one mosaic FMDV polypeptide, at least one recombinant FMDV, or at least one mosaic FMDV polypeptide encoding nucleic acid or at least one vector disclosed herein.

In some embodiments, provided is a composition that includes a mosaic FMDV polypeptide having an amino acid sequence at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% identical to mosaic polypeptide O2.1 (SEQ ID NO: 2), mosaic polypeptide O2.2.1 (SEQ ID NO: 4), mosaic polypeptide O2.2.2 (SEQ ID NO: 6), mosaic polypeptide O2.2.6 (SEQ ID NO: 8), or mosaic polypeptide O2.2.7 (SEQ ID NO: 10) and a pharmaceutically acceptable carrier.

In some examples, the composition includes one or more mosaic FMDV polypeptides comprising or consisting of at least 80%, at least 85%, at least 90%, at least 95%, at least 96%, at least 97%, at least 98%, at least 99%, at least 99.1%, at least 99.2%, at least 99.3%, at least 99.4%, at least 99.5%, at least 99.6%, at least 99.7%, at least 99.8%, or at least 99.9% identical to mosaic polypeptide O2.1 (SEQ ID NO: 2), mosaic polypeptide O2.2.1 (SEQ ID NO: 4), mosaic polypeptide O2.2.2 (SEQ ID NO: 6), mosaic polypeptide O2.2.6 (SEQ ID NO: 8), or mosaic polypeptide O2.2.7 (SEQ ID NO: 10. Any of these compositions can further comprise a pharmaceutically acceptable carrier.

Further provided herein are compositions that include a vector that includes a mosaic FMDV polypeptide-encoding nucleic acid molecule disclosed herein. In some embodiments, the composition includes a vector comprising a nucleic acid molecule having at least 80%, at least 85%, at least 90%, at least 95%, at least 96%, at least 97%, at least 98% or at least 99% identity to SEQ ID NO: 1, SEQ ID NO: 3, SEQ ID NO: 5, SEQ ID NO: 7, or SEQ ID NO: 9. Such compositions can further comprise a pharmaceutically acceptable carrier. In some examples, the composition includes a first vector comprising a nucleic acid molecule having at least 80%, at least 85%, at least 90%, at least 95%, at least 96%, at least 97%, at least 98% or at least 99% identity to SEQ ID NO: 1, SEQ ID NO: 3, SEQ ID NO: 5, SEQ ID NO: 7, or SEQ ID NO: 9, and a second vector comprising a nucleic acid molecule having at least 80%, at least 85%, at least 90%, at least 95%, at least 96%, at least 97%, at least 98% or at least 99% identity to SEQ ID NO: 1, SEQ ID NO: 3, SEQ ID NO: 5, SEQ ID NO: 7, or SEQ ID NO: 9, where the second vector has a different sequence to the first vector. Such compositions can also include a pharmaceutically acceptable carrier.

Any of the compositions provided herein can optionally include an adjuvant.

Further provided herein are methods of eliciting an immune response against serotype O FMDV in a subject. In some embodiments, the method includes administering to the subject a synthetic FMDV mosaic polypeptide, a recombinant FMDV, a nucleic acid molecule, a vector, or a composition disclosed herein. In some examples, the subject is a cow.

Also provided herein are methods of immunizing a subject against serotype O FMDV. In some embodiments, the method includes administering to the subject a synthetic FMDV mosaic polypeptide, a recombinant FMDV, a nucleic acid molecule, a vector, or a composition disclosed herein. In some examples in which the recombinant FMDV is administered, the recombinant FMDV is inactivated (such as with BEI) prior to administration. In some embodiments of the methods provided herein, the subject is a cloven-footed animal. In some examples, the cloven-footed animal is a cow, pig, sheep, goat, deer, antelope, water buffalo or bison.

Administration of Mosaic FMDV Vaccine Compositions

The FMDV mosaic polypeptide and polynucleotide compositions described herein can be administered to a subject using any suitable delivery means. For example, FMDV polynucleotides or polypeptides can be administered parenterally, by injection, subcutaneously, intramuscularly, transdermally or transcutaneously. Certain adjuvants, for example LTK63, LTR72 or PLG formulations, can be administered intranasally or orally. Additional formulations that are suitable for other modes of administration include suppositories. For suppositories, traditional binders and carriers can include, for example, polyalkylene glycols or triglycerides; such suppositories can be formed from mixtures containing the active ingredient in the range of 0.5% to 10%, such as 1%-2%. Other oral formulations include such normally employed excipients as, for example, pharmaceutical grades of mannitol, lactose, starch, magnesium stearate, sodium saccharine, cellulose, magnesium carbonate, and the like. These compositions take the form of solutions, suspensions, tablets, pills, capsules, sustained release formulations or powders and contain 10%-95% of active ingredient, such as 25%-70%.

The FMDV mosaic vaccines disclosed herein can be prepared as injectables, either as liquid solutions or suspensions. Solid forms suitable for solution or suspension in liquid prior to injection may also be prepared. Such preparations can also be emulsified or encapsulated in liposomes. In some instances, the vaccine also includes a pharmaceutically acceptable carrier.

Pharmaceutically acceptable carriers are well known to those in the art, and include without limitation large, slowly metabolized macromolecules, such as proteins, polysaccharides, functionalized sepharose, agarose, cellulose, cellulose beads and the like, polylactic acids, polyglycolic acids, polymeric amino acids such as polyglutamic acid, polylysine, and the like.

The FMDV mosaic vaccines disclosed herein can be formulated into an immunogenic compound as neutral or salt forms. Pharmaceutically acceptable salts include the acid addition salts (formed with free amino groups of the peptide) and those formed with inorganic acids such as, for example, hydrochloric or phosphoric acids, or organic acids such as acetic, oxalic, tartaric, maleic, and the like. Salts formed with the free carboxyl groups can also be derived from inorganic bases such as, for example, sodium, potassium, ammonium, calcium, or ferric hydroxides, and such organic bases as isopropylamine, trimethylamine, 2-ethylamino ethanol, histidine, procaine, and the like.

Vaccine compositions can also contain liquids or excipients, such as water, saline, glycerol, dextrose, ethanol, or the like, singly or in combination, as well as substances such as wetting agents, emulsifying agents, or pH buffering agents. Liposomes can also be used as a carrier for a composition disclosed herein.

Various co-stimulatory molecules can be included in the vaccine preparation or delivery protocol. These molecules can improve immunogen presentation to lymphocytes and include such proteins as B7-1 or B7-2, and cytokines such as GM-CSF, IL-2, and IL-12. Optionally, adjuvants can also be included in a composition. Various adjuvants may be used, including (1) aluminum salts (alum), such as aluminum hydroxide, aluminum phosphate, or aluminum sulfate; (2) oil-in-water emulsion formulations (with or without other specific immunostimulating agents such as muramyl peptides or bacterial cell wall components); (3) saponin adjuvants, or particles generated therefrom such as ISCOMs (immunostimulating complexes); (4) Complete Freund's Adjuvant (CFA) and Incomplete Freund's Adjuvant (IFA); (5) cytokines, such as interleukins (for example, IL-1, IL-2, IL-4, IL-5, IL-6, IL-7, or IL-12), interferons (for example, gamma interferon), macrophage colony stimulating factor (M-CSF), or tumor necrosis factor (TNF); (6) detoxified mutants of a bacterial ADP-ribosylating toxin such as a cholera toxin (CT), a pertussis toxin (PT), or an *E. coli* heat-labile toxin (LT); (7) other substances that act as immunostimulating agents to enhance the effectiveness of the composition; and (8) microparticles with adsorbed macromolecules.

The FMDV mosaic vaccine compositions disclosed herein can be administered in a manner compatible with the dosage formulation, and in such amount as will be prophylactically and/or therapeutically effective. The quantity to be administered depends on the subject to be treated, the capacity of the subject's immune system, and the degree of protection desired. Precise amounts of active ingredient required to be administered may depend on the judgment of the practitioner and can be specific to each subject.

Vaccine formulations can be introduced in a single dose schedule, or in a multiple dose schedule. A multiple dose schedule is one in which a primary course of vaccination can be with 1-10 separate doses, followed by other doses given at subsequent time intervals required to maintain and or reinforce the immune response, for example, at 1-4 months for a second dose, and if needed, a subsequent dose(s) after several months.

The course of administration can include polynucleotides and polypeptides, together or sequentially (for example, priming with a polynucleotide composition and boosting with a polypeptide composition). The dosage regimen will also, at least in part, be determined by the need of the individual and be dependent upon the judgment of the practitioner.

Nucleic acid molecules and vectors comprising expressible polynucleotides encoding FMDV mosaic proteins can be formulated and utilized as DNA vaccine preparations. Such FMDV mosaic DNA vaccines can be used to activate FMDV-specific T cells, using standard gene delivery protocols. Methods for gene delivery are known in the art (see, for example, U.S. Pat. Nos. 5,399,346, 5,580,859, 5,589,466, incorporated by reference herein in their entireties). Genes can be delivered either directly to the vertebrate subject or, alternatively, delivered ex vivo, to cells derived from the subject and the cells reimplanted in the subject. For example, the constructs can be delivered as plasmid DNA, or viral vector DNA.

DNA vaccines can be introduced by a number of different methods, including by injection of DNA in saline, using a standard hypodermic needle. Injection in saline is typically conducted intramuscularly in skeletal muscle, or intradermally, with DNA being delivered to the extracellular spaces. This can be assisted by electroporation, by temporarily damaging muscle fibers with myotoxins such as bupivacaine or by using hypertonic solutions of saline or sucrose. Immune responses to this method of delivery can be affected by many factors, including needle type, needle alignment, speed of injection, volume of injection, muscle type, and age, sex and physiological condition of the individual being injected.

The method of delivery determines the dose of DNA required to raise an effective immune response. Saline injections require variable amounts of DNA, from 10 ug-1 mg, whereas gene gun deliveries require 100 to 1000 times less DNA than intramuscular saline injection to raise an effective immune response. Generally, 0.2 ug to 20 ug are required, although quantities as low as 16 ng have been utilized. Saline injections require more DNA because the DNA is delivered to the extracellular spaces of the target tissue (typically, muscle tissue), where physical barriers such as the basal lamina and large amounts of connective tissue must be overcome before it is taken up by the cells, while gene gun deliveries bombard DNA directly into the cells.

FMDV mosaic nucleic acid vaccines can be packaged in liposomes prior to delivery to cells. Lipid encapsulation is generally accomplished using liposomes which are able to stably bind or entrap and retain nucleic acid. The ratio of condensed DNA to lipid preparation can vary but will generally be around 1:1 (mg DNA: micromoles lipid), or more of lipid. Liposomal preparations for use with the disclosed FMDV vaccines include cationic (positively charged), anionic (negatively charged) and neutral preparations.

The FMDV mosaic nucleic acid vaccines can also be encapsulated, adsorbed to, or associated with, particulate carriers. Such carriers present multiple copies of a selected molecule to the immune system and promote trapping and retention of molecules in local lymph nodes. The particles can be phagocytosed by macrophages and can enhance antigen presentation through cytokine release. Examples of particulate carriers include those derived from polymethyl methacrylate polymers, as well as microparticles derived from poly (lactides) and poly (lactide-co-glycolides), known as PLG (see, for example, Jeffery et al., Pharm Res 10:362-368, 1993).

Assessing Efficacy of FMDV Mosaic Vaccines

The ability of a particular mosaic protein or vaccine composition to stimulate a cell-mediated immunological response can be determined by any one of a number of assays, such as by lymphoproliferation (lymphocyte activation) assays, cytotoxic T lymphocyte (CTL) assays, or by assaying for T-lymphocytes specific for the antigen in a sensitized subject. Such assays are well known in the art (Erickson et al., J Immunol., (1993) 151:4189-4199; Doe et al., Eur J Immunol., (1994), 24:2369-2376). Thus, an immunological response can be one that stimulates the production of CTLs and/or the production or activation of helper T-cells. The antigen of interest can also elicit an antibody-mediated immune response that is important for the induction of protective immunity. Such assays are well described in the OIE manual (Manual of diagnostic test and vaccines for terrestrial animals, 2004 (5th edition)), Office International des Epizooties, Paris (2004), and in the literature (Tekleghiorghis et al., Clin. Vaccine Immunol., (2014) 21 (5): 674-683). Hence, an immunological response may include one or more of the following effects: the production of antibodies by B-cells and/or the activation of suppressor T-cells.

Various means for estimating or actually measuring the protective immune response generated by an FMDV mosaic vaccine preparation disclosed herein can be utilized, including without limitation, in silico analytical methods designed to determine the degree of T-cell epitope coverage provided by a particular mosaic protein or combination thereof, and in vivo methods of evaluating the FMDV mosaic vaccine preparations in animals, such as cattle.

Epitopes recognized by a T cell receptor on an FMDV-activated T cell can be identified by, for example, a 51Cr release assay or by a lymphoproliferation assay, as is well known in the art. In a 51Cr release assay, target cells that display the epitope of interest are prepared, for instance by cloning a polynucleotide encoding the epitope into an expression vector and transforming the expression vector into the target cells. Target cells are incubated with 51Cr for labeling and then mixed with subject-derived T cells, after which the cytolytic activity of T cells is measured by the release of 51Cr-bound protein into the medium.

Those skilled in the art will recognized that such analyses of efficacy are merely provided as examples. Any currently known, or later developed, assays can be chosen and utilized by the skilled artisan to determine efficacy of the vaccines detailed herein.

Having generally described this invention, the same will be better understood by reference to certain specific examples, which are included herein to further illustrate the invention and are not intended to limit the scope of the invention as defined by the claims.

EXAMPLES

Example 1

Design and construction of FMDV serotype O mosaic immunogen cocktails

Figure 1:
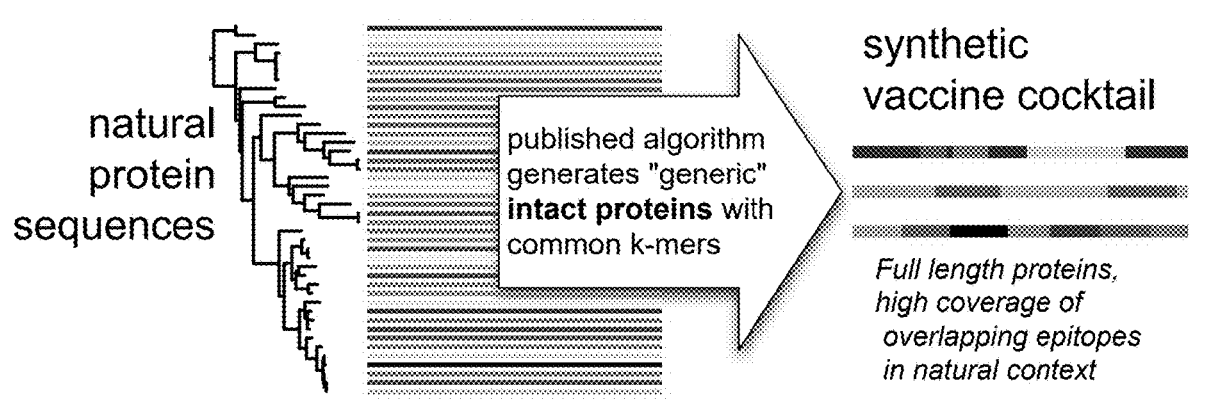

Mosaic sequences to be used as immunogens were designed based on sequences available from GenBank as of Oct. 26, 2018. Briefly, FMDV capsid-encoding nucleic acid sequences were retrieved via 'tblastn' (Gertz et al, BMC Biol., (2006), 4:41, restricted to txid12110 (foot-and-mouth disease virus), using three diverse capsid sequences as the query: isolate UGA/02/97/3 (serotype SAT 3; GenBank accession DQ009742); PAK/29/2008 (serotype O; GenBank accession GU384684). Near-full-length capsid-encoding sequences were selected, aligned (Katoh & Standley, Mol. Biol. Evol., (2013), 30 (4): 772-780), and sorted by an approximate maximum-likelihood phylogenetic tree (Price et al, PLOS One (2010), 5 (3): e9490). Serotype O sequences were selected by inspection from the sorted sequence alignment. To ensure balanced representation, duplicate and near-duplicate sequences were removed (based on a threshold of 99.5% sequence identity) (FIG. 1).

We summarize coverage by a vaccine of potential epitopes in natural pathogen sequences as mean coverage of 9-mers per sequence, that is, the fraction of 9-mers in each natural sequence that are present in the vaccine, averaged over all the natural sequences in the data set. Table 1 includes coverage values for two natural strains of serotype O FMDV, O1/Campos and O1/Manisa, as well as for individual mosaic sequences and mosaic 2- and 3-sequence cocktails, showing the fraction of amino-acid 9-mers (i.e. all overlapping stretches of 9 amino-acids) that are, on average, matched by each vaccine candidate. Because T cells may recognize epitopes that differ from their defined recognition sequence by one or two amino acids, we include columns for those approximate matches as well.

TABLE 1

Mean per-sequence coverage of amino-acid 9-mers in the FMDV serotype O working set.

| Vaccine candidate | Number of proteins | Exact 9-mers | 1-off 9-mers | 2-off 9-mers |
| --- | --- | --- | --- | --- |
| O1/Campos-AJ320488 | 1 | 0.663292 | 0.211374 | 0.083963 |
| O1/Manisa-AJ251477 | 1 | 0.708826 | 0.201857 | 0.043391 |
| Mosaic 2.1 | 1 | 0.794613 | 0.159932 | 0.030856 |
| Mosaic 2.2.1 | 1 | 0.638853 | 0.243911 | 0.080876 |
| Mosaic 2.2.2 | 1 | 0.701949 | 0.199927 | 0.063556 |
| Mosaic 2.2.6 | 1 | 0.750457 | 0.189819 | 0.036882 |
| Mosaic 2.2.7 | 1 | 0.713144 | 0.205163 | 0.052734 |
| Mosaic 2.1 + 2.2.6 | 2 | 0.821831 | 0.139922 | 0.026831 |
| Mosaic 2.1 + 2.2.2 | 2 | 0.826195 | 0.137979 | 0.024198 |
| Mosaic 2.1 + 2.2.7 | 2 | 0.835048 | 0.126869 | 0.026891 |
| Mosaic 2.1 + 2.2.1 | 2 | 0.838756 | 0.126387 | 0.023604 |
| Mosaic 2.1 + 2.2.2 + 2.2.7 | 3 | 0.853174 | 0.117126 | 0.021268 |
| Mosaic 2.1 + 2.2.1 + 2.2.2 | 3 | 0.853436 | 0.117604 | 0.019541 |
| Mosaic 2.1 + 2.2.1 + 2.2.6 | 3 | 0.857534 | 0.113198 | 0.020714 |
| Mosaic 2.1 + 2.2.1 + 2.2.7 | 3 | 0.864616 | 0.106401 | 0.020744 |

Nucleotide sequences were translated to amino acids and the resulting protein sequences were used as input for the Epigraph algorithm (Theiler & Korber, supra), which produces output substantially equivalent to that of the original mosaic algorithm (Fischer et al, supra) but with greatly increased computational efficiency and provable optimality. A value of 9 was used for potential epitope length. Initial mosaic cocktail designs with 1, 2, 4, and 6 sequences were evaluated in terms of 9-mer amino-acid coverage. A two-sequence cocktail design was selected for vaccine construction; several different alternatives "second" elements were subsequently designed, each based on a different serotype O subclade.

Retrieval of FMDV capsid-encoding nucleic acid sequences from GenBank via 'tblastn' resulted in 7,125 hits, representing 1,630 unique near-full-length (at least 1,350 nt) sequences encoding proteins VP1-VP4. These included 824 serotype O sequences; duplicate and near-duplicate yielded a final working set of 197 amino-acid sequences.

The initial set of mosaic sequences chosen for production was a 2-sequence cocktail (with proteins denoted mosaic O2.1 and O2.2). Viable replicating viruses were recovered for Mosaic 2.1, but not for Mosaic 2.2. Therefore, we designed additional candidates (2.2.1-2.2.7), each of which was derived from a single phylogenetically clustered subset of serotype O sequences. Each of these secondary candidates was evaluated for use in combination with Mosaic 2.1 as a two-sequence cocktail.

In terms of total coverage, the single Mosaic 2.1 was substantially better than either of the two natural sequences (Table 1). Of the two-sequence cocktails that incorporated Mosaic 2.1 and any one of Mosaics 2.2.1, 2.2.2, 2.2.6, and 2.2.7, all of them showed additional phylogenetic breadth and were similar in overall score. Because the mosaics 2.1+2.2.7 cocktail evidenced superior coverage for the generally recent clade 7, and only deficits for the older clade 2, we decided to advance this combination for further vaccine development.

For virus construction, amino-acid immunogen sequences were reverse-translated to DNA based on column-specific codon frequencies in the original nucleotide sequence alignment; each amino acid was represented by the most common nucleotide triplet that encoded that amino acid at that particular column in the sequence alignment.

Construction and Derivation of Mosaic Full Genome and FMD-LL3B3D Viruses

BHK-21 cells (baby hamster kidney cells strain 21, clone 13, ATCC CL10), were obtained from the American Type Culture Collection (ATCC, Rockville, MD); BHK-21 cells expressing bovine alpha-V Beta-6 integrins (BHKαVβ6) were developed in-house and maintained as previously reported (Rieder et al, J. Virol., (2005), 79 (20): 12989-12998). Porcine kidney cells expressing αVβ6 integrins (LFBKαVβ6) were propagated in Dulbecco's modified Eagle medium (DMEM) supplemented with 10% fetal bovine serum and antibiotics as described previously (Swaney, L. M., Vet. Microbiol., (1988), 18 (1): 1-14; LaRocco et al, J. Clin.

Microbiol., (2013), 51 (6): 1714-1720; LaRocco et al, J. Clin. Microbiol., (2015), 53 (2): 755). FMDV O Pakistan 2010 within the PanAsia-2 lineage (FMDV O/PAK/10), and O South Korea 2010 (FMDV O/SKR/10) challenge viruses were obtained from the U.S. Department of Homeland Security Science and Technology Directorate at Plum Island. FMDV O1 Manisa (FMDV O1M) virus was kindly provided by Marvin Grubman from the USDA Agricultural Research Service (ARS) virus collection.

Blood from heparin tubes was used to isolate peripheral blood mononuclear leukocytes (PBMCs). Briefly, 50 ml SepMate™ PBMC isolation tubes (Stem Cell Technologies) were prepared by addition of 15 ml of Lymphoprep™ (Stem Cell Technologies). 14 ml of heparinized blood was mixed with an equal volume of 1×DPBS (Gibco) and slowly added to the prepared SepMate™ tube. Samples were centrifuged for 30 minutes at 800×g at 21° C., with no brake engaged. Buffy coat was removed and transferred to a new 50 ml conical containing 15 ml of 1×DPBS (Gibco). Sample was centrifuged at 1,200 RPM for 10 minutes at 4° C. If red blood cell contamination was present, cell pellets were lysed by quick addition of 9 ml of sterile dd $H_2O$, 1 ml of 10×PBS (Gibco), then 10 ml of 1×DPBS (Gibco). Samples were centrifuged at 1,200 RPM for 15 min at 4° C. and resuspended in 10 ml of 1×DPBS (Gibco). Viability counts of samples were conducted using a Vi-CELL BLU Cell Viability Analyzer (Beckman Coulter). An aliquot of PBMCs were removed from each sample for use in the ELISpot assay (see section: IFNγ ELISpot Assay). The remaining cells were centrifuged as above, washed once in RPMI (Gibco) with 1% Antibiotic-Antimycotic 100×(Gibco), and centrifuged as above. PBMCs were finally resuspended in 10% DMSO (Sigma)/FBS (HyClone) and rate frozen at −80° C. prior to storage in liquid nitrogen within 3 days, to be used in future assays.

Full-length plasmids $pA_{24}$Cru-WT (Rieder et al, supra) and $pA_{24}$Cru-LL3B3D (Uddowla et al, supra), containing unique FseI and NheI sites in the VP4 and 2A coding regions, respectively ($pA_{24}$Cru-FseI/NheI) (Fischer et al, supra) were used as templates for cloning of type O mosaic capsids. Capsid DNA sequences O2.1, O2.2.1, O2.2.2, O2.2.6, O2.2.7 designed using the method described by Fischer et al (supra) were synthesized de novo (Gene Synthesis, Bio Basic Inc, Amherst, NY) and cloned into $pA_{24}$Cru-FseI/NheI and $pA_{24}$Cru-LL3B3D backbones. Specifically, 2.2 Kb FseI/NheI fragments containing P1 (capsid) mosaic sequences were substituted in $pA_{24}$Cru-FseI/NheI and $pA_{24}$Cru-LL3B3D as described in Uddowla et al. (supra). cDNAs were linearized with SwaI, viral RNA was derived by in vitro transcription with T7 polymerase using a MEGAscript T7 kit (Ambion) and purified with RNeasy (Qiagen) kit following the manufacturer's directions. 5-15 ug of transcribed RNAs were electroporated into BHK-21 or BHKαVβ6 cells as previously described (Rieder et al, supra) and after a 24 h incubation at 37° C., cells were frozen for subsequent virus release and passage. Viruses were generated by passaging the virus 3-4 times in BHK-αVβ6 cells. Recovered viruses were sequenced and compared to the original plasmid DNA, and used for large scale production, in vitro characterization, and the production of inactivated vaccines.

Sequencing

Viral isolates, where the presence of FMDV was confirmed by rRT-PCR, were sequenced following a protocol previously described (Ludi et al, Transbound Emerg. Dis., (2016), 63 (1): e27-38). The RT-PCR products were generated using SuperScript®III One-Step RT-PCR System with Platinum® Taq High Fidelity (Invitrogen). The universal forward (5'-TGGTGACAGGCTAAGGATG-3') and reverse (5'-GCCCRGGGTTGGACTC-3') primers were used to generate amplicons of the entire PI region of FMDV (Xu et al, J. Virol. Meth., (2013), 189 (1): 70-76). PCR products were purified using a QIAquick PCR Purification Kit (QIAGEN) and sequenced using the di-deoxy termination method (Big dye terminator; Life Technologies). Chromatograms were analyzed using Sequencher® v4.8 (GeneCodes, Ann Arbor, MI, USA) to assemble consensus genome sequences.

Analysis of Growth of Parental and Mosaic Type O Viruses

Mutant viruses were characterized by plaque assays in BHK-21 or BHKαVβ6 cells. Plaques were visualized under a gum tragacanth overlay stained for 48 h post infection (hpi) except for FMDLL3B3D (see, e.g., U.S. Pat. No. 9,180,179) which was stained for 72 h when titrated in BHK-21 cells. Comparative one-step growth curves between the parental O1 Manisa and O Mosaic viruses were performed in BHK (FLC viruses) or BHKαVβ6 (FMDLL3B3D viruses) cells. Pre-formed monolayers were prepared in 12-well plates and infected with the six viruses at a multiplicity of infection (MOI) of 5 at 37° C. After 1 h of adsorption at 37° C. the inoculum was removed, and the cell monolayers were rinsed with 145 mM NaCl, 25 mM morpholineethanesulfonic acid (MES), pH 5.5, to inactivate unabsorbed virus and then rinsed three times with BME growth media ((Life Technologies, Grand Island, NY) to restore physiological pH. Plates were incubated at 37° C. in a 5% $CO_2$ atmosphere. At indicated times post-infection, cells were frozen, and subsequently lysed by thaw. Virus yield was measured by plaque assay on BHKαVβ6 or BHK-21 cells (Rieder et al, supra) in duplicates, as mentioned above.

Figure 2B:
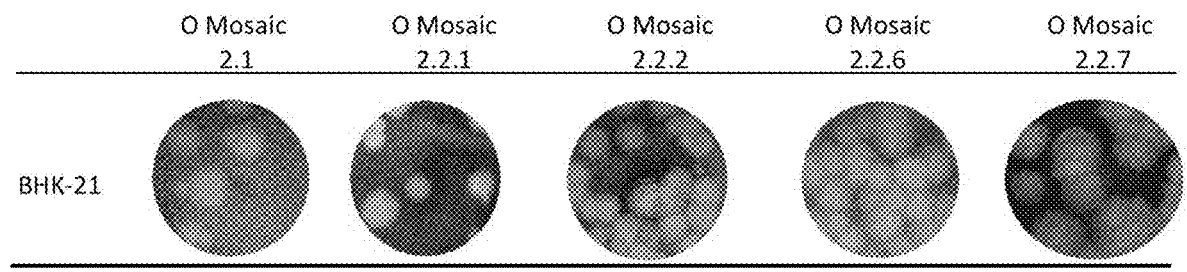
Figure 2C:
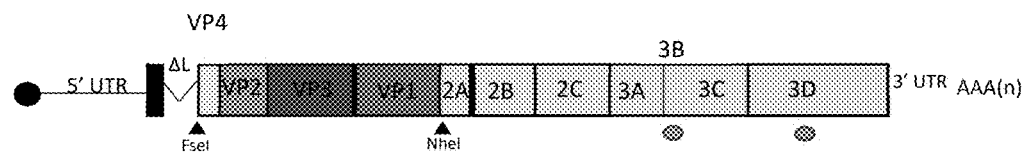
Figure 2D:
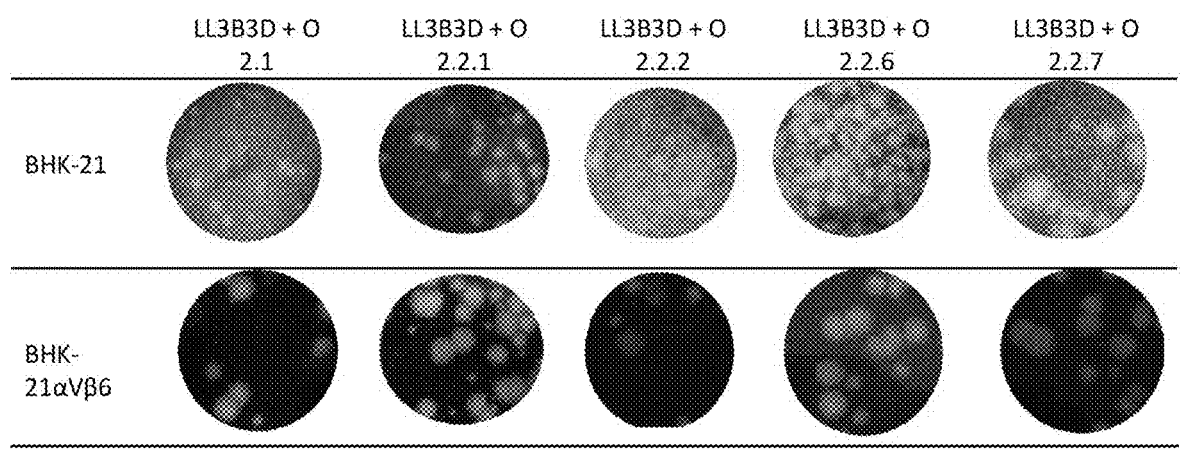

Five synthetic 2.2 kb DNA fragments encoding novel FMDV type O mosaic capsids designed by the antigen algorithm described by (Fischer et al, supra), were cloned into both, a full-length backbone pA24Cru (Rieder et al, supra) and a previously described leaderless marker pFMD-LL3B3D $A_{24}$ infectious cDNA clone (Uddowla et al, supra) (FIG. 2A, FIG. 2C). Infectious RNA was in vitro transcribed from full-length infectious clones and used in BHK-21 electroporation. Viruses were rescued from transfected cells following passages in BHK-21 or BHKαVβ6 cells. Nucleotide sequence analysis revealed no genotypic differences of rescued mosaic viruses relative to the original plasmid, confirming that mutations in targeted sites in the mosaic capsids were stably maintained in virus progenies. Plaque assays of these novel full-length mosaic viruses show large plaques with clearly defined edges for full-length O Mosaic 2.1, 2.2.1, 2.2.2, 2.2.6, and 2.2.7 similar to those generated by parental virus, O1 Manisa (FIG. 2B). Plaque morphology among the FMD-LL3B3D O mosaic viruses in BHK-21 cells developed at 72 hrs were smaller and less defined than the parental O1 Manisa (FIG. 2D). However, these O mosaic FMD-LL3B3D viruses produced larger and clear plaque phenotypes in BHKαVβ6 cells (FIG. 2D) developed at 48 h post infection.

In vitro growth kinetics of the full-length and FMD-LL3B3D O mosaic viruses were examined next, relative to a parental virus in single-step growth curves (FIG. 5). BHK-21 and BHK-αVβ6 cells were infected at a multiplicity of infection (MOI) of 5 PFU/cell. Virus was absorbed for 1 hour (time zero) as described in the materials and methods and samples were collected at indicated times post-infection (pi). FIG. 5A shows there is no evident differences in replication profiles of the five full length mosaic viruses compared to parental O1 Manisa virus in these cells. A similar phenotype was also observed in BHKαVβ6 for O1 Manisa and the FMDLL3B3D O mosaic viruses when comparable titers of 0.5-1×10$^7$ PFU/mL in both cell lines were reached (FIG. 5B). Together the replication dynamics examined here indicate that expression of serotype O capsids does not affect the mosaic virus capacity to infect or replicate in BHK or BHKavb6 cells relative to the wild type viruses.

FMDV O Serotype Virus Production and Virus Biophysical Stability Assays

Confluent roller bottles of BHK-21 or LFBKαVβ6 cells were infected with FMDV O1 Manisa, FMDV O1 Campos, mosaic O VP4.2.1, mosaic O VP4.2.2.1, mosaic O VP4.2.2.2, mosaic O VP4.2.2.6, mosaic O VP4.2.2.7 at an MOI of 0.1. Roller bottles were incubated at 37° C. and monitored for development of cytopathic effect (CPE), with added $CO_2$. Upon 95-100% CPE, infected cells were frozen and underwent a thaw to release virus. Cell debris was removed by centrifugation and supernatant was concentrated with 8% polyethylene glycol (PEG) (W/v) and virus purified on a TNE (50 mM Tris-HCl, 150 mM NaCl, 5 mM EDTA) based 15% to 55% sucrose density gradient (SDG). Briefly, up to 6 ml of sample was overlayed onto a gradient and ultra-centrifuged overnight (16 to 18 hours) at 17,000 RPM, 4° C. The gradient was aliquoted into equal fractions, spectrophotometrically analyzed at 260 nm, and the concentration of viral particles (140S) was quantified. Fractions with the highest concentration of virus particles were pooled, and spectrophotometrically re-analyzed for total viral particle quantification using the coefficient 132 ug/1 OD. Purified virus was titrated on BHK-21 cells to determine the titer (PFU/ml) of each viral sample.

The biophysical stability of viruses was assessed as previously described (Maree et al, PLOS One, (2013), 8 (5): e61612) using a gradient of increasingly acidic pHs. Up to 10$^7$ viral particles were added to TNE buffer at multiple pHs (5.44, 5.6, 5.78, 5.97, 6.13, 6.23, 6.44, 6.62, 6.78, 6.92, 7.15, 7.33, and 7.4, 7.5) and incubated at room temperature (25° C. incubator) for 30 minutes. Samples were neutralized with 50 ul 1M Tris (pH 7.4), 150 mM NaCl and titrated onto BHK-21 or LFBKαVβ6 cells to determine viral survival (PFU/ml). As a control, virus was also titrated in viral growth media (VGM) without TNE treatment. This assay was conducted in triplicate. Graphed values are the mean of the replicates±standard deviation of the virus titration replicates (PFU/ml) of each treatment.

Thermostability of viruses was assessed as previously described (Maree et al, supra). Sucrose density purified viral particles (up to 10$^7$) were added to aliquots of TNE buffer, pH 7.4 and incubated for 30 minutes at 4° C., 25° C., 37° C., 42-45° C., 48° C., 50° C., and 55° C. Upon incubation, virus was immediately placed on ice and titrated onto BHK-21 or LFBKαVβ6 cells to determine viral survival (PFU/ml). As a control, virus was also titrated in VGM, without temperature treatment. This assay was conducted in triplicate. Graphed values are the mean of the replicates±standard deviation of the virus titration replicates (PFU/ml) of each treatment.

The integrity and biophysical stability of FMD virus particles has been correlated with the capacity of these antigens to induce a protective immune response in susceptible species (Doel and Baccarini 1981, Mateo, Luna et al. 2008, Rincón, Rodríguez-Huete et al. 2014). The experimental O mosaic viruses are a 'compilation' of various features of a large set of FMDV serotype O viruses, thus there is a potential for these viruses to be more stable than parental wildtype viruses. Therefore, an assessment of the biophysical properties of the mosaic viruses was conducted and compared with those of parental viruses. The virus properties were examined following treatment at different temperatures, and levels of acidity (pH).

Figure 4A:
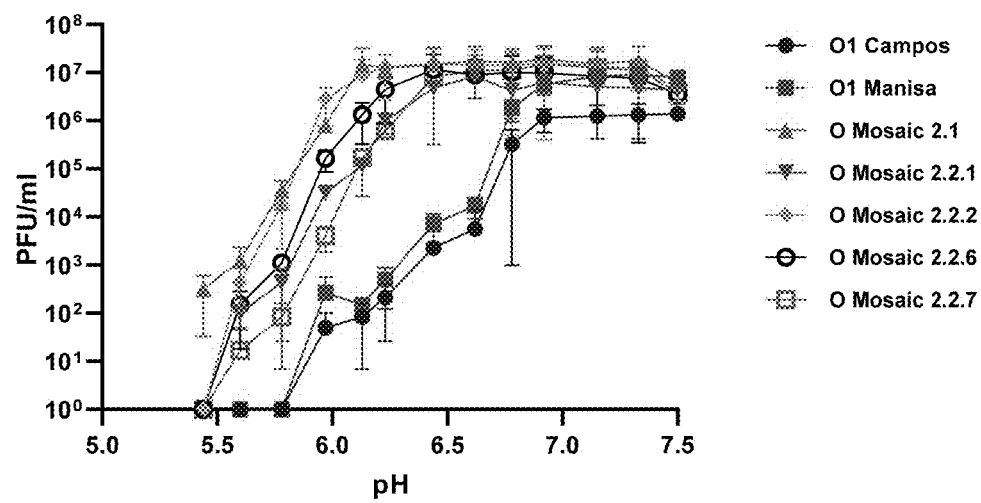
FIG. 4A and FIG. 4B provide biophysical and thermostability of parental and mosaic FMDV O viruses.

FIG. 4A shows that recombinant FMDV O mosaic viruses were biophysically more stable than parental viruses in a range of acid environments (pH 5.44-7.4). The loss of infectivity for wild-type O1 Campos and O1 Manisa became progressively evident under pH-ranges below 6.9. Noteworthily, a gradient of stability was detected among the mosaic viruses: O Mosaic 2.2.2 >2.2.6 >2.2.7 with O Mosaic 2.1 being slightly more stable than other recombinant and parental viruses at pH 5.44. While the O Mosaics 2.1 and 2.2.1, 2.2.2, 2.2.6 and 2.2.7 were more stable at a pH range from 6.7 to 5.6 than parental O1Campos or O1 Manisa viruses. Both parental O1 Manisa and O1 Campos viruses were fully inactivated at a pH of 5.8 while O Mosaic 2.1 did not lose complete infectivity at pH 5.5.

Figure 4B:
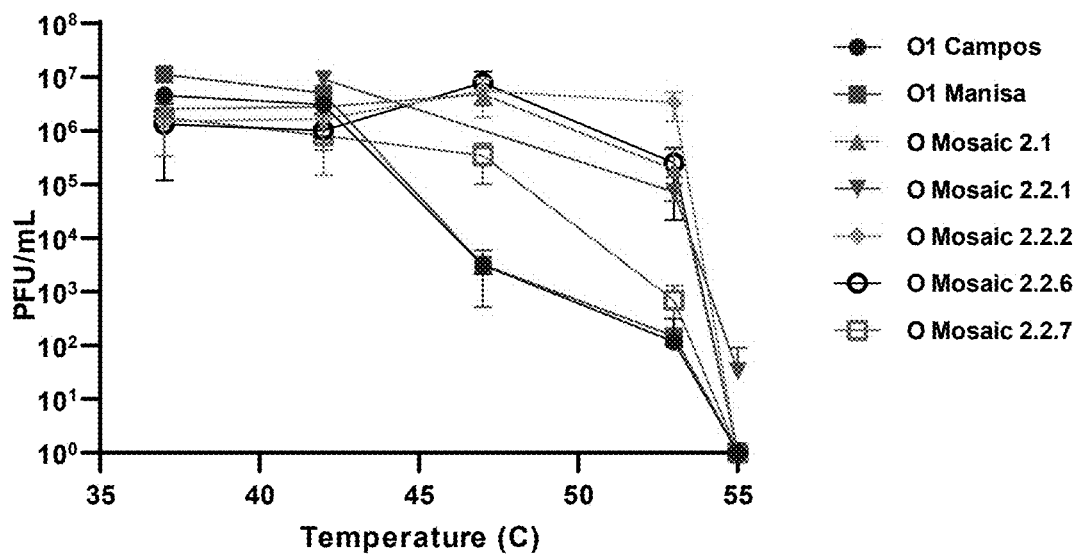
Figure 5A:
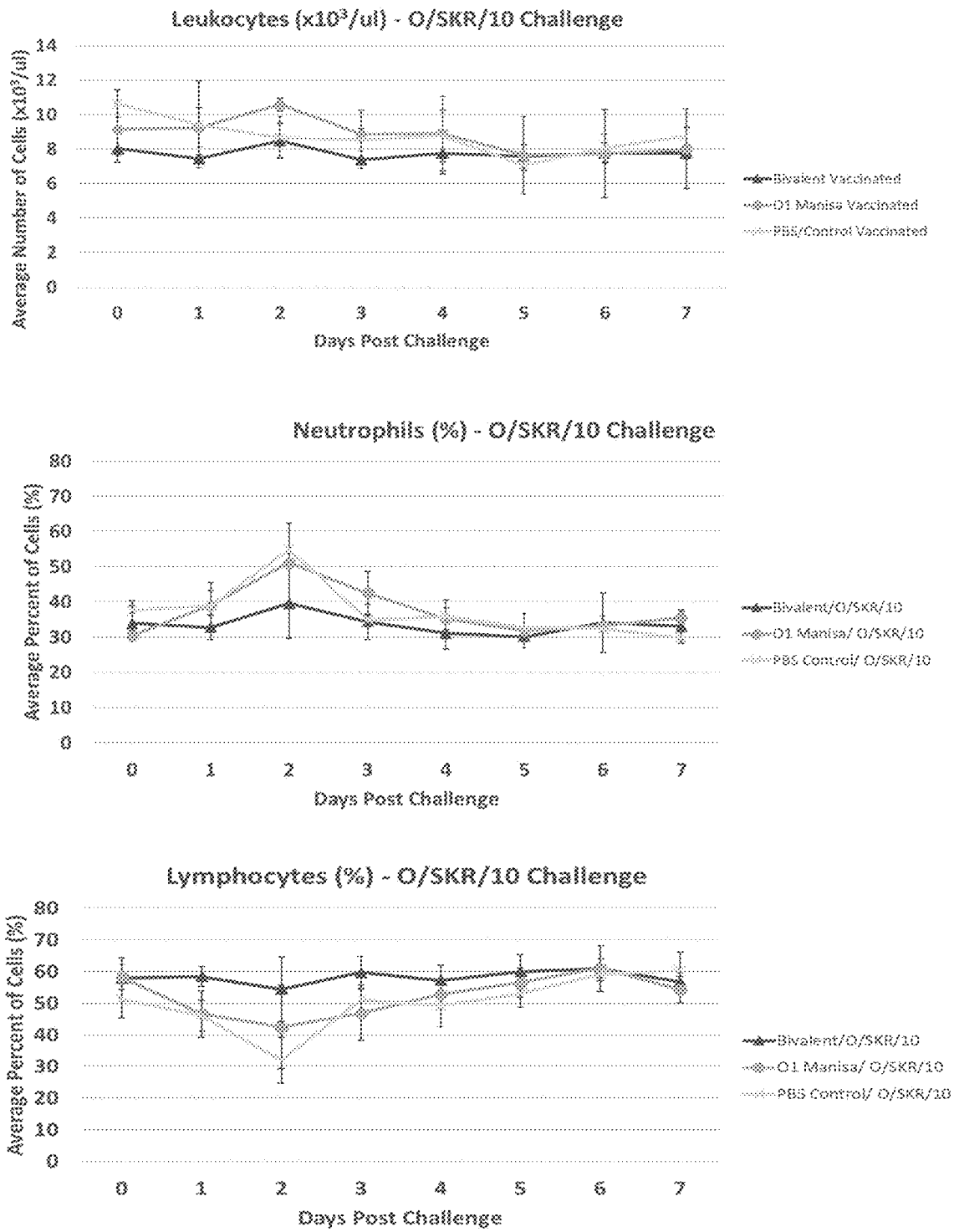
FIG. 5A, FIG. 5B, FIG. 5C, and FIG. 5D: Hematological analysis of leukocyte populations in vaccinated and unvaccinated control animals post challenge. The number of leukocytes (x10$^3$/ul) and average percent lymphocytes and neutrophils for O/SKR/10 challenged (FIG. 5A) and O/PAK/10 challenged (FIG. 5B) groups. The average percent monocytes, eosinophils, and basophils for O/SKR/10 challenged (FIG. 5C) and O/PAK/10 challenged (FIG. 5D) groups. Bars indicate standard deviation. Bivalent=groups vaccinated with O Mosaic 2.1+2.2.7. O1 Manisa=O1 Manisa vaccinated groups. PBS control=placebo vaccinated groups.
Figure 5B:
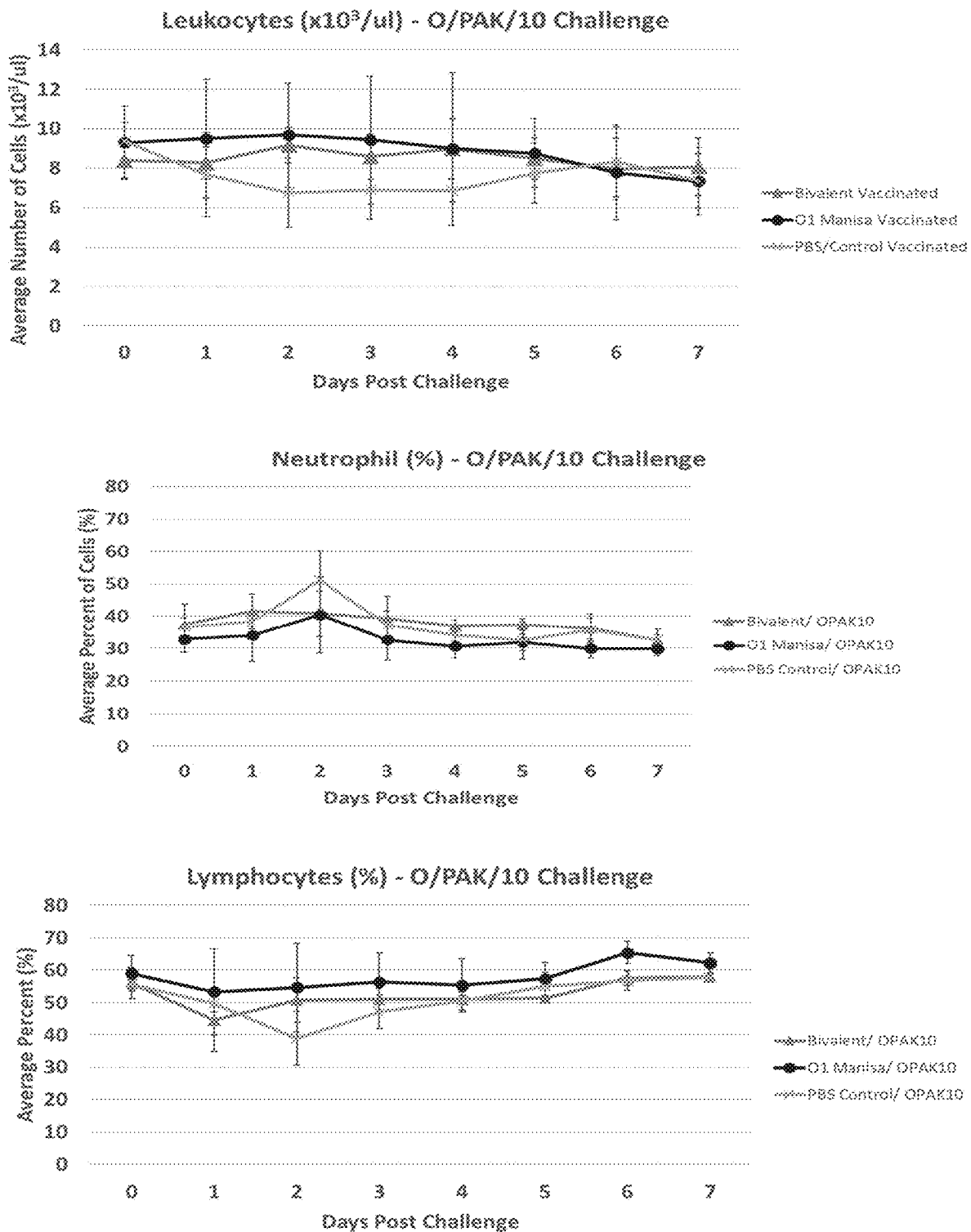
Figure 5C:
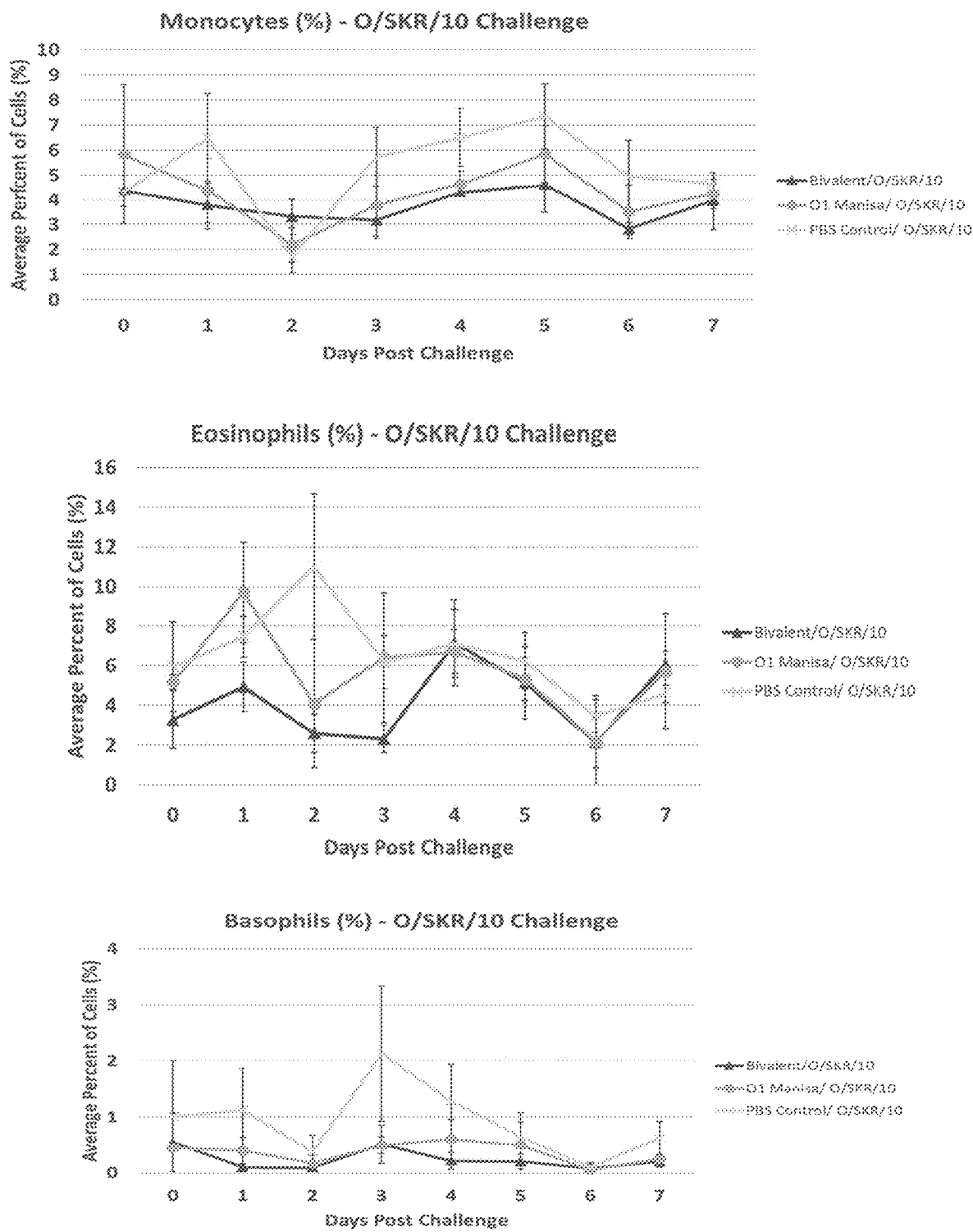
Figure 5D:
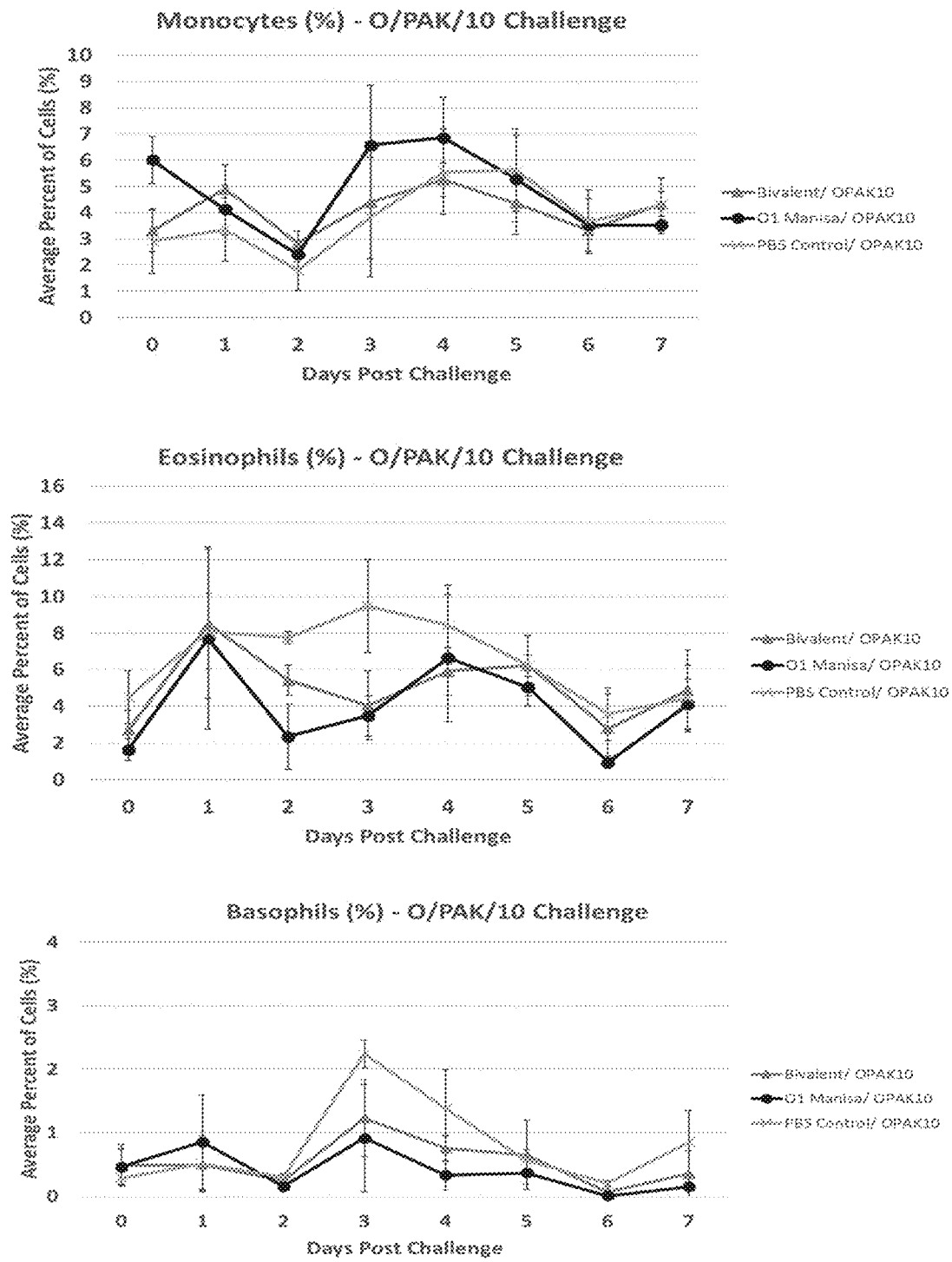
Figure 6D:
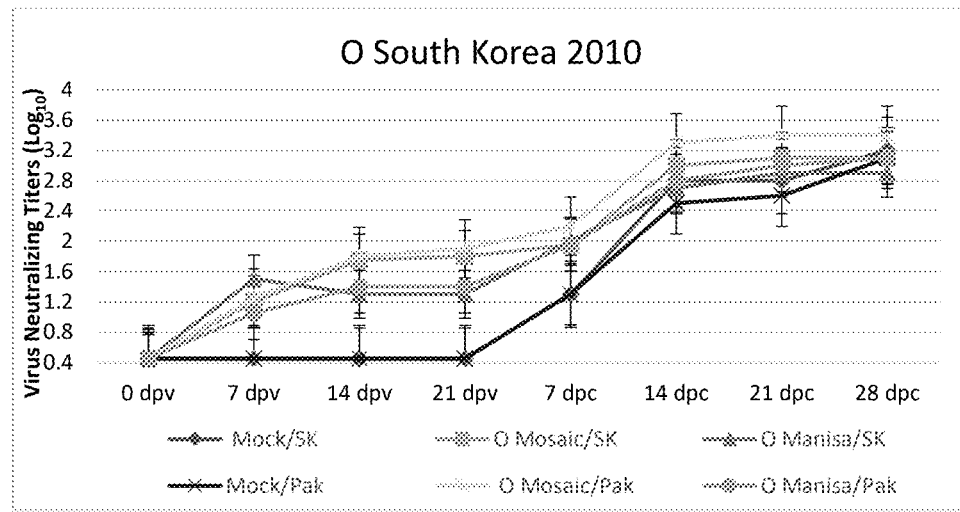
Figure 6E:
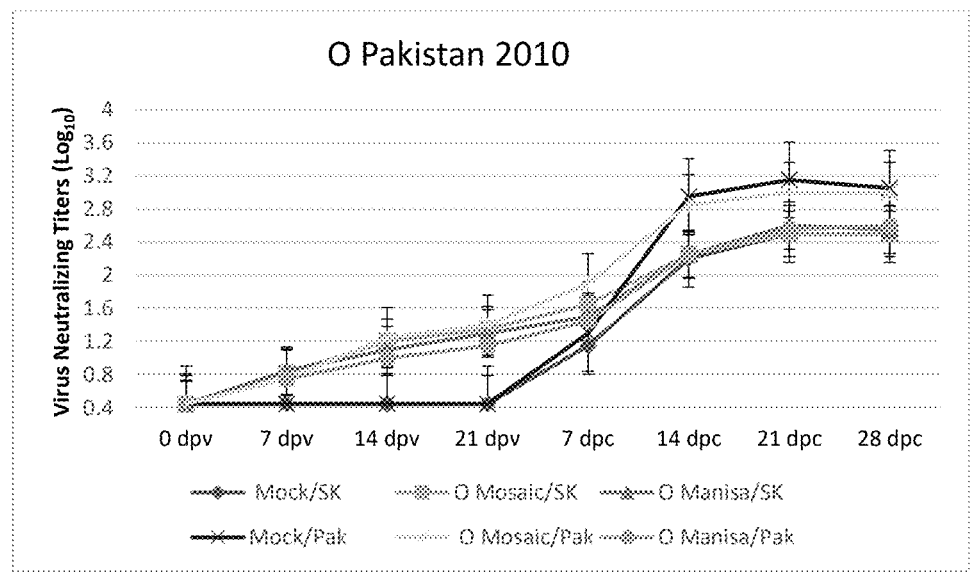

FIG. 4B shows that parental and mutant viruses maintained equal infectivity from 4° C. to 37° C. Upon thermostability testing at 52° C., O Mosaic 2.2.2 and 2.2.6 were more stable than all other viruses. O Mosaic 2.2.2 has a slightly higher titer at 52° C. than at 42° C., though the standard deviation range is within that of 42° C. This small increase is more likely a function of a slightly higher starting PFU then a function of virus stability; it is biologically unlikely the virus is more stable at 52° C. than 42° C., especially as the virus is killed after incubation at 55° C. for 30 minutes. The results indicate that O Mosaics are more stable at temperatures of between 48° C. and 54° C. than the parental O1 Campos and O1 Manisa counterparts, while at 55° C. were completely or almost completely inactivated.

The biophysical- and thermo-stability results suggest that there is likely a conformational change in the mosaic viruses, theoretically in the viral capsid, which imparts greater protection against some environmental factors when compared with the tested parental viruses. Increased stability of the mosaic viruses suggests that a more reliable and stable vaccine against this stereotype may be feasible. These results were unexpected, as serotype O FMDV are known to break down more readily than other serotypes. Stability of FMDV vaccines is imperative given the environmental conditions the vaccines will be subject to during formulation, transport, and administration. The sensitivity of FMDV to an acidic environment (and thus its ability to release its genome into infected cells) is an important virus particle factor to test and to further characterize the mosaic viruses, especially to compare with the wild-type viruses.

Enzyme-Linked Immunodot (EID) Assay

Enzyme-linked immunodot assays were carried out as previously described (Mateu et al, Virus Res., (1987), 8 (3): 261-274). Briefly, BHK-21 or LFBKαVβ6 cells in either six or 12 well plates were infected with parental or mutant FMD viruses at an MOI of 10 for up to 7 hours (until CPE development) and harvested and centrifuged for removal of supernatant. Cell lysis was performed by resuspending the infected cell pellet in RIPA buffer (10 mM TRIS pH 7.5, 150 mM NaCl, 5 mM EDTA, 1% w/v Na DOC, 1% w/v triton X 100, 0.1% w/v SDS, sterile dd $H_2O$). Primary antibodies used were obtained from the Pan American Center for Foot-and-Mouth Disease (PANAFTOSA) and have been described previously (Alonso et al, Vaccine (1994), 12 (8): 682-686). Clarified virus lysates were blotted onto a 0.2 μm nitrocellulose membrane (Amersham Protran 0.2 μm NC)

and subsequently incubated at 37° C. for 10 minutes. Membrane was blocked with 5% milk/PBST (Skim powder milk for microbiology, Merck; PBS, polysorbate 20, pH 74. Sigma) for 1 hour, at room temperature (RT), while gently rocking. Post-block, membrane was placed in appropriate primary antibody dilutions (in 1% milk/PBST) and incubated at RT for 1 hour, gently rocking. Membrane was subsequently washed 3× with PBST, 5 minutes per wash, incubating on the rocker at RT. Secondary antibody (in 1% milk/PBST) was added at a 1:10,000 dilution, and incubated at RT for 1 hour with rocking. Membrane was washed as above and developed using SuperSignal West Dura (Thermo Scientific) for between 5-10 minutes. Dot blot images were captured via chemiluminescence and dot intensity measured using Image J Software (imagej.nih.gov/ij/).

Characterization of type O mosaic viruses was performed with a set of monoclonal antibodies (MAbs) directed against the capsid of O1 Campos or O1 Brugge strains. The main characteristics of these MAbs have been previously described (Stave et al, J. Gen. Virol., (1986), 67:2083-2092; Alonso et al, supra). Enzyme-linked Immnuodot assay (EID) shows a clear difference in the available B-cell epitopes of mosaic and parental control viruses when examined with this set of MAbs (Table 2: +=positive reactivity, −=negative reactivity). The viruses can be separated into groups by their reactivity with four monoclonal antibodies: 12BB5, 12DB7, 12FA5, and 34CH4. MAbs 12BB5 and 12FA5 EID results separate tested viruses into two groups; one group contains O1 Manisa, O/SKR/10 and the O Mosaics 2.1, 2.2.1, 2.2.6, 2.2.7 while the second group consists of O1 Campos and O Mosaic 2.2.2. Preliminary results suggest that 34CH4 may also differentiate the viruses as it does not bind O1 Campos, O1 Manisa, O/SKR/2010 or mosaic O Mosaic 2.2.7. Mosaic O 2.2.1 and field strain O/SKR/10 both lack an epitope recognized by MAb 12DB7 which is present in all other tested strains. Additionally, O/SKR/2010 is the only virus which does not react with Mab 11AD6. The positive controls MAbs 12FA5 and F14 both bound all tested viruses. The results show that type O Mosaic viruses display epitopes different from parental or wildtype viruses, consistent with unique amino acid profiles of their designs. Table 2 legend: [a]Hybridoma cultures, used as the primary antibody, were diluted between 50 and 200-fold, based on optimization experiments; [b] PIADC monoclonal antibodies, used as a controls: 12FE9 recognizes FMDV serotype O (Stave et al, supra) and F14 recognizes multiple FMDV serotypes; [c]True positive=dot intensity value >10.0; [d]Negative=dot intensity value <4.9; and [e]Weak signal (dot intensity value of 5 to 9.9).

Example 2

Vaccine Formulation and Efficacy
Vaccine Formulation

Virus stocks were inactivated with 5 mM BEI for 24 h at 25° C. and concentrated with 8% polyethylene glycol 8000 as described in (Uddowla et al, supra). The vaccines were prepared as water-in-oil-in-water (WOW) emulsion with Montadine ISA 201 (Seppic, Paris) according to the manufacturer's instructions. Briefly, the oil adjuvant was mixed into the aqueous antigen phase (50:50) at 30° C. for 15 min and stored at 4° C. for 24 h, followed by another brief mixing cycle for 10 min. The integrity of 146S particles and antigen concentration present in the experimental vaccines was determined by density gradient centrifugation in sucrose 10-50% (W/V) and 260 nm densitometry.

Vaccination and Challenge of Cattle

Animal experiments were performed in the high-containment facilities of the Plum Island Animal Disease Center (PIADC), in compliance with the Animal Welfare Act (AWA), the 2011 Guide for Care and Use of Laboratory Animals, the 2002 PHS Policy for the Humane Care and Use of Laboratory Animals, and U.S. Government Principles for Utilization and Care of Vertebrate Animals Used in Testing, Research and Training (IRAC 1985), as well as specific animal protocols reviewed and approved by the Institutional Animal Care and Use Committee (IACUC) of PIADC (USDA/APHIS/AC certificate number 21-F-0001).

Eighteen Holstein heifers, (weights 250-300 kg) were divided in 6 groups as follow: Two groups of three animals (cow IDs R20-16, R20-17, R20-18 in group 1 and cow IDs R20-22, R20-23 and R20-24 in group 3) were immunized intramuscularly in the neck with a vaccine consisting of chemically inactivated O Mosaic 2.1 and O Mosaic 2.2.7 (7.5 µg+7.5 µg) formulated as monovalent vaccines emulsified with a commercially available water-in-oil-in-water adjuvant (Montanide™ ISA 201, Seppic, France). Another two groups of three animals each were vaccinated with a chemically inactivated O1 Manisa vaccine (15 µg) formulated in the same fashion (cow IDs 19, 20 and 21 in group 2 and cow IDs R20-25, R20-26 and R20-27 in group 4). Two additional groups of three cattle each (cow IDs R20-28, R20-29 and R20-30 in group 5 and cow IDs R20-31, R20-32 and R20-33 in group 6) were mock vaccinated with sterile PBS emulsified with the same adjuvant and served as unvaccinated controls. On day 21 post vaccination (dpv), groups 1, 2 and 5 (one group in each vaccination treatment) were challenged intradermolingually with $10^4$ BTID$_{50}$ (50% bovine tongue infectious doses) of FMDV O/SKR/10, while

TABLE 2

Reactivity of monoclonal antibodies with experimental viruses.

| Monoclonal Antibody[a] | Isotype | Epitope reaction | Reactivity | | | | | | | |
|---|---|---|---|---|---|---|---|---|---|---|
| | | | O1C | O1M | OSKR | O Mos 2.1 | O Mos 2.2.1 | O Mos 2.2.2 | O Mos 2.2.6 | O Mos 2.2.7 |
| 12FE9[b] | IgG$_1$ | | +[c] | + | + | + | + | + | + | + |
| 11AD6 | IgG$_{2a}$ | Conform. | + | + | −[d] | + | + | + | + | + |
| 11HC10 | IgG$_3$ | VP1 | + | + | + | + | + | + | + | + |
| 12BB5 | IgG$_3$ | Conform. | + | − | − | − | − | + | − | − |
| 12DB7 | IgG$_{2a}$ | Conform. | + | + | − | + | − | + | + | + |
| 12FA5 | IgG$_{2a}$ | Conform. | + | − | − | − | − | + | +[d] | +[d] |
| 13EG1 | IgG$_{2a}$ | Conform. | + | + | + | + | + | + | + | + |
| 34CH4 | ND | ND | − | − | − | + | +[e] | + | +[d] | − |
| F14[b] | IgG$_1$ | Linear | + | + | + | + | +[d] | + | +[d] | + | the other three groups (groups 3, 4 and 6) were challenged with FMDV O/PAK/10, using the same protocol and dose.

The animals were evaluated for the appearance of localized and generalized lesions at 3, 5, 7, and 9 days post-challenge (dpc). Clinical scores were registered as 1 credit for each affected foot, and an extra credit for the presence of vesicles in the nose or mouth in addition to those that resulted from lingual inoculation at challenge. Sera, nasal swabs, and temperatures were collected daily. Oropharyngeal fluid (OPF) samples were collected by use of a probang cup (Sutmoller & Gaggero, Vet. Rec., (1965), 77 (33): 968-969) at 14, 21 and 28 dpc. OPF samples were diluted with an equal volume of minimal essential medium containing 25 mM HEPES, cannulated for homogenization of the sample, and processed for virus isolation (VI) and qRT-PCR. Aliquots intended for VI were treated with 1,1,2-trichloro-trifluoroethane (TTE) for dissociation of immune complexes as previously described (Brown and Cartwright 1960) and filtered through Spin-X columns (pore size, 0.45 µm; Sigma-Aldrich). LFBK αvβ6 cell monolayers were inoculated with the filtrated TTE-treated probang samples. After 1 hr. of adsorption, fresh DMEM media was added and monolayers were checked daily for detection of cytopathic effect due to the presence of FMDV. Upon detection of cytopathic effect, FMDV positivity was confirmed by rRT-PCR/sequencing on cell culture supernatants using universal primers to amplify the capsid region of FMDV. Samples in which no cytopathic effect was observed were amplified through 3 blind passages. Probang samples were also tested by qRT-PCR as described above.

Detection of Virus in Sera and Nasal Swabs

Cattle sera and nasal swabs were assayed for the presence of virus by plaque titration on LFBKavb6 cells and by qRT-PCR. Virus titers were expressed as $\log_{10}$ PFU/ml of serum or nasal swab secretions. The minimal detection level for this assay is 5 PFU/ml. In addition, FMDV RNA was detected by real-time RT-PCR (qRT-PCR) as previously described (Pacheco & Mason, J. Vet. Sci., (2010), 11 (2): 133-142). Briefly, each sample (sera or nasal swab) were subjected to RNA extraction using MagMax-96 viral RNA isolation kit (Ambion) on a King Fisher-96 magnetic particle processor (Thermo Electron Corp.) following the manufacturer protocols. RNA extracted from described samples was analyzed in duplicate by qRT-PCR on the QuantStudio 6 with the AgPath-ID one step RT-PCR kit (Applied Biosystems) (Callahan et al, J Am. Vet. Med. Assoc., (2002), 220 (11): 1636-1642; Pacheco & Mason, supra). Cycle threshold (Ct) values were converted to RNA copies per milliliter using the equation derived from analysis of serial 10-fold dilutions of in vitro synthesized FMDV RNA of known concentration and expressed as the genome copy number per ml of serum or nasal swab.

Evaluation of Humoral Immune Response

Neutralizing antibody titers against FMDV vaccine strains O1Manisa, O Mosaic 2.1 and O Mosaic 2.2.7, as well as FMDV challenge strains O/SKR/10 and O/PAK/10, were determined by the virus neutralization test method described in the OIE Manual (OIE 2017) in 96-well plates of LFBK αvβ6 cells, on serum samples collected on Days 0, 7, 14, 21, 28, 35, 42, and 49 post vaccination. SVN titers were calculated according to the Spearman-Kärber method and expressed as $\log_{10}$ of the reciprocal of the final serum dilution that neutralized 100 $TCID_{50}$ of the respective serotype O FMDV in 50% of the wells. The assay lower limit of detection was 0.45 $\log_{10}$.

Antibody Detection Against FMDV Non-Structural Proteins-Blocking ELISA

Cattle serum samples were heat-inactivated at 56° C. for 30 mins in a water bath prior to testing. The samples were then subjected to FMDV antibody detection against non-structural proteins (NSP) using a PrioCheck FMDV NS ELISA test kit (Prionics, Netherlands) following the manufacturer's instructions. A percentage inhibition (PI) of <50% is considered negative (i.e., antibodies against FMDV NSP are absent in the test sample); PI >50% is considered positive (i.e., antibodies against the FMDV NSP are present in the test sample).

Hematology

For all animals, whole blood samples were collected in EDTA tubes and a differential blood counts were conducted up to 3 days post sampling (standard PIADC procedure) using a HemaVet 950FS (Drew Scientific), according to manufacturer's instructions. The bovine reference ranges are as follows: white blood cells (WBCs)=5.9-14, neutrophils=27-72%, lymphocytes=22-64%, monocytes=0-10%, eosinophils=0-12%, basophils=0-3% (Smith 2020).

Results and Analysis

An in vivo experiment was performed to determine the efficacy of inactivated FMD-LL3B3D Mosaic O virus vaccines versus a parental O1 Manisa vaccine. The primary outcome evaluated was vaccine efficacy against FMD generalized disease (pedal lesions). Secondary outcomes evaluated were reduction in plasma viremia and the serum virus neutralization response. Efficacy was rated as providing immunological protection against challenge with heterologous O/SKR/10 or O/PAK/10 viruses at 21 dpc via intradermolingual route (IDL). The detailed study design can be found in Table 3. Briefly, animals were vaccinated with either the bivalent mosaic BEI inactivated vaccine, O1 Manisa, or PBS as a control, formulated with commercially available water-in-oil-in-water adjuvant (Montanide™ ISA 201), and challenged intradermolingually 21 dpv at four sites in the tongue with $10^4$ bovine infectious doses ($BTID_{50}$) of heterologous FMDV O/SKR/10 or O/PAK/10.

TABLE 3

Vaccine Efficacy Study Design.

| Challenge Information | Immunization Group | Dose of Inactivated Virus per Animal | Animal ID | Vaccination Group No. |
|---|---|---|---|---|
| FMDV O/SKR/10 Administered Intradermolingually 21 DPV | Mosaic O 2.1 + O 2.2.7 (inactivated) + Montanide ISA201 | 7.5 µg O Mosaic 2.1 + 7.5 µg O Mosaic 2.2.7 | R20-16 R20-17 R20-18 | T01 |

TABLE 3-continued

Vaccine Efficacy Study Design.

| Challenge Information | Immunization Group | Dose of Inactivated Virus per Animal | Animal ID | Vaccination Group No. |
|---|---|---|---|---|
| FMDV O/PAK/10 Administered Intradermolingually 21 DPV | O1 Manisa (inactivated) + Montanide ISA201 | 15 µg O1 Manisa | R20-19 R20-20 R20-21 | T02 |
| | PBS + Montanide ISA201 | N/A | R20-28 R20-29 R20-30 | T03 |
| | Mosaic O 2.1 + O 2.2.7 (inactivated) + Montanide ISA201 | 7.5 µg O Mosaic 2.1 + 7.5 µg O Mosaic 2.2.7 | R20-22 R20-23 R20-24 | T04 |
| | O1 Manisa (inactivated) + Montanide ISA201 | 15 µg O1 Manisa | R20-25 R20-26 R20-27 | T05 |
| | PBS + Montanide ISA201 | N/A | R20-31 R20-32 R20-33 | T06 |

For the data shown in Table 4, Animals were assessed for FMD lesions at 0, 3, 5, 7, and 9 days post-challenge (dpc). Animals were scored based on the presence of lesions on each hoof (up to a score of 4) and on the mouth (1), when the lesion was not associated with the intradermolingual inoculation site of the challenge virus. R20-25 did not present with pedal lesions, but had one oral lesion, not at the site of challenge virus inoculation and had fever for two days. Control animals developed fever (Table 4), lethargy, sialorrhea and anorexia by 1 or 2 dpc (data not shown), and observable generalized FMD lesions by 3 dpc, pedal vesicles in all four feet and (1 animal) oral cavity by 5 dpc (Table 4). Challenge virus was isolated from serum samples of all the animals in control groups from 1 to 3 dpc and virus shedding was detected in nasal swabs of all control animals from the day after challenge until 4 dpc (Table 5). In contrast, none of the O Mosaic FMDLL3B3D or O1 Manisa vaccinated animals showed clinical signs of FMD during the course of the experiment and were fully protected from characteristic FMD lesions up to 9 dpc, with one exception-R20-25, did not present with pedal lesions, but had one lesion on the mouth (Table 4). For the data presented in Table 5:1) viral isolation nasal swab samples were titrated on LFBKαvβ6 monolayers under a tragacanth overlay and stained with crystal violet at 48 hours post infection. (+): visible plaques; (−) no plaques visible; and 2) qRT-PCR samples were categorized as strong positive (SP) if the obtained Ct value was <29.99, positive (P) if the Ct value was 30-34.99, weak positive (WP) if the Ct values was 35-39.99 and negative (N) if the Ct values was >40.

TABLE 4

Clinical scores and body temperatures after challenge at 21 days post-vaccination.

| Challenge Virus | Immunization Group | Animal ID | DPC/DPV | | | | | Onset of Fever (° F.) Peak (Duration in days) |
|---|---|---|---|---|---|---|---|---|
| | | | 0/21 | 3/24 | 5/26 | 7/28 | 9/30 | |
| FMDV O/SKR/10 | Mosaic O 2.1 + 2.2.7 | R20-16 | 0 | 0 | 0 | 0 | 0 | No |
| | | R20-17 | 0 | 0 | 0 | 0 | 0 | No |
| | | R20-18 | 0 | 0 | 0 | 0 | 0 | No |
| | O1 Manisa | R20-19 | 0 | 0 | 0 | 0 | 0 | No |
| | | R20-20 | 0 | 0 | 0 | 0 | 0 | No |
| | | R20-21 | 0 | 0 | 0 | 0 | 0 | No |
| | PBS Control | R20-28 | 0 | 4 | 5 | 5 | 5 | 104.1 (2) |
| | | R20-29 | 0 | 5 | 5 | 5 | 5 | 104.9 (2) |
| | | R20-30 | 0 | 5 | 5 | 5 | 5 | 105.7 (1) |
| FMDV O/PAK/10 | Mosaic O 2.1 + 2.2.7 | R20-22 | 0 | 0 | 0 | 0 | 0 | No |
| | | R20-23 | 0 | 0 | 0 | 0 | 0 | No |
| | | R20-24 | 0 | 0 | 0 | 0 | 0 | 103.9 (1) |
| | O1 Manisa | R20-25 | 0 | 0 | 1 | 1 | 1 | 106.1 (4) |
| | | R20-26 | 0 | 0 | 0 | 0 | 0 | 104.6 (1) |
| | | R20-27 | 0 | 0 | 0 | 0 | 0 | No |
| | PBS Control | R20-31 | 0 | 5 | 5 | 5 | 5 | 106.3 (3) |
| | | R20-32 | 0 | 5 | 5 | 5 | 5 | 105.1 (3) |
| | | R20-33 | 0 | 5 | 5 | 5 | 5 | 106.2 (3) |

TABLE 5

Comparison of viral isolation and detectable RNA in nasal swab samples from vaccinated and control animals challenged with FMDV O/SKR/10 or O/PAK/10.

| Challenge Virus | Immunization Group | Animal ID | 1 DPC Viral Isolation[1] | 1 DPC qRT-PCR[2] | 2 DPC Viral Isolation | 2 DPC qRT-PCR | 3 DPC Viral Isolation | 3 DPC qRT-PCR | 4 DPC Viral Isolation | 4 DPC qRT-PCR |
|---|---|---|---|---|---|---|---|---|---|---|
| FMDV O/SKR/10 | Mosaic O 2.1 + 2.2.7 | R20-16 | − | P | − | N | − | N | − | N |
| | | R20-17 | − | WP | − | WP | − | P | − | P |
| | | R20-18 | − | WP | − | WP | − | P | − | P |
| | O1 Manisa | R20-19 | − | WP | − | WP | − | P | − | WP |
| | | R20-20 | − | WP | − | WP | − | P | − | P |
| | | R20-21 | − | WP | + | SP | + | P | − | P |
| | PBS Control | R20-28 | + | P | + | SP | + | SP | + | SP |
| | | R20-29 | + | SP | + | SP | + | P | + | SP |
| | | R20-30 | + | P | + | SP | + | SP | + | SP |
| FMDV O/PAK/10 | Mosaic O 2.1 + 2.2.7 | R20-22 | − | WP | − | N | − | P | − | P |
| | | R20-23 | − | WP | − | WP | − | N | − | P |
| | | R20-24 | − | WP | − | WP | + | P | − | P |
| | O1 Manisa | R20-25 | − | WP | + | P | + | P | + | P |
| | | R20-26 | − | WP | + | WP | + | SP | + | P |
| | | R20-27 | − | WP | − | WP | + | SP | + | P |
| | PBS Control | R20-31 | + | SP | + | SP | + | SP | + | SP |
| | | R20-32 | + | P | + | SP | + | SP | + | SP |
| | | R20-33 | + | SP | + | SP | + | SP | + | WP |

In the bivalent mosaic FMD-LL3B3D vaccinated groups T O1 and T04, all animals were protected against generalized clinical FMD after challenge with either FMDV O/SKR/10 (T01) or FMDV O/PAK/10 (T04). Cattle in these groups were negative for virus isolation from serum and nasal swabs throughout the experiment, and only one animal in the group challenged with FMDV O/PAK/10 (R20-24) shed a minimal amount of virus (1-2 plaques on undiluted sample) for only one day (3 dpc) (Tables 5 and 6). In the O1 Manisa vaccinated, FMDV O/SKR/10 challenged group, all animals were protected against generalized clinical FMD, serum and nasal swabs samples were negative for virus isolation and only one animal (R20-21) shed virus at days 2 and 3 post-challenge. In the O1 Manisa vaccinated and FMDV O/PAK/10 challenged group, two animals developed fever (Table 4, R20-25 and -26). R20-25 presented with one oral lesion, not at the site of challenge virus inoculation. These two animals exhibited lethargy, anorexia and excessive salivation for several days after challenge. Although challenge virus was not isolated from serum samples of any of the animals in this group, all three animals in this group shed virus in nasal swabs for 2 to 4 dpc (R20-25 and -26) and 3 to 4 dpc (R20-27). For the data presented in Table 6:1) Viral isolation: serum samples were titrated on LFBKαvβ6 monolayers under a tragacanth overlay and stained with crystal violet at 48 hours post infection. (+): visible plaques; (−) no plaques visible; and 2) qRT-PCR samples were categorized as strong positive (SP) if the obtained Ct value was <29.99, positive (P) if the Ct value was 30-34.99, weak positive (WP) if the Ct values was 35-39.99 and negative (N) if the Ct values was >40.

TABLE 6

Comparison of viral isolation and detectable RNA in serum samples from vaccinated and control cows challenged with FMDV O/SKR/10 or O/PAK/10.

| Challenge Virus | Immunization Group | Animal ID | 1 DPC Viral Isolation[1] | 1 DPC qRT-PCR[2] | 2 DPC Viral Isolation | 2 DPC qRT-PCR | 3 DPC Viral Isolation | 3 DPC qRT-PCR |
|---|---|---|---|---|---|---|---|---|
| FMDV O/SKR/10 | Mosaic O 2.1 + 2.2.7 | R20-16 | − | N | − | N | − | N |
| | | R20-17 | − | N | − | WP | − | N |
| | | R20-18 | − | P | − | WP | − | N |
| | O1 Manisa | R20-19 | − | P | − | P | − | N |
| | | R20-20 | − | WP | − | N | − | N |
| | | R20-21 | − | N | − | N | − | N |
| | PBS Control | R20-28 | + | P | + | SP | + | P |
| | | R20-29 | + | SP | + | SP | + | SP |
| | | R20-30 | + | SP | + | SP | + | SP |
| FMDV O/PAK/10 | Mosaic O 2.1 + 2.2.7 | R20-22 | − | P | − | WP | − | N |
| | | R20-23 | − | WP | − | WP | − | N |
| | | R20-24 | − | P | − | WP | − | N |
| | O1 Manisa | R20-25 | − | P | − | WP | − | N |
| | | R20-26 | − | WP | − | N | − | N |
| | | R20-27 | − | P | − | N | − | N |
| | PBS Control | R20-31 | + | P | + | P | + | P |
| | | R20-32 | + | SP | + | SP | + | P |
| | | R20-33 | + | P | + | SP | + | P |

In summary this study demonstrates that the FMD-LL3B3D Mosaic O virus adjuvanted bivalent vaccines were highly immunogenic and conferred strong protection in cattle against FMD heterologous challenges following 21 days post vaccination.

Viral RNA isolated from oropharyngeal fluid (OPF) samples collected at 28 dpc and tested via qRT-PCR were considered weak positive (Ct values in the range of 35-39.99) for all the animals in the present study (Table 7). FMDV persistence was measured using TTE treated OPF samples collected at 14, 21 and 28 dpc via titration in LFBKαvβ6 cell monolayers under a tragacanth overlay and stained with crystal violet at 48 hours post infection. Virus presence was detected by CPE. No virus was isolated from any of the samples collected in the O Mosaics FMDLL3B3D vaccinated groups. Four OPF samples collected at 28 dpc from animals challenged with O/PAK/10 (R20-25 and R20-27 in the O1 Manisa vaccinated group and R20-32 and R20-33 in the PBS vaccinated group) were positive for challenge virus isolation in LFBKαvβ6 cells. Challenge virus O/PAK/10 was also isolated from OPF samples collected at 14 and 21 dpc from these same animals (except for R20-25 and R20-31) (Table 7). Confirmation that the isolated viruses from 14, 21 and 28 dpc were the challenge virus was confirmed both by qRT-PCR and sequencing of PCR products. The capsid amino acid sequences were aligned and compared to FMDV O/PAK/10 challenge strain. Amino acid substitutions were detected and are denoted in Table 7, which also indicates the location within the capsid region and the type of substitution identified in challenge virus variants isolated from these OPF samples. For the data presented in Table 7:1) Viral isolation: the presence of challenge virus in oropharyngeal fluid (OPF) samples was determined through passages in LFBKαvβ6 monolayers by detection of FMDV-induced cytopathic effect (CPE). Three blind passages were completed on samples that showed no CPE on first passage: CPE and visible plaques; (−) no CPE or plaques visible; 2) qRT-PCR samples were categorized as strong positive (SP) if the obtained Ct value was <29.99, positive (P) if the Ct value was 30-34.99, weak positive (WP) if the Ct values was 35-39.99 and negative (N) if the Ct values was >40; and 3) these amino acids were observed only in virus isolated from OPF samples collected at 28 days post challenge and passed once in LFBKαvβ6 cell monolayers.

TABLE 7

Comparison of viral isolation and detectable RNA in oropharyngeal fluid (OPF) samples from vaccinated and control animals challenged with FMDV O/SKR/10 or O/PAK/10.

| Challenge Virus | Immunization Group | Animal ID | Virus Isolation[1] 14 DPC | 21 DPC | 28 DPC | Amino Acid Substitutions | qRT-PCR[2] 28 DPC |
|---|---|---|---|---|---|---|---|
| FMDV O/SKR/10 | O Mosaic 2.1 + 2.2.7 | R20-16 | − | − | − | − | WP |
| | | R20-17 | − | − | − | − | WP |
| | | R20-18 | − | − | − | − | WP |
| | O1 Manisa | R20-19 | − | − | − | − | WP |
| | | R20-20 | − | − | − | − | WP |
| | | R20-21 | − | − | − | − | WP |
| | PBS Control | R20-28 | − | − | − | − | WP |
| | | R20-29 | − | − | − | − | WP |
| | | R20-30 | − | − | − | − | WP |
| FMDV O/PAK/10 | O Mosaic 2.1 + 2.2.7 | R20-22 | − | − | − | − | WP |
| | | R20-23 | − | − | − | − | WP |
| | | R20-24 | − | − | − | − | WP |
| | O1 Manisa | R20-25 | − | − | + | VP1: 136 D→N [3] | WP |
| | | R20-26 | − | − | − | − | WP |
| | | R20-27 | + | + | + | VP3:198 D→V (all time points) | WP |
| | PBS Control | R20-31 | + | + | − | − | WP |
| | | R20-32 | + | + | + | VP2: 191 T→A [3] VP3: 77 Q→K [3] | WP |
| | | R20-33 | + | + | + | VP3: 76 A→T [3] VP3: 124 I→V [3] | WP |

Analysis of Hematological Parameters in Vaccinated and Control Animals

Next, the white cell subpopulations following challenge in all study animals was investigated. On average, all immune cells were found within normal reference range parameters for cattle. As shown in FIG. 5A, FIG. 5B, FIG. 5C, and FIG. 5D, although within normal parameters, at 2 dpc the control groups showed a decrease in percent lymphocytes with a peak of percent neutrophils. A decrease in monocytes and basophils was detected 2 dpc in all groups while both control groups showed higher values of eosinophils at 2 dpc and a peak of basophils at 3 dpc, when compared with vaccinated animals.

Humoral Responses

All vaccinated animals developed serum neutralizing antibodies to their homologous as well as to three heterologous FMDV serotype O tested by 7 dpv through day of challenge (21 dpv) (FIG. 6A, FIG. 6B, FIG. 6C, FIG. 6D, and FIG. 6E). None of the unvaccinated control animals had titers on any day prior to challenge. At 21 dpv and prior to challenge, serum neutralizing titers (SNT) were comparable among vaccinated groups, except for the group immunized with O1 Manisa and challenged with O/SKR/10, but those animals were nevertheless protected against clinical FMD. The antibody titers against both O mosaic vaccine strains at the day of challenge (21 dpv) were higher in the groups immunized with the homologous vaccine compared to the groups vaccinated with the O1 Manisa formulation.

All vaccinated animals developed serum neutralizing antibodies to FMDV O/SKR/10 by 7 dpv, and antibody titers continued raising at 14 and 21 dpv in the groups vaccinated with the bivalent mosaic vaccine, while remaining steady in the animal groups immunized with O1 Manisa. At 21 dpv when animals were challenged, SNTs were higher in animals vaccinated with the bivalent mosaic vaccine in comparison to those immunized with O1 Manisa, though all animals were protected against clinical disease after challenge with FMDV O/SKR/10. In contrast, although SNTs were comparable in animals immunized with the bivalent mosaic vaccine to those animals inoculated with O1 Manisa, the former animals were protected against clinical disease after challenge with FMDV O/PAK/10 while the latter group developed fever, lethargy, anorexia and excessive salivation. Also, one animal from the O1 Manisa vaccinated group developed an oral vesicle in a site different than the challenge site of inoculation (see above).

Assessment of DIVA Compatibility

Figure 7A:
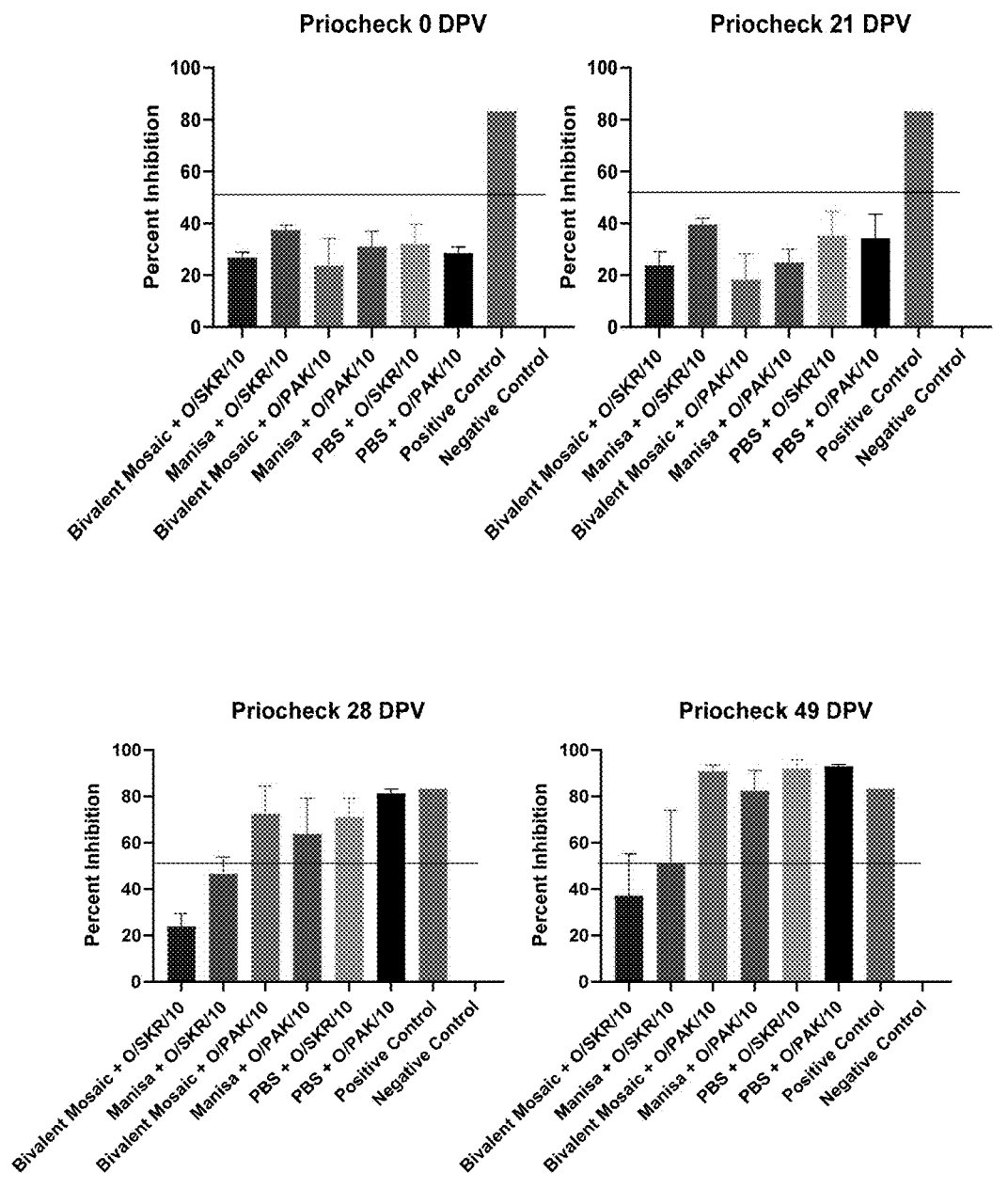
Figure 7B:
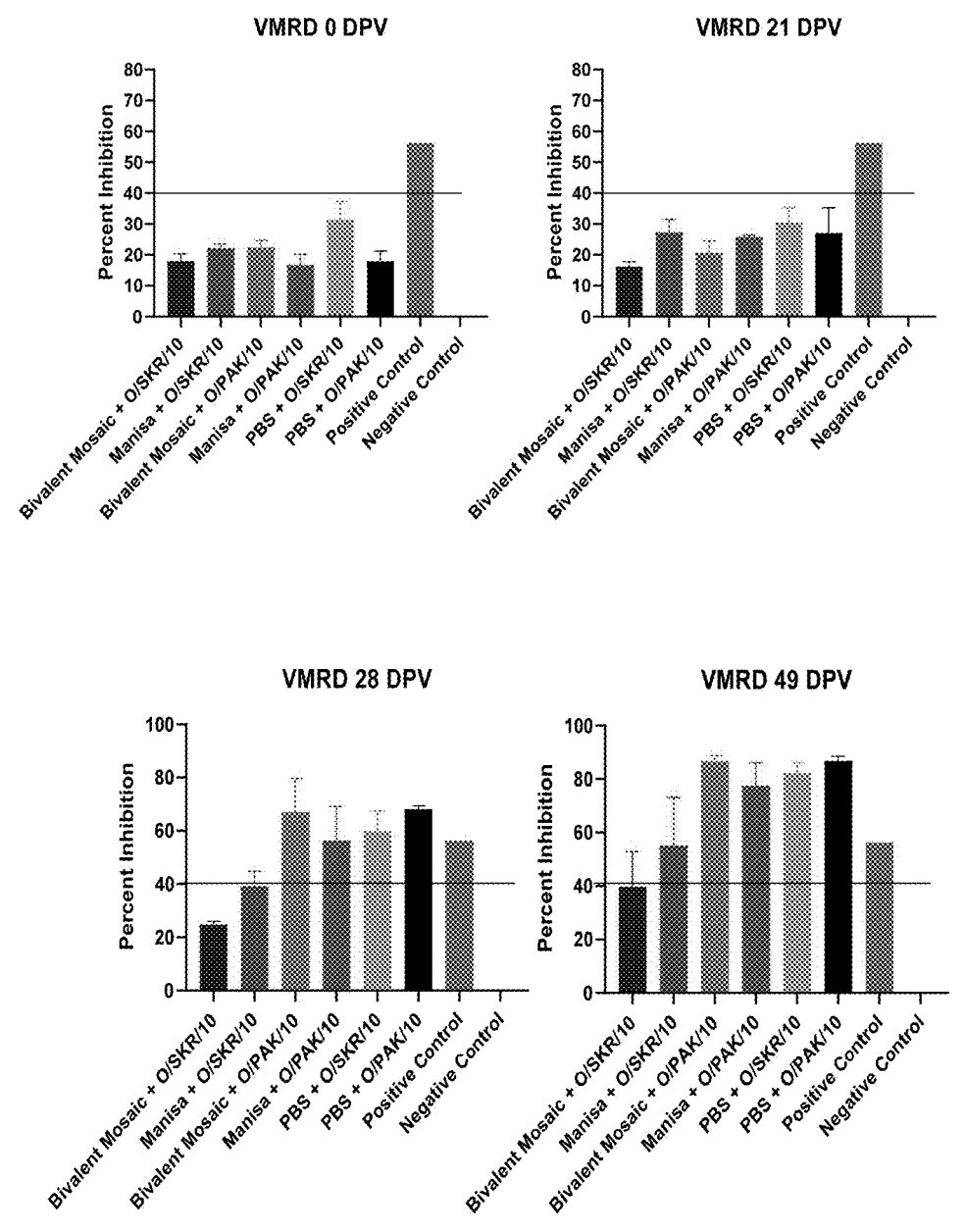

Earlier studies have shown that cattle immunized with FMD-LL3B3D marker vaccines exhibited a differential immune response compared to animals that have been infected with FMDV using three commercially available competitive 3ABC Enzyme-Linked Immunosorbent Assay (cELISA) kits following manufacturer's protocol (Uddowla et al, supra; Hardham et al, supra). In FIG. 7A and FIG. 7B two commercially available assays (FIG. 7A) PrioCHECK FMDV NS Antibody ELISA (Thermo Fisher Scientific) and (FIG. 7B) VMRD FMDV Antibody Detection Kit (Chung et al., 2018), were used to examine sera from vaccinated animals at 0, 21 dpv and following challenge with wild type heterologous viruses at 28 (7dpc) and 49 (28dpc) dpv. FIG. 7A shows Priocheck negative results for antibodies against FMDV NS proteins on serum samples collected at the day of vaccination, at the day of challenge (21dpv) for all the animals in the present study. Serum samples from the vaccinated groups and PBS-mock vaccinated control groups receiving challenge with O/PAK/10 were all positive following challenge as see at 28dpv and 49dpv. Following challenge with O/SKR/10 animals in the O mosaic vaccinated group remained negative, while the O manisa-vaccinated group were in average negative at 28dpv and borderline positive at 49dpv. Similar results were obtained using the VMRD kit as seen in FIG. 7B, where negative values were observed for all samples collected at 0 dpv and 21dpv and continued to be negative for animals that received the mosaic vaccine and challenged with O/SKR/10. Animals on the -O manisa, -O mosaic- and PBS-mock vaccinated control group challenged with O/PAN/10 were positive for antibodies against FMDV NS proteins.

The results revealed that while measurable non-structural protein specific antibodies are detectable in mock—and all vaccinated cattle following FMDV challenge with O/PAK/10 virus, the levels of antibodies to FMDV were below the cut-off in animals vaccinated with the marker O Mosaic FMD-LL3B3D bivalent Mosaic vaccine when challenge was conducted using O/SKR/10 virus. Negative values for antibodies against FMDV NS proteins at 21dpv were consistent with the expected DIVA capability of the FMD-LL3B3d vaccine platform.

Example 3

Antigen-Specific IFNγ Responses

Live virus for use in the ELISpot assay was grown, clarified and PEG concentrated as described above. Briefly, roller bottles of confluent BHK-21 or LFBKαVβ6 cells were infected with FMDV O1 Manisa (FMDV O1M), O South Korea 2010 (FMDV O/SKR/10), O Pakistan 2010 within Pan-Asia-2 lineage (FMDV O/PAK/10), O Mosaic VP4.2.1, and O Mosaic VP4.2.2.7 at an MOI of 0.1. Infections were left overnight at 37° C., with $CO_2$ and frozen at −80° C. the following day when the cytopathic effect (CPE) was 95-100%. Roller bottles were thawed, pooled (per virus), and clarified by centrifugation at 2,000 RPM for 10 minutes at 4° C. Eight percent polyethylene glycol 8000 (PEG, Sigma) was added to the clarified virus and incubated overnight at 4° C., with gentle agitation. Samples were centrifuged at 10,000×g for 30 minutes and the supernatant discarded. Virus was released from PEG and reconstituted in 10% v/v TNE buffer (50 mM Tris-HCl, 150 mM NaCl, 5 mM EDTA), centrifuged, and viruses were tittered by standard BHK-21 or LFBKαVβ6 cell plaque assays.

Bovine IFN-γ ELISpot$^{PLUS}$ plates (Mabtech) were prepared according to manufacturer's instructions. Plates were blocked with ELISpot media (RPMI 1640 (Gibco), 1% L-glutamine (200 mM, Thermo Fisher Scientific), 1% MEM NEAA (100×, Thermo Fisher Scientific), 1% Sodium Pyruvate (100 mM, Thermo Fisher Scientific), 1% Antibiotic-Antimycotic 100×(Thermo Fisher Scientific)) containing 10% FBS (HyClone) for up to 6 hours (at room temperature) prior to addition of cells. Fresh PBMC aliquots were centrifuged at 1,200 RPM for 10 minutes at 4° C. Cells were resuspended in ELISpot media containing 20% FBS (Hy-Clone). $5 \times 10^5$ cells/100 ul/per well were aliquoted in a 96 well round bottom plate (Corning). 100 ul of each stimulant (see below) was added per well and the cell/stimulant mixture was transferred to the prepared ELISpot plates (200 ul total/well). Plates were loosely wrapped in aluminum foil and incubated for 18 hours at 37° C., 5% $CO_2$, with humidity.

Cells were stimulated, in duplicate, with 100 μl of a) no FBS containing ELISpot media only, b) 1 μg/ml PHA (Invitrogen) (positive control), and c) PEG concentrated live FMD viruses O1M, O/SKR/10, OPAK10, O Mos2.1, O Mos2.2.7 at an MOI of 5 (diluted in serum-free containing ELISpot media). Following the 18-hour incubation, ELISpot plates were developed according to manufacturer's instructions, with minor changes; FCS was replaced with FBS. IFNγ secreting cells (ISCs) were counted using an ImmunoSpot® Analyzer (CTL, USA). ISCs were calculated per $1 \times 10^6$ cells using the mean of the duplicate wells per animal per treatment. ISCs from the media only controls were subtracted from positive wells to adjust for any background IFNγ production. IFNγ ISC data underwent statistical analysis using both repeated-measures and ordinary one-way Analysis of Variance tests, incorporating Tukey's multiple comparison test, when applicable. Statistical analyses were conducted using GraphPad Prism 9.1.0 (221) (GraphPad Software, LLC).

Post-Vaccination, Pre-Challenge In Vitro IFNγ Responses

Figure 8:
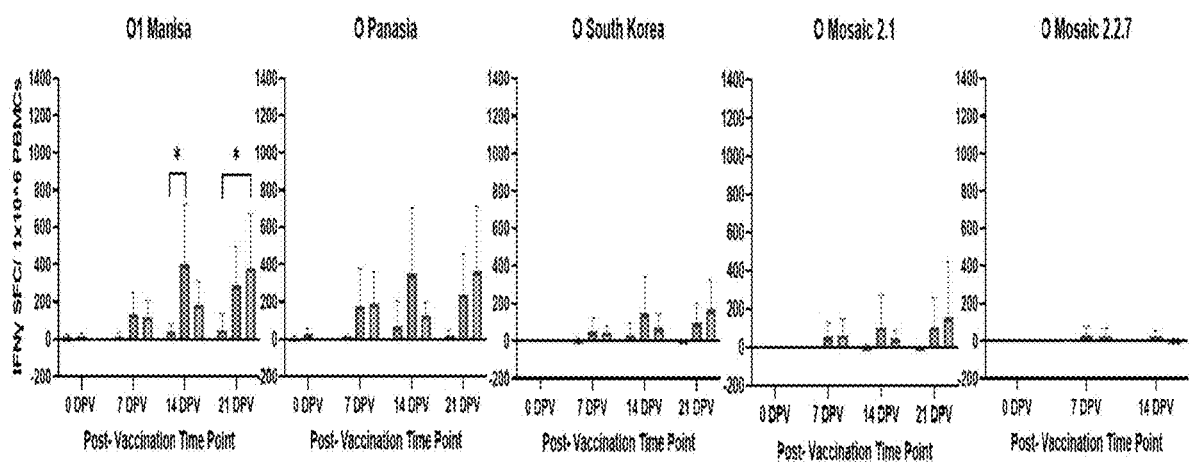
FIG. 8 depicts post-vaccination IFNγ responses to in vitro stimulation with FMDV serotype O viruses. 5×10⁵ PBMCs were plated with live virus at an MOI of 5 overnight (~18 hours). Post-incubation, ELISpot plates were developed as per manufacturer's protocol. Spots were enumerated using an ImmunoSpot® Analyzer (CTL). ISCs were calculated per 1×10⁶ cells using the mean of the duplicate wells per animal per treatment. ISCs from the media only controls were subtracted from positive wells to adjust for any background IFNγ production. IFNγ ISC data underwent statistical analysis using both repeated measures and ordinary one-way Analysis of Variance tests, incorporating Tukey's multiple comparison test, when applicable. Statistical analyses were conducted using GraphPad Prism 9.1.0 (221) (GraphPad Software, LLC). 21 dpv is not available for O Mosaic 2.2.7. Statistical significance (*) was noted between the O1M vaccinated and Control group at 14 dpv (p=0.0186) and between the O Mosaic bivalent and Control group at 21 dpv (p=0.0389), upon in vitro stimulation with O1M.

No animals showed a virus-specific IFNγ response at 0 dpv. All animals produced a virus-specific IFNγ response in vitro within at least one time point pre- and post-challenge. As shown in FIG. 8, pre-challenge, vaccinated animals developed responses 7 dpv, with O1 Manisa responses peaking at 14 dpv and bivalent mosaic vaccinated animals peaking at 21 dpv. This is seen in all responses except against O Mosaic 2.2.7, which induced low responses overall. Statistical significance was noted between the O1 Manisa vaccinated and control group at 14 dpv ($p=0.0186$) and between the O mosaic bivalent and control group at 21 dpv ($p=0.0389$). Overall, pre-challenge, responses were highest against O1 Manisa and O/PAK/10. Statistically significant differences were noted in vitro between animals in the O1M vaccination group against OMos 2.1, O/PAK/10, O/SKR/10, and O1 Manisa ($p=0.0053$, $p=0.0072$, $p=0.0135$, p=0.0209, respectively). This is likely due to higher responses in three animals (R20-20, R20-026, and R20-27) compared to the other three animals in the group. Unexpectedly high ISC counts were noted in a very few control animals (placebo-vaccinated) pre-challenge. These high values coincided with overall high stimulation by the animal that day. As the animals were separated from any of the vaccinated animals and not subjected to the FMDV virus, we hypothesize that these rare events are due to an overactive immune response in the animal on that day (as the media only control also had a high value of ICS-data not shown).

Post-Challenge In Vitro IFNγ Responses

Figure 9A:
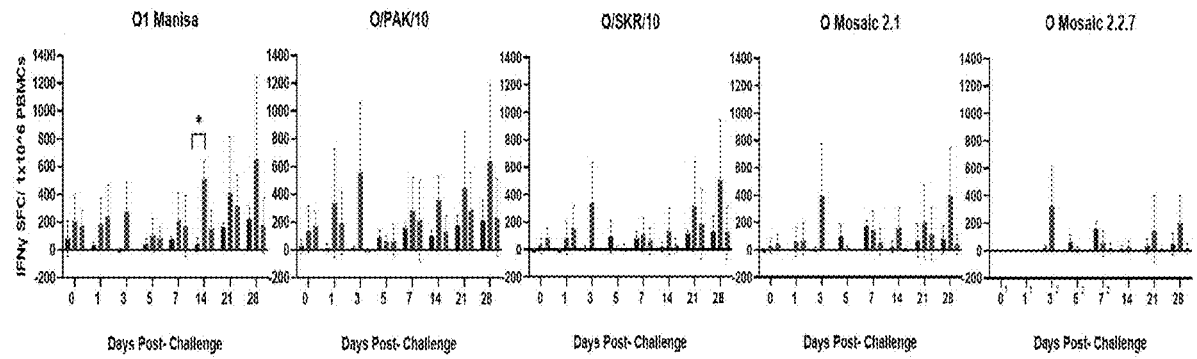
FIG. 9A and FIG. 9B depict post-challenge IFNγ responses to in vitro stimulation with FMDV serotype O viruses. 5×10⁵ PBMCs were plated with live virus at an MOI of 5 overnight (~18 hours). Post-incubation, ELISpot plates were developed as per manufacturer's protocol. Spots were enumerated using an ImmunoSpot® Analyzer (CTL). ISCs were calculated per 1×10⁶ cells using the mean of the duplicate wells per animal per treatment. ISCs from the media only controls were subtracted from positive wells to adjust for any background IFNγ production. IFNγ ISC data underwent statistical analysis using both repeated-measures and ordinary one-way Analysis of Variance tests, incorporating Tukey's multiple comparison test, when applicable. Statistical analyses were conducted using GraphPad Prism 9.1.0 (221) (GraphPad Software, LLC).
Figure 9B:
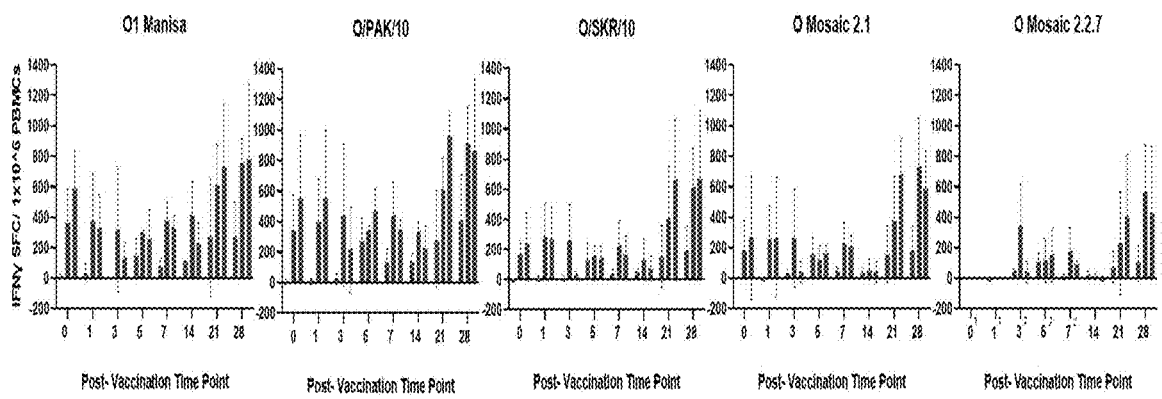
Figure 11A:
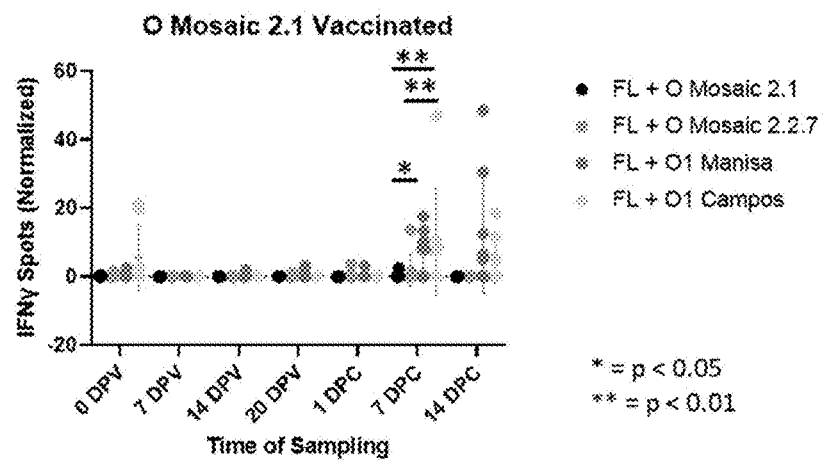
FIG. 11A, FIG. 11B, FIG. 11C and FIG. 11D provide graphical representation of post-vaccination IFNγ responses to in vitro stimulation with FMDV serotype O viruses.
Figure 11B:
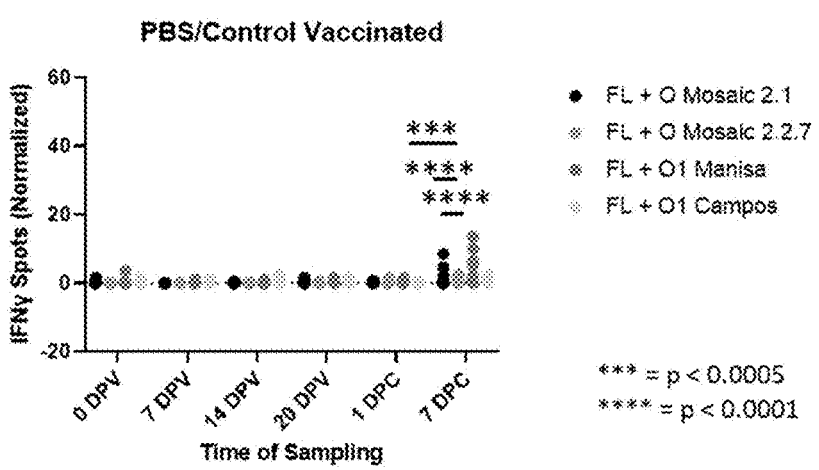
Figure 11C:
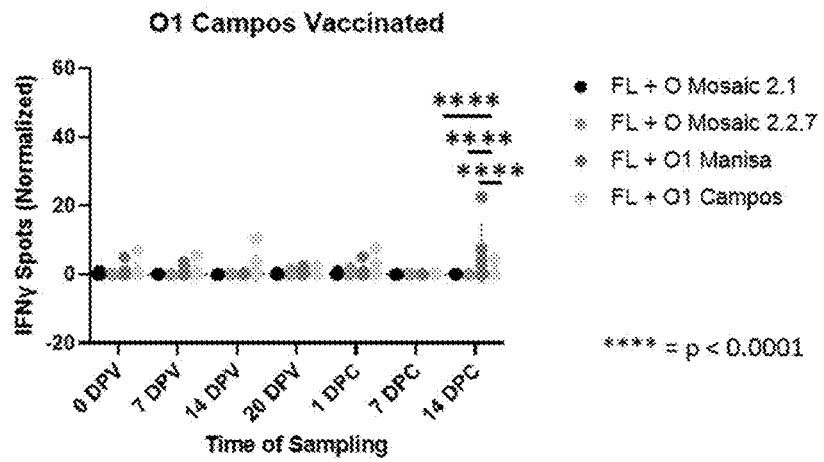
Figure 11D:
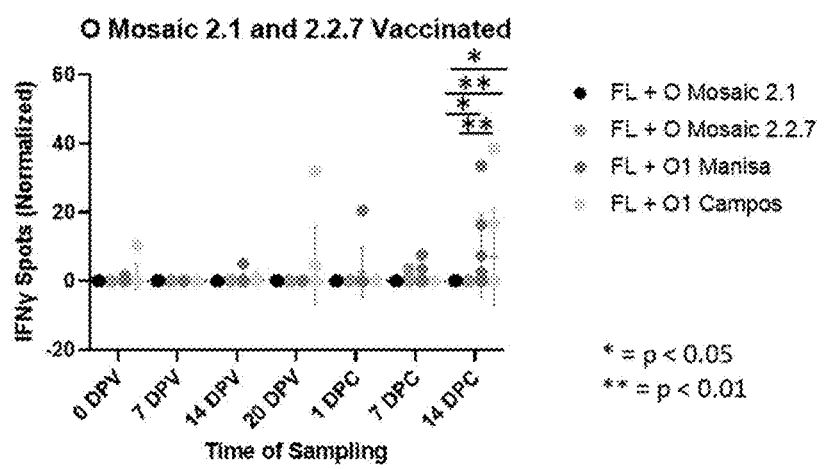
Figure 12A:
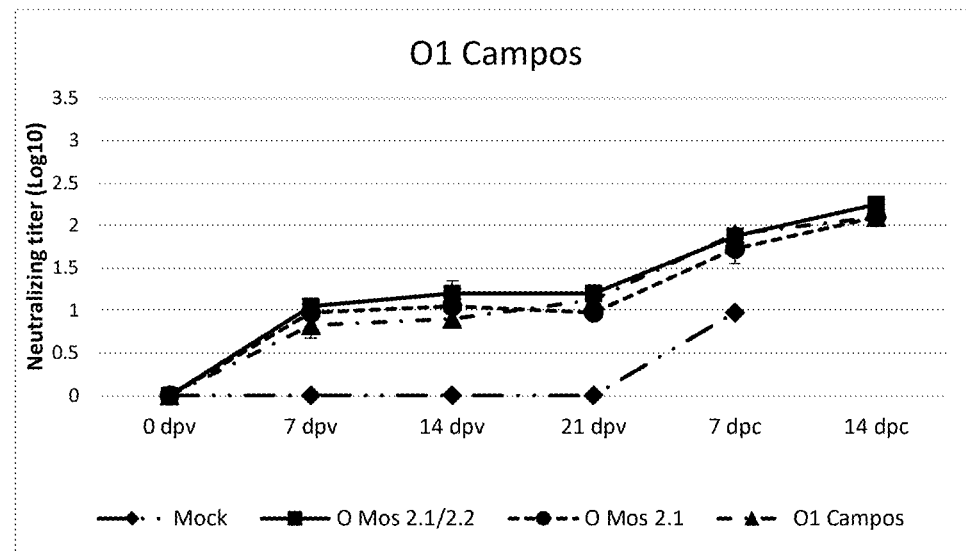
Figure 12B:
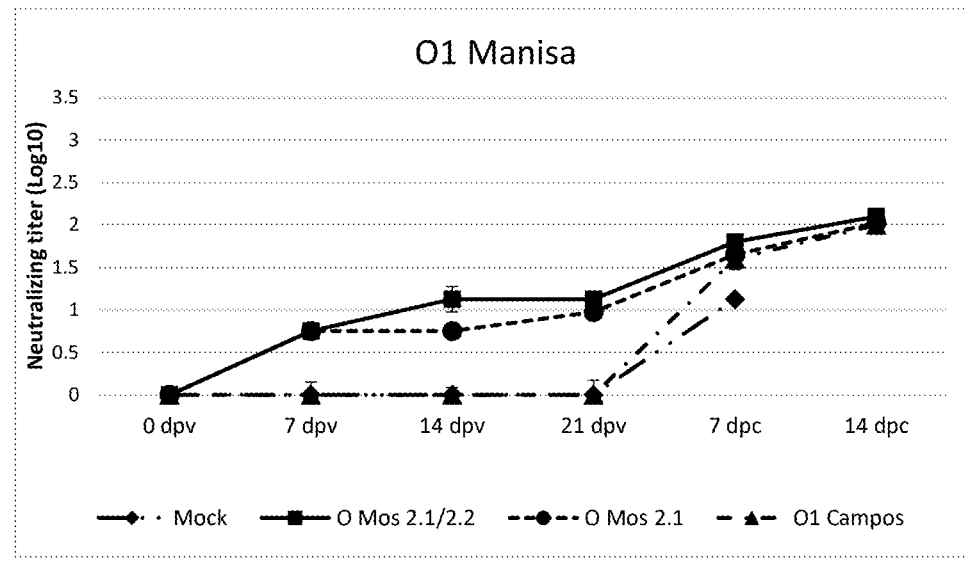

Five days post-challenge, statistically and biologically relevant differences were noted upon in vitro stimulation with O/PAK/10 between O1 Manisa vaccinated, O/SKR/10 challenged and O/PAK/10 challenged groups (p=0.0472), and O mosaic bivalent, O/SKR/10 challenged and O/PAK/10 challenged groups (p=0.0044); O/PAK/10 challenged groups had higher responses (FIG. 9A and FIG. 9B). Statistically significant results were also noted at 14 dpc between the control and O1 Manisa vaccinated and O/SKR/10 challenged groups, upon in vitro stimulation with O1M (p=0.0105). Additional significance was found between individual animals within a group (not shown); this is not unexpected considering the outbred nature of the animals. Although no additional statistically significant data was determined, biologically relevant trends were observed.

Within the O/SKR/10 challenge groups, in vitro responses tended to be lower than in the O/PAK/10 challenged groups. Post-challenge, vaccinated animals showed increases in their virus-specific responses, with a dip at about 5 dpc and an increase thereafter. In general, control animals did not show a response until 5dpc, though strength of the responses (measured by IFNγ secreting cells (ISCs)) varied post-challenge, either increasing over time (i.e.: O1M and O/PAK/10 in vitro stimulation, O/PAK/10 challenge), or remaining relatively steady (i.e.: O/SKR/10 in vitro stimulation, O/PAK/10 challenge).

Vaccination with O1 Manisa and challenge with O/SKR/10 induced stronger in vitro responses than vaccination with the O mosaic bivalent vaccine. However, within the O/PAK/10 challenged animals, the bivalent mosaic vaccinated animals had similar or stronger in vitro responses when compared to the O1 Manisa vaccinated animals. Regarding the type of immune response induced, although the mosaic vaccines were targeting the development of a T cell response, it is possible that challenge with this virus naturally induces a humoral immune response through expression of B cell epitopes. Individual animals within groups did not all behave the same way and some animals had more active immune responses (baseline) than others, which, when subtracting background from the stimulation data, can have an effect on the perceived strength of the in vitro response. Lastly, though the vaccinated animals were protected from disease development, overall, the viruses are not too genetically dissimilar, perhaps there is a viral component of O/SKR/10 which inhibits T cell epitope recognition or perhaps smaller responses do not indicate the lack of a T cell role in clearance/protection, rather that smaller amounts of IFNγ are required.

Example 4

O Mosaic Vaccine Efficacy Study in Swine Using Heterologous Challenge

In a first experiment, 23 Yorkshire gilts (five weeks old and weighing approximately 18-23 kg each) were acclimated for 1 week and were subsequently divided in 4 groups of 4 animals (Table 8). In group 1, the 4 control animals were mock vaccinated (received PBS); in group 2, the 4 animals each received 15 μg of chemically inactivated O1 Campos LL3B3D vaccine formulated with Seppic ISA 201 adjuvant. Group 3 animals were vaccinated with 7.5 μg of FMDV LL3B3D O mosaic 2.1 and 7.5 μg of O mosaic 2.2.7 LL3B3D (Bivalent) vaccine formulated with Seppic ISA 201 adjuvant. Group 4 animals received 15 μg of O Mosaic 2.1 alone formulated with inactivated virus and adjuvanted as described above. At 21 days post vaccination (dpv), all animals were challenged with O1 Manisa inoculated intradermally in the heel bulb (IDHB) of the right hind foot with $10^4$ TCID50/animal of FMDV O1 Manisa. The animals were evaluated for the appearance of localized and generalized lesions at 1, 3, 7, and 14 days post-challenge (dpc). Clinical scores were registered for each affected foot outside the challenge site, and for the presence of vesicles in the nose or mouth. Sera, nasal swabs, and temperatures were collected daily.

TABLE 8

Study design for O Mosaic vaccine efficacy in Swine.

| Group # | # Animals | Inoculation | Dose/swine | Challenge |
|---|---|---|---|---|
| 1 | 4 | PBS/control + adjuvant ISA201 | N/A (PBS) | FMDV O1 Manisa Heel Bulb Intradermal |
| 2 | 4 | O1 Campos LL3B3D (15 ug) + adjuvant ISA201 | O1 Campos 15 ug | FMDV O1 Manisa Heel Bulb Intradermal |
| 3 | 4 | O Mosaics O2.1 + O2.2.7 LL3B3D (7.5 + 7.5 ug) + adjuvant ISA201 | O Mosaics: 7.5 ug + 7.5 ug | FMDV O1 Manisa Heel Bulb Intradermal |
| 4 | 4 | O Mosaic O2.1 LL3B3D + adjuvant ISA201 | O Mosaic 15 ug | FMDV O1 Manisa Heel Bulb Intradermal |

Formulation of a Monovalent O Mosaic 2.1, a Monovalent Parental O Campos, and a Bivalent (O Mosaics O2.1+O2.2.7) Chemically Inactivated Vaccines Chemically inactivated Bivalent FMDLL3B3D O Mosaic viruses (Mosaics 2.1 and 2.2.7) were formulated using Seppic ISA 201. A parental O1 Campos virus produced in the same FMDLL3B3D backnone and the O Mosaic 2.1 FMDLL3B3D viruses were used in monovalent form, inactivated and formulated with the same adjuvant for this vaccine efficacy study in swine (first test of the mosaic in this susceptible specie). The study design consisting of mono and bivalent formulations are shown in Table 8.

Serum Virus Neutralization (SVN)

Seroneutralizing antibody titers (SNV) against FMDV vaccine strains O Mosaic 2.1 and O Mosaic 2.2.7, as well as FMDV challenge strain O Manisa, were determined by the virus neutralization test method described in the OIE Manual (OIE, 2015) in 96-well plates of BHK αvβ6 cells, on serum samples collected at days 0, 20, post-vaccination (dpv). SVN titers were calculated according to the Spearman-Kärber method and expressed as $\log_{10}$ of the reciprocal of the final serum dilution that neutralized 100 $TCID_{50}$ of the respective serotype O FMDV in 50% of the wells. As shown in Table 9 all animals that received an FMDV vaccine seroconverted by SVN measures determined on the day before (20dpv) to the challenge with O1 Manisa virus. Titers were overall higher on Mosaic O2.1 monovalent and for the Mosaic O2.1+O2.2.7 combined (bivalent) Mosaic vaccinated animals.

unvaccinated control animals also developed fever, anorexia, lethargy and showed generalized lesions of FMD.

Detection of Virus in Pig Serum and Nasal Swabs

Figures 10A, 10B:
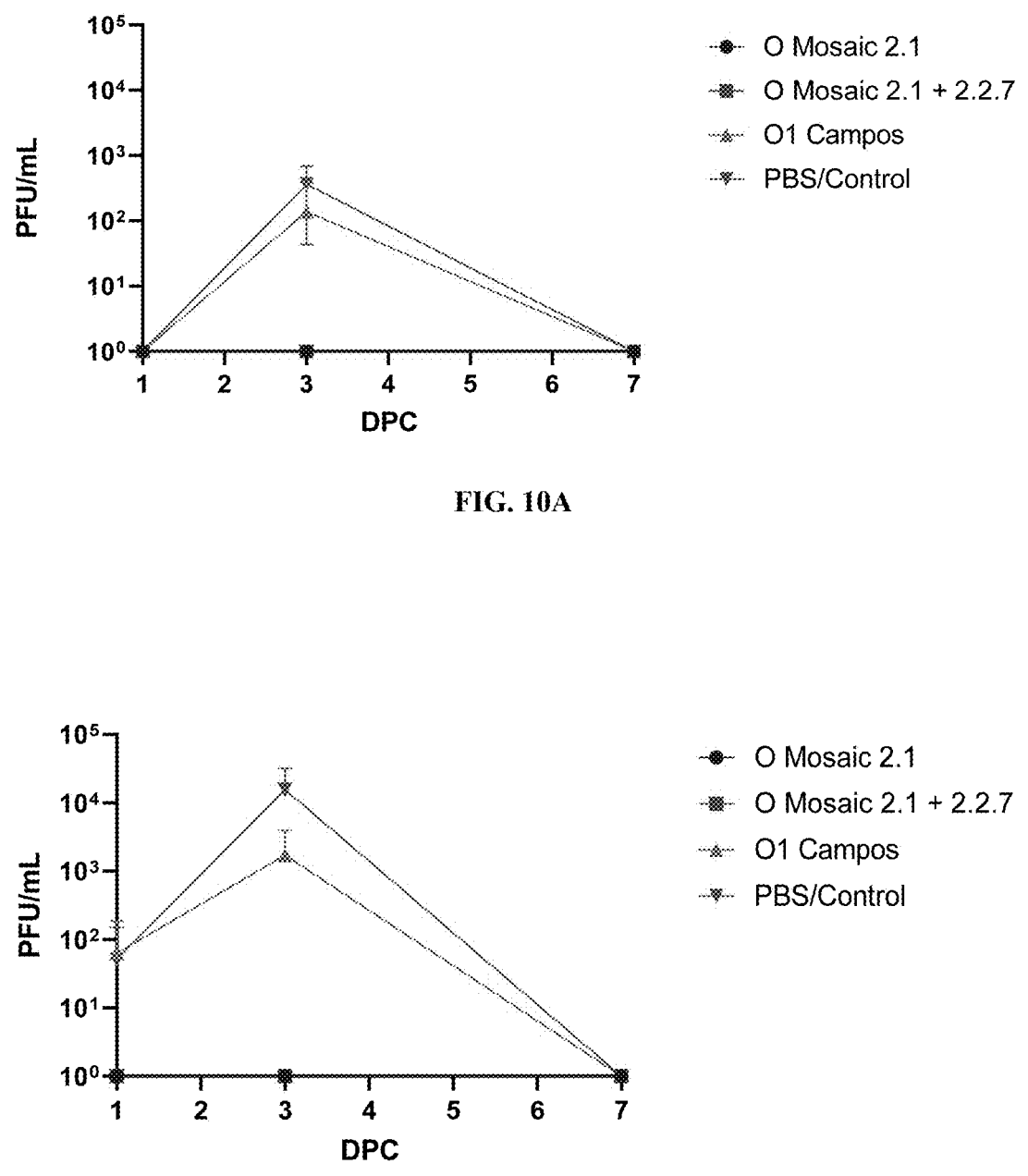

Pig serum and nasal swab samples were assessed for the presence of viable virus at 1, 3, and 7-days post challenge by plaque assay on BHK-21αVβ6 monolayers under a tragacanth overlay. Virus titers were expressed as $\log_{10}$ PFU/ml of serum or nasal swab secretions (FIG. 10A, FIG. 10B). Data provided showed no live, replicating viral shedding present in either group of O mosaic vaccinated animals (O Mosaic 2.1 alone or O Mosaic 2.1+2.2.7 in combination) in serum or nasal swabs at any time point post-challenge with FMDV O1 Manisa.

In contrast, the two groups which had viable virus shedding were the Mock (PBS) vaccinated control animals and those animals vaccinated with FMDV O1 Campos vaccine. The Mock control animals showed peak viremia at 3 DPC with an average titer of $1.57 \times 10^4$ pfu/mL, while the O1 Campos vaccinated animals showed a peak titer of $1.73 \times 10^3$ pfu/mL at 3 DPC in the serum. Similarly, the Mock control animals showed peak viremia at 3 DPC with an average titer of $1.38 \times 10^2$ pfu/mL, while the O1 Campos vaccinated animals showed a peak titer of $3.63 \times 10^2$ pfu/mL at 3 DPC in the nasal swab samples.

TABLE 9

Summary of clinical observations, neutralizing titers from a mosaic vaccine efficacy study in swine

| Vaccination Group | Animal | Clinical Score Following O1 Manisa Challenge DPC | | Fever | SNT ($\log_{10}$) at 0 DPC | |
|---|---|---|---|---|---|---|
| | | 3 | 7 | Max Temp | Against challenge strain | Against vaccine strain |
| Mock/Control | 96 | 2 | 15 | 106.8 | Undetectable | Undetectable |
| | 95 | 32 | 15 | 106.2 | Undetectable | Undetectable |
| | 94 | 12 | 16 | 106.3 | Undetectable | Undetectable |
| | 93 | 12 | 14 | 104.9 | Undetectable | Undetectable |
| O1 Campos | 92 | 12 | 14 | 104.9 | Undetectable | Undetectable |
| | 91 | 4 | 8 | 104.2 | 0.9 | 1.2 |
| | 90 | 13 | 14 | 105.6 | Undetectable | 0.9 |
| | 89 | 13 | 14 | 106.0 | Undetectable | 0.9 |
| O Mosaics 2.1 + 2.2.7 | 88 | 0 | 0 | No Fever | 0.9 | 1.2 |
| | 87 | 0 | 0 | No Fever | 1.5 | 1.5 |
| | 86 | 0 | 0 | No Fever | 0.9 | 1.2 |
| | 85 | 0 | 0 | No Fever | 1.2 | 1.2 |
| O Mosaic 2.1 | 80 | 0 | 0 | No Fever | 0.9 | 1.2 |
| | 79 | 0 | 0 | No Fever | 0.9 | 1.2 |
| | 78 | 0 | 0 | No Fever | 1.2 | 1.2 |
| | 77 | 0 | 0 | No Fever | 0.9 | 0.9 |

Figures 3A, 3B:
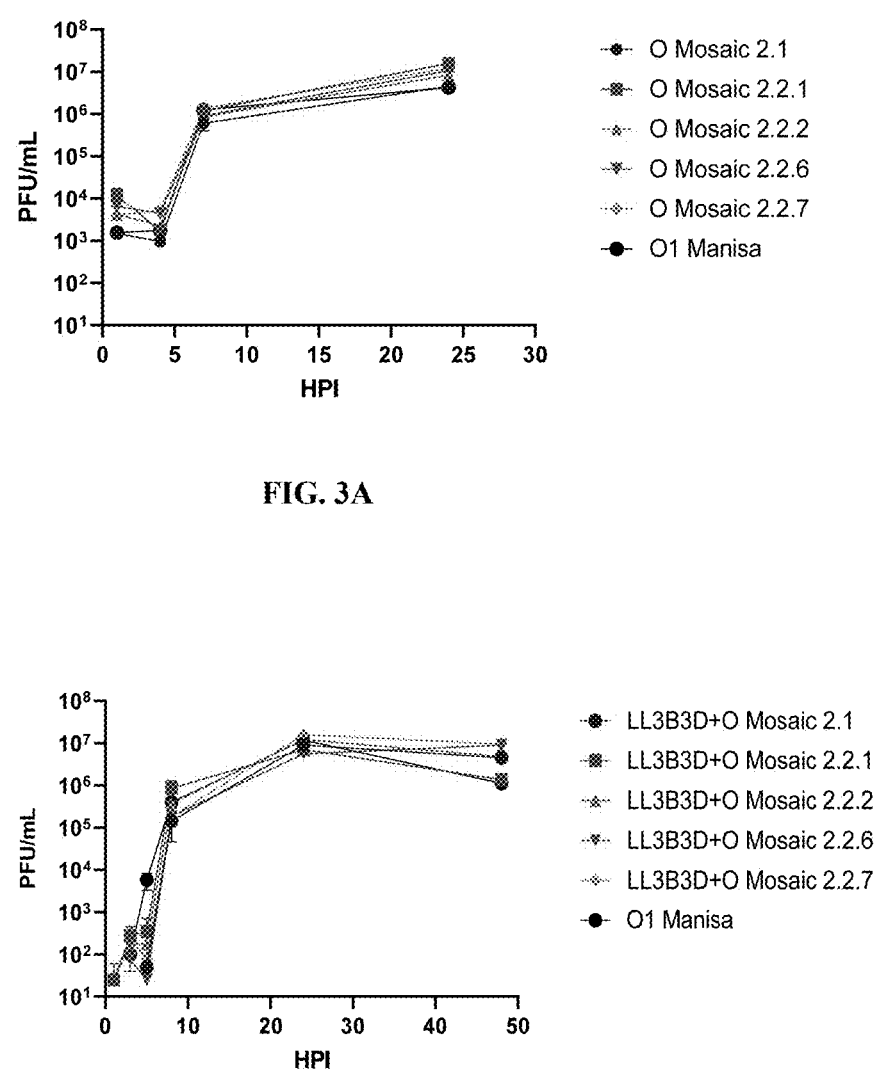

All animals vaccinated with FMDV O Mosaics developed virus neutralizing antibodies against all four strains of FMDV serotype O tested at 21 days post vaccination, while pigs immunized with FMDV O1 Campos developed lower titers against homologous and O Mosaic strains (except for pig #92 that was negative), but no neutralizing titers were detected against challenge strain O1manisa in any of these animals at the day of challenge. None of the unvaccinated control animals had SVN titers on any sampling day prior to challenge. Consistent with virus neutralizing antibody responses, all animals vaccinated with O Mosaics were protected from generalized clinical FMD after challenge with FMDV O1 Manisa, while all pigs vaccinated with O1 Campos developed fever, anorexia, lethargy and had generalized clinical signs and lesions of FMD. As expected, all T-Cell IFNγ ELISpot Results on O Vaccines in Swine Vaccine Efficacy Study When examining all groups of either FMDV Mosaic-vaccinated animals, heterologous-vaccinated animals, or unvaccinated controls, there appear to be peaks in IFNγ spot formation at either 7- or 14-days post-challenge (DPC) (FIG. 11A, FIG. 11B, FIG. 11C, FIG. 11D). There are no datapoints for the PBS/control group at 14 DPC because these animals were humanely euthanized prior to that point. The pigs that received a O Mosaic 2.1 as a vaccine had statistically significant differences in IFNγ spot formation at 7 DPC between O Mosaic 2.1 and O1 Manisa-stimulated PBMC (*p<0.05) and both O Mosaic 2.1 and 2.2.7 to O1 Campos-stimulated PBMC ( p<0.01). The most dramatic of these differences were seen between O Mosaic 2.2.7 and O1 Campos-stimulated PBMC as well as O1 Manisa and O1 Campos-stimulated PBMC ( p<0.01). Pigs vaccinated with the parental strain, O1 Campos, yielded statistically significant differences in spot formation at 14 DPC between both O Mosaic 2.1 and 2.2.7 vs. O1 Manisa, and O1 Manisa vs. O1 Campos (** P<0.0001). In a similar vein, the pigs receiving a bivalent O Mosaic 2.1 and 2.2.7 vaccine only showed statistically significant differences between viral stimulations at 14 DPC with the most notable being between O Mosaic 2.1 and 2.2.7 vs. O1 Manisa ( p<0.01). Finally, the pigs mock-vaccinated with only PBS showed statistically significant differences in spot formation at only 7 DPC between O Mosaic 2.1 and O1 Manisa (* p<0.0005) and O Mosaic 2.2.7 vs. O1 Manisa and O1 Manisa vs. O1 Campos (** p<0.0001) (FIG. 3). A common trend among all of these significant differences is that the most pronounced IFNγ spot formation was seen in response to stimulation with either the challenge virus O1 Campos, or the heterologous vaccine O1 Manisa. The groups with the most plentiful IFNγ spot formation in response to either virus were those vaccinated with O Mosaic 2.1 alone, and the bivalent O Mosaic 2.1 and 2.2.7 vaccine. Although there is variability between pigs within each group, these noteworthy differences are still apparent. These data indicate that vaccination with our FMDV Mosaic viruses, either in isolation or combination with one another, yields a more robust IFNγ response in pigs to the relevant viruses compared to a heterologous vaccination or control vaccination.

Serum Virus Neutralization (SVN)

Neutralizing antibody titers against FMDV vaccine strains O1Campos, O Mosaic 2.1 and O Mosaic 2.2.7, as well as FMDV challenge strain O1 Manisa, were determined by the virus neutralization test method described in the OIE Manual (OIE, 2015) in 96-well plates of LFBK αvβ6 cells, on serum samples collected on Days 0, 7, 14, 21, 28 and 35 (FIG. 12A, FIG. 12B, FIG. 12C, FIG. 12D). SVN titers were calculated according to the Spearman-Kärber method and expressed as $\log_{10}$ of the reciprocal of the final serum dilution that neutralized 100 $TCID_{50}$ of the respective serotype O FMDV in 50% of the wells. The assay lower limit of detection was 0.45 log 10.

All animals vaccinated with FMDV O Mosaics developed virus neutralizing antibodies against all four strains of FMDV serotype O tested at 21 days post vaccination, while pigs immunized with FMDV O1 Campos developed lower titers against homologous and O Mosaic strains (except for pig #92 that was negative), but no neutralizing titers were detected against challenge strain O1manisa in any of these animals at the day of challenge. None of the unvaccinated control animals had SVN titers on any sampling day prior to challenge. Consistently with virus neutralizing antibody responses, all animals vaccinated with O Mosaics were protected from generalized clinical FMD after challenge with FMDV O1 Manisa, while all pigs vaccinated with O1 Campos developed fever, anorexia, lethargy and had generalized clinical signs and lesions of FMD. As expected, all unvaccinated control animals also developed fever, anorexia, lethargy and showed generalized lesions of FMD.

While the invention has been described with reference to details of the illustrated embodiments, these details are not intended to limit the scope of the invention as defined in the appended claims. The embodiment of the invention in which exclusive property or privilege is claimed is defined as follows:

What is claimed is:

1. A synthetic polypeptide comprising the amino acid sequence of SEQ ID NO: 2, SEQ ID NO: 4, SEQ ID NO: 6, SEQ ID NO: 8, or SEQ ID NO: 10.

2. The synthetic polypeptide of claim 1, further comprising a pharmaceutically acceptable carrier.

3. The synthetic polypeptide of claim 1, comprising a first and a second synthetic polypeptide wherein the first synthetic polypeptide comprises the amino acid sequence of SEQ ID NO: 2, and the second synthetic polypeptide comprises the amino acid sequence of SEQ ID NO: 10, and optionally a pharmaceutically acceptable carrier.

4. The synthetic polypeptide of claim 3, further comprising an adjuvant.

5. An isolated nucleic acid molecule encoding the synthetic polypeptide of claim 1.

6. A vector comprising the isolated nucleic acid molecule of claim 5.

7. A recombinant foot-and-mouth disease virus (FMDV) comprising a synthetic polypeptide having the amino acid sequence of SEQ ID NO: 2, SEQ ID NO: 4, SEQ ID NO: 6, SEQ ID NO: 8, or SEQ ID NO: 10.

8. The recombinant FMDV of claim 7, comprising a first and a second recombinant FMDV, wherein the first recombinant FMDV comprises a synthetic polypeptide having the amino acid sequence of SEQ ID NO: 2, and the second recombinant FMDV comprises a synthetic polypeptide having the amino acid sequence of SEQ ID NO: 10, and further optionally comprising a pharmaceutically acceptable carrier.

9. A method of eliciting an immune response against serotype O foot-and-mouth disease virus (FMDV) in a subject, comprising administering to the subject a composition comprising a synthetic polypeptide having the amino acid sequence of SEQ ID NO: 2, SEQ ID NO: 4, SEQ ID NO: 6, SEQ ID NO: 8, or SEQ ID NO: 10, thereby eliciting an immune response to serotype O FMDV.

10. The method of claim 9, wherein the composition further comprises a pharmaceutically acceptable carrier, an adjuvant, or both a pharmaceutically acceptable carrier and an adjuvant.

11. The method of claim 9, comprising administering to the subject a first composition comprising a synthetic polypeptide having the amino acid sequence of SEQ ID NO: 2 and a second composition comprising a second synthetic polypeptide at least 98% identical to the amino acid sequence of SEQ ID NO: 10.

12. The method of claim 9, wherein the subject is a cow or a pig.

* * * * *